(12) United States Patent
Martinez-Canales et al.

(10) Patent No.: US 11,593,643 B2
(45) Date of Patent: Feb. 28, 2023

(54) COMPUTATIONALLY-EFFICIENT QUATERNION-BASED MACHINE-LEARNING SYSTEM

(71) Applicant: Intel Corporation, Santa Clara, CA (US)

(72) Inventors: Monica Lucia Martinez-Canales, Los Altos, CA (US); Sudhir K. Singh, Dublin, CA (US); Vinod Sharma, Menlo Park, CA (US); Malini Krishnan Bhandaru, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 591 days.

(21) Appl. No.: 16/613,365

(22) PCT Filed: May 31, 2018

(86) PCT No.: PCT/US2018/035439
§ 371 (c)(1),
(2) Date: Nov. 13, 2019

(87) PCT Pub. No.: WO2018/222900
PCT Pub. Date: Dec. 6, 2018

(65) Prior Publication Data
US 2020/0202216 A1 Jun. 25, 2020

Related U.S. Application Data

(60) Provisional application No. 62/513,390, filed on May 31, 2017.

(51) Int. Cl.
*G06N 3/08* (2006.01)
*G06N 10/00* (2022.01)
(Continued)

(52) U.S. Cl.
CPC ............... *G06N 3/08* (2013.01); *G06F 17/16* (2013.01); *G06K 9/6256* (2013.01);
(Continued)

(58) Field of Classification Search
CPC .... G06N 20/10; G06N 3/0454; G06N 3/0481; G06N 3/084; G06N 5/046; G06N 10/00;
(Continued)

(56) References Cited

U.S. PATENT DOCUMENTS 9,767,410 B1 9/2017 Guevara et al.
10,262,218 B2 4/2019 Lee et al.
(Continued)

FOREIGN PATENT DOCUMENTS

CN 110574050 12/2019
CN 110574051 12/2019
(Continued)

OTHER PUBLICATIONS

Kominami et al., "Convolutional Neural Networks with Multi-valued Neurons", May 19, 2017, 2017 International Joint Conference on Neural Networks (IJCNN), pp. 2673-2678 (Year: 2017).*
(Continued)

*Primary Examiner* — Brent Johnston Hoover
(74) *Attorney, Agent, or Firm* — Schwegman Lundberg & Woessner, P.A.

(57) ABSTRACT

A quaternion deep neural network (QTDNN) includes a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path. Each QT computation sublayer of the set has a plurality of QT computation engines. In each modular hidden layer, a steering sublayer precedes each of the QT computation sublayers along the
(Continued)

forward signal propagation path. The steering sublayer directs a forward-propagating quaternion-valued signal to a selected at least one QT computation engine of a next QT computation subsequent sublayer.

24 Claims, 15 Drawing Sheets

(51) Int. Cl.
| | | |
|---|---|---|
| *G06F 17/16* | (2006.01) | |
| *G06K 9/62* | (2022.01) | |
| *G06N 3/04* | (2023.01) | |
| *G06N 3/084* | (2023.01) | |
| *G06N 20/10* | (2019.01) | |
| *G06N 5/046* | (2023.01) | |

(52) U.S. Cl.
CPC ............. *G06K 9/6262* (2013.01); *G06N 3/04* (2013.01); *G06N 3/0481* (2013.01); *G06N 3/084* (2013.01); *G06N 5/046* (2013.01); *G06N 10/00* (2019.01); *G06N 20/10* (2019.01)

(58) Field of Classification Search
CPC . G06N 3/04; G06N 3/08; G06F 17/16; G06K 9/6256; G06K 9/6262
See application file for complete search history.

(56) References Cited

U.S. PATENT DOCUMENTS

| | | |
|---|---|---|
| 10,891,537 B2 | 1/2021 | Wang et al. |
| 11,263,526 B2 | 3/2022 | Martinez-Canales et al. |
| 2013/0297541 A1 | 11/2013 | Piekniewski et al. |
| 2014/0219497 A1 | 8/2014 | Richert |
| 2016/0253466 A1 | 9/2016 | Agaian et al. |
| 2017/0091581 A1 | 3/2017 | Watanabe et al. |
| 2017/0337468 A1 | 11/2017 | Bruestle et al. |
| 2018/0096457 A1 | 4/2018 | Savvides et al. |
| 2018/0121791 A1 | 5/2018 | O'connor et al. |
| 2019/0108651 A1 | 4/2019 | Gu et al. |
| 2019/0171936 A1 | 6/2019 | Karras et al. |
| 2019/0266485 A1 | 8/2019 | Singh et al. |
| 2019/0294108 A1 | 9/2019 | Ozcan et al. |
| 2019/0304568 A1 | 10/2019 | Wei et al. |
| 2019/0354844 A1 | 11/2019 | Brasnett et al. |
| 2019/0354894 A1 | 11/2019 | Lazovich et al. |
| 2019/0356394 A1 | 11/2019 | Bunandar et al. |
| 2020/0026992 A1* | 1/2020 | Zhang .................. G06N 3/0454 |
| 2020/0042796 A1 | 2/2020 | Kim et al. |
| 2020/0058106 A1 | 2/2020 | Lazarus et al. |
| 2020/0117993 A1 | 4/2020 | Martinez-Canales et al. |
| 2020/0192726 A1 | 6/2020 | Joo et al. |
| 2020/0193235 A1 | 6/2020 | Martinez-Canales et al. |
| 2020/0302265 A1 | 9/2020 | Wang et al. |
| 2021/0019633 A1 | 1/2021 | Venkatesh |
| 2021/0042613 A1 | 2/2021 | Öztireli et al. |
| 2021/0125380 A1 | 4/2021 | Lee et al. |
| 2021/0160522 A1 | 5/2021 | Lee et al. |

FOREIGN PATENT DOCUMENTS

| | | |
|---|---|---|
| CN | 110603544 | 12/2019 |
| JP | 2006140952 A | 6/2006 |
| WO | WO-2015054666 A1 | 4/2015 |
| WO | WO-2018222896 A1 | 12/2018 |
| WO | WO-2018222900 A1 | 12/2018 |
| WO | WO-2018222904 A1 | 12/2018 |

OTHER PUBLICATIONS

Parcollet et al., "Quaternion Neural Networks for Spoken Language Understanding", Feb. 9, 2017, 2016 IEEE Spoken Language Technology Workshop (SLT), pp. 362-368 (Year: 2017).*

"U.S. Appl. No. 16/613,380, Preliminary Amendment filed Nov. 13, 2019", 9 pgs.

"International Application Serial No. PCT US2018 035431, International Preliminary Report on Patentability dated Dec. 12, 2019", 9 pgs.

"International Application Serial No. PCT US2018 035439, International Preliminary Report on Patentability dated Dec. 12, 2019", 10 pgs.

"International Application Serial No. PCT US2018 035446, International Preliminary Report on Patentability dated Dec. 12, 2019", 8 pgs.

"Maths—Quaternion Arithmetic", www.euclideanspace.com maths algebra realNormedAlgebra quaternions arithmetic index.htm, (added Mar. 2, 2020), 4 pgs.

"Intel 64 and IA-32 Architectures Software Developer's Manual", Part 1 of 10, (Oct. 2019), 500 pgs.

"Intel 64 and IA-32 Architectures Software Developer's Manual", Part 2 of 10, (Oct. 2019), 500 pgs.

"Intel 64 and IA-32 Architectures Software Developer's Manual", Part 3 of 10, (Oct. 2019), 500 pgs.

"Intel 64 and IA-32 Architectures Software Developer's Manual", Part 4 of 10, (Oct. 2019), 500 pgs.

"Intel 64 and IA-32 Architectures Software Developer's Manual", Part 5 of 10, (Oct. 2019), 500 pgs.

"Intel 64 and IA-32 Architectures Software Developer's Manual", Part 7 of 10, (Oct. 2019), 500 pgs.

"Intel 64 and IA-32 Architectures Software Developer's Manual", Part 6 of 10, (Oct. 2019), 500 pgs.

"Intel 64 and IA-32 Architectures Software Developer's Manual", Part 8 of 10, (Oct. 2019), 500 pgs.

"Intel 64 and IA-32 Architectures Software Developer's Manual", Part 9 of 10, (Oct. 2019), 500 pgs.

"Intel 64 and IA-32 Architectures Software Developer's Manual", Part 10 of 10, (Oct. 2019), 538 pgs.

Lomont, Chris, "Introduction to Intel Advanced Vector Extensions", Intel Software Developer Zone https: software.intel.com en-us articles introduction-to-intel-advanced-vector-extensions, (Jun. 21, 2011), 32 pgs.

"International Application Serial No. PCT/US2018/035431, International Search Report dated Sep. 20, 2018", 3 pgs.

"International Application Serial No. PCT/US2018/035431, Written Opinion dated Sep. 20, 2018", 7 pgs.

"International Application Serial No. PCT/US2018/035439, International Search Report dated Oct. 16, 2018", 4 pgs.

"International Application Serial No. PCT/US2018/035439, Written Opinion dated Oct. 16, 2018", 8 pgs.

"International Application Serial No. PCT/US2018/035446, International Search Report dated Sep. 20, 2018", 3 pgs.

"International Application Serial No. PCT/US2018/035446, Written Opinion dated Sep. 20, 2018", 6 pgs.

Che, Ujang, et al., "Quaternion Valued Neural Networks and Nonlinear Adaptive Filters", [Online] Retrieved from the Internet : <https://www.commsp.ee.ic.ac.uk/~mandic/research/Nonlinear_Quaternion_TR_2010.pdf>, (Jul. 16, 2010).

Janovska, D, et al., "Givens' transformation applied to quaternion valued vectors", BIT Numerical Mathematics, vol. 43, issue 5, (Dec. 2003), 991-1002.

Yuki, Kominami, et al., "Convolutional Neural Networks with Multi-valued Neurons", In: 2017 International Joint Conference on Neural Networks (IJCNN 2017), (May 16, 2017), 2673-2678.

Zhang, Liangpei, et al., "Deep Learning for Remote Sensing Data", IEEE Geoscience and Remote Sensing Magazine, vol. 4, Issue 2, (Jun. 13, 2016), 22-40.

"Chinese Application Serial No. 201880028672.X, Voluntary Amendment filed Sep. 24, 2020", w o English Claims, 197 pgs.

"European Application Serial No. 18809472.6, Extended European Search Report dated Feb. 12, 2021", 13 pgs.

"European Application Serial No. 18808832.2, Extended European Search Report dated Feb. 24, 2021", 13 pgs.

"European Application Serial No. 18809474.2, Extended European Search Report dated Feb. 24, 2021", 12 pgs.

(56) References Cited

OTHER PUBLICATIONS

Dongpo, Xu, "Quaternion Derivatives: The GHR Calculus", arxiv.org, Cornell University Library, 201 Olin Library Cornell University Ithaca, NY 14853, (Sep. 25, 2014).
Gaudet, Chase, "Deep Quaternion Networks", International Joint Conference on Neural Networks (IJCNN), (Jan. 30, 2018), 1-8.
Greenblatt, Aaron B, "Introducing quaternion multi-valued neural networks with numerical examples", Information Sciences vol. 423, (Jan. 31, 2018), 326-342.
Grigoryan, Artyom M, "Tensor representation of color images and fast 2D quaternion discrete Fourier transform", Proceedings of SPIE, IEEE, US, vol. 9399, (Mar. 16, 2015), 93990N-93990N.
Gui, Yunduan, "Remarks on quaternion neural network based controller with application to an inverted pendulum", Proceedings of the Sice Annual Conference (SICE), SICE, (Sep. 9, 2014), 137-142.
Hata, Ryusuke, "Multi-valued autoencoders for multi-valued neural networks", International Joint Conference on Neural Networks (IJCNN), IEEE, (Jul. 24, 2016), 4412-4417.
Meysam, Madadi, "End-to-end Global to Local CNN Learning for Hand Pose Recovery in Depth Data", arxiv.org, Cornell University Library, 201 Olin Library Cornell University Ithaca, NY, (May 26, 2017).
Risojevic, Vladimir, "Unsupervised learning of quaternion features for image classification", 11th International Conference on Telecommunications in Modern Satellite, Cable and Broadcasting Services (TELSIKS), IEEE, (Oct. 16, 2013), 345-348.
Saad, Saoud, "A novel method to forecast 24 h of global solar irradiation", Energy Systems, Springer Berlin Heidelberg, Berlin Heidelberg, vol. 9, No. 1, (Aug. 30, 2016), 171-193.
Suzuki, Satoshi, "An Architecture Design Method of Deep Convolutional Neural Network", Big Data Analytics in the Social and Ubiquitous Context : 5th International Workshop on Modeling Social Media, Msm 2014, 5th International Workshop on Mining Ubiquitous and Social Environments, Muse 2014 and First International Workshop on Machine LE, (Sep. 29, 2016).
Yan, Chao, "Multi-attributes gait identification by convolutional neural networks", 8th International Congress on Image and Signal Processing (CISP) IEEE, (Oct. 14, 2015), 642-647.
Zeng, Rui, "Color image classification via quaternion principal component analysis network", Neurocomputing, Elsevier, Amsterdam, NL, vol. 216, (Aug. 8, 2016), 416-428.
"European Application Serial No. 18809472.6, Response filed Sep. 9, 2021 to Extended European Search Report dated Feb. 12, 2021", 22 pgs.
"European Application Serial No. 18809474.2, Response filed Sep. 23, 2021 to Extended European Search Report dated Feb. 24, 2021", 21 pgs.
"European Application Serial No. 18808832.2, Response filed Sep. 27, 2021 to Extended European Search Report dated Feb. 24, 2021", 18 pgs.
"U.S. Appl. No. 16/613,349, Notice of Allowance dated Oct. 22, 2021", 13 pgs.
"U.S. Appl. No. 16/613,349, Corrected Notice of Allowability dated Nov. 5, 2021", 2 pgs.
"U.S. Appl. No. 16/613,349, 312 Amendment filed Jan. 3, 2022", 3 pgs.
"U.S. Appl. No. 16/613,349, PTO Response to Rule 312 Communication mailed Jan. 12, 2022", 2 pgs.
Nitzan, Guberman, "On Complex Valued Convolutional Neural Networks", arXiv:1602.09046v1 [cs.NE], (Feb. 29, 2016), 41 pgs.
U.S. Appl. No. 16/613,349, filed Nov. 13, 2019, Gradient-Based Training Engine for Quaternion-Based Machine-Learning Systems.
U.S. Appl. No. 16/613,380, filed Nov. 13, 2019, Tensor-Based Computing System for Quaternion Operations.
"U.S. Appl. No. 16/613,380, Notice of Allowance dated Aug. 2, 2022", 13 pgs.

\* cited by examiner

COMPUTATIONALLY-EFFICIENT QUATERNION-BASED MACHINE-LEARNING SYSTEM

RELATED APPLICATIONS

This Application is a U.S. National Stage Application under 35 U.S.C. 371 from International Application No. PCT/US2018/035439, filed May 31, 2018, published as WO 2018/222900, which claims the benefit of U.S. Provisional Application No. 62/513,390 filed May 31, 2017, the disclosures of which are incorporated by reference into the present Specification. This Application is related to International Patent Applications filed on May 31, 2018, GRADIENT-BASED TRAINING ENGINE FOR QUATERNION-BASED MACHINE-LEARNING SYSTEMS, PCT/US2018/035431, published as WO 2018/222896 and TENSOR-BASED COMPUTING SYSTEM FOR QUATERNION OPERATIONS, PCT/US2018/035446, published as WO 2018/222904, both of which are filed commensurately herewith.

TECHNICAL FIELD

Embodiments described herein generally relate to improvements in information-processing performance for machine-learning systems having numerous practical applications, such as image processing systems, complex data centers, self-driving vehicles, security systems, medical treatment systems, transaction systems, and the like. Certain embodiments relate particularly to artificial neural networks (ANNs).

BACKGROUND

Machine learning, deep learning in particular, is receiving more attention by researchers and system developers due its successful application to automated perception, such as machine vision, speech recognition, motion understanding, and automated control (e.g., autonomous motor vehicles, drones, and robots). Modern multi-layered neural networks have become the framework of choice for deep learning. Conventional neural networks are mostly based on the computational operations of real-number calculus.

Quaternion algebras, based on a multi-dimensional complex number representation, has drawn attention across digital signal processing applications (motion-tracking, image processing, and control) due to the significant reduction in parameters and in operations and more accurate physics representation (singularity-free rotations) compared to one-dimensional real or two-dimensional complex algebras. Because QT operations necessitate reconciliation across geometry, calculus, interpolation, and algebra, to date, quaternions have not been well adapted to deep multi-layered neural networks. There have been attempts to incorporate quaternions in machine-learning applications to make use of their desirable properties. However, those approaches either perform coordinate-wise real-valued gradient based learning, or entirely forgo training of hidden layers. Conventional coordinate-wise real-number calculus applied to quaternions fails to satisfy standard product or chain rules of calculus for quaternions, and tends to dissociate the relation between the non-scalar components of the quaternion. Consequently, pseudo-gradients are generated in place of quaternion differentials for encoding of error in the backpropagation algorithm.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
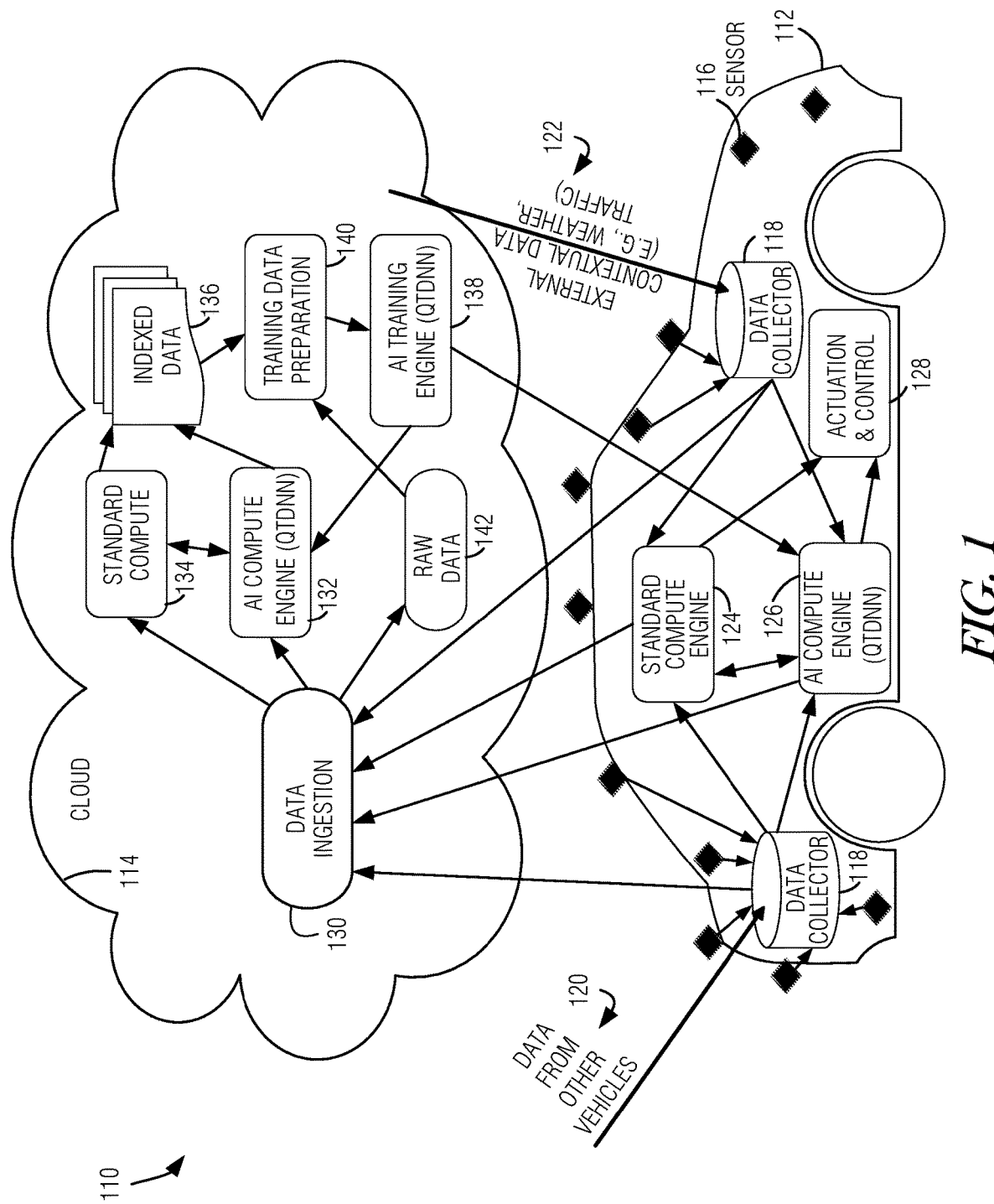
FIG. 1 is a system block diagram illustrating a distributed control system for an autonomous vehicle as an illustrative example of one of the applications in which aspects of the present subject matter may be implemented according to various embodiments.

Aspects of the embodiments are directed to automated machine-learning systems, components thereof, and methods of their operation. In the present context, a machine-learning system is a device, or tangible component of a device or greater computer system, that is constructed, programmed, or otherwise configured, to execute prediction and machine-learning-related operations based on input data. Examples of decision systems include, without limitation, association rule systems, artificial neural networks, deep neural networks, clustering systems, support vector machines, classification systems, and the like.

Input data may be situational data representing one or more states of a system, one or more occurrences of events, sensor output, imagery, telemetry signaling, one or more stochastic variables, or the like. In some embodiments, the situational data may include sensed data monitored by a sensor system, such as in a self-driving vehicle. In other embodiments, the sensed data may include monitored data from a data-processing system such as a data center, intrusion detection system, or the like.

Some aspects of the embodiments relate to improved neural network operation and training by adapting each neuron to store input, output, weighting, bias, and ground truth, values as n-dimensional quaternions, and to perform activation and related operations (e.g., convolution, rectified linear unit (ReLU) pooling, and inner product), as well as machine-learning operations (e.g., gradient-based training), using quaternion-specific computations. Specific embodiments described herein include computationally and representationally efficient structures and methods to implement computation of QT gradients and implementation in backpropagation for training QTDNNs.

Quaternions are a four-tuple complex representation of data with elegant properties such as being singularity free and representationally efficient, making them attractive for digital signal processing (DSP). More formally, a quaternion q may be defined as $q=q_0 1+q_1 i+q_2 j+q_3 k$, with quaternion basis $\{1,i,j,k\}$. The coefficient $q_0$, associated with basis element 1 is the scalar component of the quaternion, whereas the remaining coefficients comprise the imaginary components of the quaternion. Computationally, a quaternion can be represented as a 4 tuple, with three of them imaginary: QT: $A+i.B+j.C+k.D$, where the coefficients A, B, C, and D are real numbers. In various example implementations, the coefficients may be single-precision or double-precision real numbers. For the purposes of machine learning, lower precision may be adequate, providing computational efficiency while still providing practical accuracy. Also, in some embodiments, the coefficients may be integers, fixed or floating-point decimals, or complex numbers.

Notably, quaternion calculus according to aspects of the embodiments is not merely the application of co-ordinate-wise real number calculus along the four dimensions. Consistent quaternion (QT) computations, as will be detailed below, enable training of models that exploit richer geometric properties of quaternions such as invariance to rotation in space as well as color domain. QT computations with training further provides desirable properties such as fast convergence, better generalization capacity of the trained model, and data efficiency.

These properties facilitate training of digital signal processing systems (such as image recognition, speech-recognition, and many others) with better accuracy, computational efficiency, better generalization capability and desirable invariances (such as rotational invariance). Aspects of the embodiments may be applied in myriad implementations, including perception, mapping, planning, and end-to-end policy learning in fields such as autonomous vehicle control, among others.

FIG. 1 is a system block diagram illustrating a distributed control system 110 for an autonomous vehicle as an illustrative example of one of the applications in which aspects of the present subject matter may be implemented according to various embodiments. Notably, distributed control system 110 makes use of quaternion-based deep neural network (QTDNN) technology. Aspects of the embodiments may apply true, consistent, QT computation techniques.

As illustrated, system 110 is composed of a set of subsystems, components, circuits, modules, or engines, which for the sake of brevity and consistency are termed engines, although it will be understood that these terms may be used interchangeably. Engines may be realized in hardware, or in hardware controlled by software or firmware. As such, engines are tangible entities specially-purposed for performing specified operations and may be configured or arranged in a certain manner.

In an example, circuits may be arranged (e.g., internally or with respect to external entities such as other circuits) in a specified manner as an engine. In an example, the whole or part of one or more hardware processors may be configured by firmware or software (e.g., instructions, an application portion, or an application) as an engine that operates to perform specified operations. In an example, the software may reside on a machine-readable medium. In an example, the software, when executed by the underlying hardware of the engine, causes the hardware to perform the specified operations. Accordingly, an engine is physically constructed, or specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

System 110 is distributed among autonomous-driving car 112 and cloud service 114. Autonomous-driving car 112 includes an array of various types of sensors 116 such as cameras, global positioning system (GPS), radar and light detection and ranging (LiDAR) sensors. Data from these sensors are collected by one or more data collectors 118 (only some of the communicative connections are shown for the sake of clarity). Data collectors 118 may further obtain relevant data from other vehicles 120 (e.g., that a nearby car going to break or change lanes), as well as external contextual data 122 via a cloud application such as weather, congestion, construction zones, etc. Collected data 120, 122 is passed to compute engines 124, 126. Compute engine 124 is a standard compute engine that performs such basic operations as time synchronization of the various input signals, preprocessing or fusing of the sensor data, etc.). Compute engine 126 is an artificial-intelligence (AI) compute engine performs machine learning and control operations based on the sensor data and external data to interpret the car's environment and determine the actions to take, such as control of the throttle, braking, steering, signaling, etc.

AI compute engine 126 uses a QTDNN to perform perceptual tasks such as lane detection, pedestrian detection and recognition, drivable path segmentation, general obstacle and object detection and recognition with 2D or 3D bounding boxes and polyhedrals, scene recognition, tracking and trajectory estimation, for example. The QTDNN operations performed by AI compute engine 126 include machine learning operations that may be achieved via application of backpropagation techniques described in detail below. For example, the image data coming from the car's cameras are processed by a quaternion-based deep convolutional neural network implemented by AI compute engine 126 to detect cars, trucks, pedestrians, traffic lights, and motorbikes, etc., along with their bounding boxes.

Standard compute engine 124 and AI compute engine 126 may exchange data, such as the passing of preprocessed or aggregated sensor data from standard compute engine 124 to AI compute engine 126, and the passing of object detection output data from AI compute engine 126 to standard compute engine 124 for storage, output aggregation, statistical data collection, and the like. Outputs from standard compute engine 124 and AI compute engine 126 are passed to actuation and control engine 128 to generate output signaling to the electromechanical systems of autonomous-driving car 112 in order to navigate and avoid collision accordingly.

All or a subset of the data collected by one or more of data collectors 118, standard compute engine 124, and AI compute engine 126 of autonomous-driving car 112, may be passed to cloud 114 for storage or further analysis. Data ingestion engine 130 is configured to receive various data from autonomous-driving car 112 (or from multiple autonomous-driving cars), such as data from data collectors 118, standard compute engine 124, and AI compute engine 126.

Cloud AI Compute Engine 132 resides in cloud 114, and operates to create intelligent metadata that can be used for indexing, search, and retrieval. For example, the camera data (i.e. images, videos) may be processed by cloud AI Compute 132 engine to detect and recognize relevant objects (e.g. cars, trucks, pedestrians, bikes, road signs, traffic lights, trees, etc.). These determinations may be associated with other data, such as position, time, weather, environmental condition, etc., by standard compute engine 134, and stored as indexed data 136, which may include the intelligent metadata.

Cloud compute engine 132 is configured to implement QTDNNs which are trained via QT backpropagation techniques described below.

Notably, the in-vehicle QTDNN algorithms carried out by AI compute engine 126 in autonomous-driving car 112 may be substantially different from those carried out by AI compute engine 132 of cloud 114. For instance, the algorithms of cloud 114 may be more computationally intensive (e.g., more neural network layers, more frequent training, etc.) by virtue of the availability of greater computing power on the servers that make up cloud 114. In addition, these differences may also be attributable to the need for real-time or near-real-time computation in the moving autonomous-driving car 112.

In some embodiments, AI Compute Engine 126 and cloud AI compute engine 132 each implements a QTDNN that is trained using quaternion-based backpropagation methodology detailed below. In some examples, the QTDNN training is performed in cloud 114 by AI training engine 138. In some embodiments, AI training engine 138 uses one or more training QT-DNN algorithms based on labeled data that is in turn based on the ground truth, with the selection and labeling of the training data generally performed manually or semi-manually. Training data preparation engine 140 takes a subset of raw data 142 collected from the sensors and cameras in autonomous-driving car 112 and operates to obtain labels for the items of data (e.g., by humans) with various tags such as objects, scenes, segmentations etc. In a related embodiment, training data preparation engine 140 may take data indexed automatically by a labeling algorithm, and verified and curated by humans.

The training data produced by training data preparation engine 140 is used by AI training engine 138 to train AI compute engines 126 and 132. In general training involves having each QTDNN process successive items of training data, and for each item, comparing the output produced by the respective QTDNN against the label associated with the item of training data. The difference between the label value and the processing result is stored as part of a loss function (which may also be referred to as a cost function). A backpropagation operation is performed by AI training engine 138 to adjust parameters of each layer of the QTDNN to reduce the loss function.

Related aspects of the embodiments facilitate efficient implementation of the QT operations detailed below. Computations of gradients and backpropagation operations using the QT operations provide fast execution of the QTDNNs and updating of their parameters during training, as well as hyper-parameter tuning. In turn, the ability to train fully-QTDNNs faster, as facilitated by the techniques detailed in the present disclosure, allows more training experiments to be performed on large datasets with a greater number of model parameters, thereby enabling the development of more accurate models with better generalization and invariance properties. Moreover, the faster execution of the learned models according to various aspects of the embodiments enables these models to be deployed in time-critical or mandatory-real-time applications such as autonomous driving.

It will be understood that a suitable variety of implementations may be realized in which a machine-learning system is provided as one or more dedicated units, such as one or more application-specific integrated circuits (ASICs), one or more field-programmable gate arrays (FPGAs), or the like. Other implementations may include the configuration of a computing platform through the execution of program instructions. Notably, the computing platform may be one physical machine, or may be distributed among multiple physical machines, such as by role or function, or by process thread in the case of a cloud computing distributed model. In various embodiments, certain operations may run in virtual machines that in turn are executed on one or more physical machines. It will be understood by persons of skill in the art that features of the embodiments may be realized by a variety of different suitable machine implementations.

Figure 2:
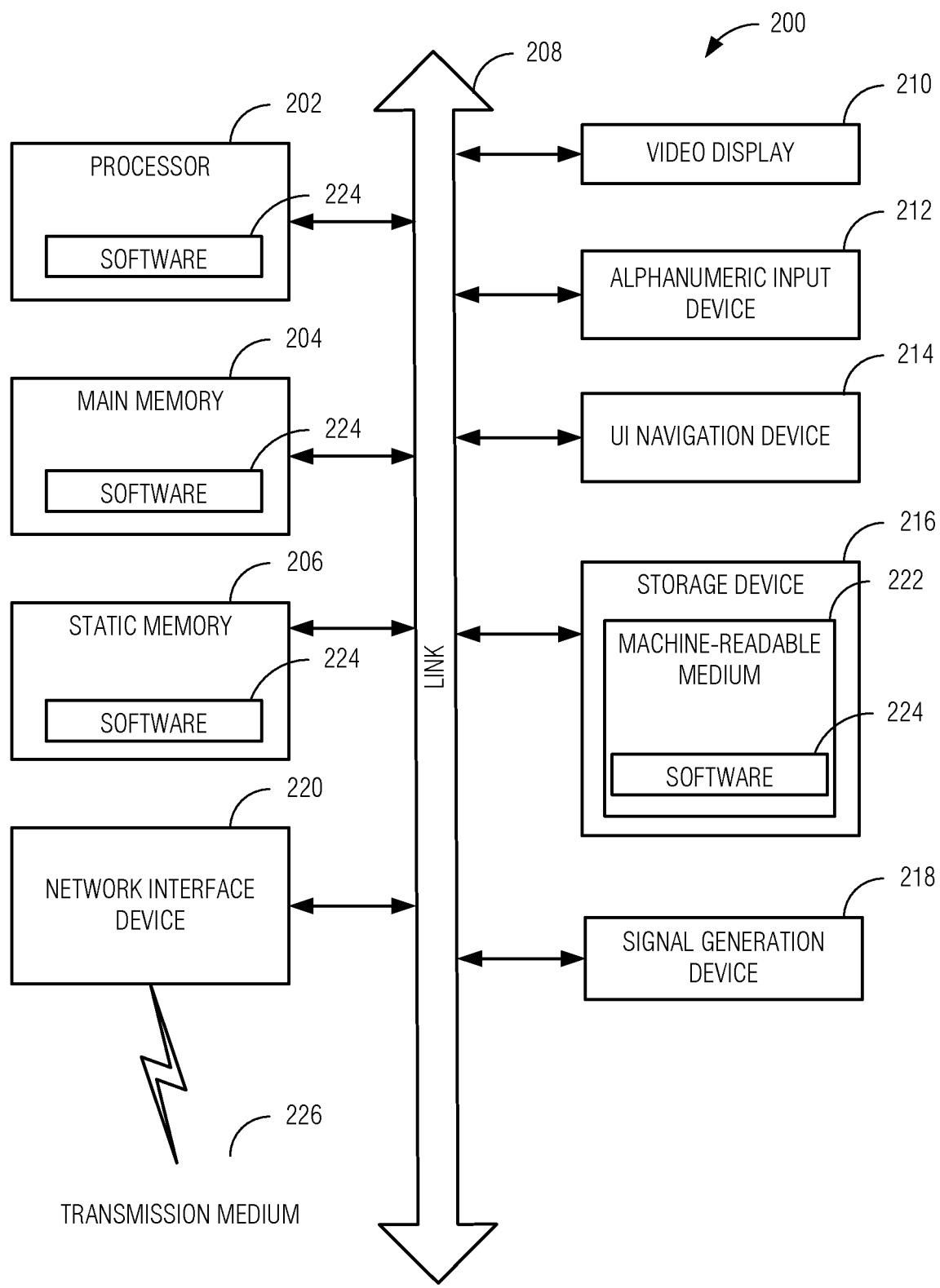
FIG. 2 is a block diagram illustrating a computer system in the example form of a general-purpose machine. In certain embodiments, programming of the computer system 200 according to one or more particular algorithms produces a special-purpose machine upon execution of that programming, to form a machine-learning engine such as an artificial neural network, among other subsystems.

FIG. 2 is a block diagram illustrating a computer system in the example form of a general-purpose machine. In certain embodiments, programming of the computer system 200 according to one or more particular algorithms produces a special-purpose machine upon execution of that programming, to form a machine-learning engine such as an artificial neural network, among other subsystems. In a networked deployment, the computer system may operate in the capacity of either a server or a client machine in server-client network environments, or it may act as a peer machine in peer-to-peer (or distributed) network environments.

Example computer system 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computer system 200 may further include a video display unit 210, an alphanumeric input device 212 (e.g., a keyboard), and a user interface (UI) navigation device 214 (e.g., a mouse). In one embodiment, the video display unit 210, input device 212 and UI navigation device 214 are incorporated into a touch screen display. The computer system 200 may additionally include a storage device 216 (e.g., a drive unit), a signal generation device 218 (e.g., a speaker), a network interface device (NID) 220, and one or more sensors (not shown), such as a global positioning system (GPS) sensor, compass, accelerometer, or other sensor.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computer system 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
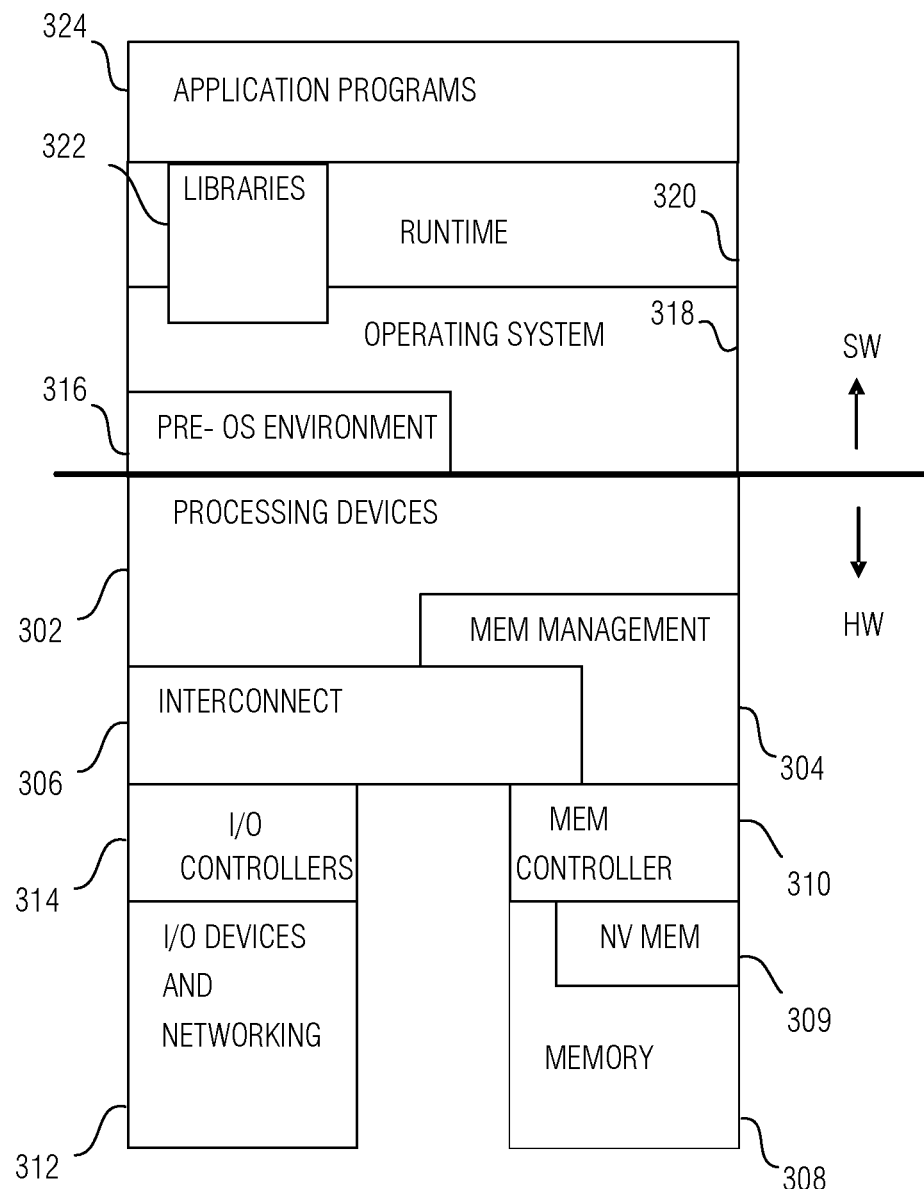
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory— EEPROM, NAND Flash, NOR Flash, etc.) are interfaced with memory management device 304 and interconnect 306 via memory controller 310. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
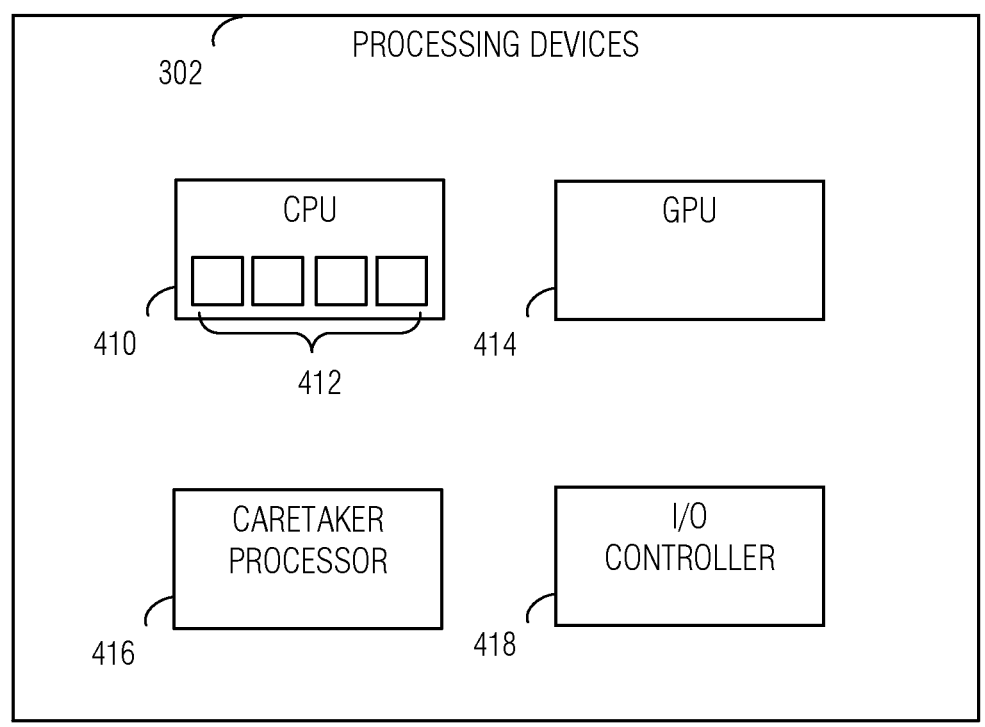
FIG. 4 is a block diagram illustrating processing devices according to some embodiments.

FIG. 4 is a block diagram illustrating processing devices 302 according to some embodiments. In one embodiment, two or more of processing devices 302 depicted are formed on a common semiconductor substrate. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be a x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in some embodiments. Caretaker processor 416 generally does not participate in the processing work to carry out software code as CPU 410 and GPU 414 do. In some embodiments, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computer system. In some embodiments, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 418 coordinates information flow between the various processing devices 410, 414, 416, as well as with external circuitry, such as a system interconnect.

Figure 5:
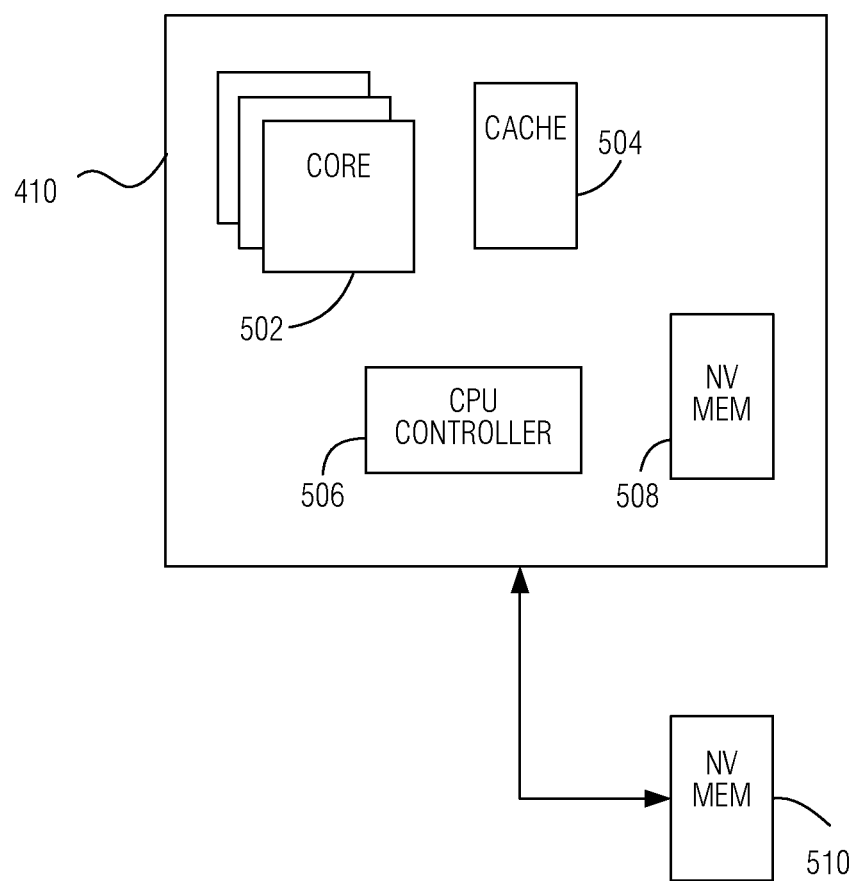
FIG. 5 is a block diagram illustrating example components of a CPU according to various embodiments.

FIG. 5 is a block diagram illustrating example components of CPU 410 according to various embodiments. As depicted, CPU 410 includes one or more cores 502, cache 504, and CPU controller 506, which coordinates interoperation and tasking of the core(s) 502, as well as providing an interface to facilitate data flow between the various internal components of CPU 410, and with external components such as a memory bus or system interconnect. In one embodiment, all of the example components of CPU 410 are formed on a common semiconductor substrate.

CPU 410 includes non-volatile memory 508 (e.g., flash, EEPROM, etc.) for storing certain portions of foundational code, such as an initialization engine, and microcode. Also, CPU 410 may be interfaced with an external (e.g., formed on a separate IC) non-volatile memory device 510 that stores foundational code that is launched by the initialization engine, such as system BIOS or UEFI code.

Figure 6:
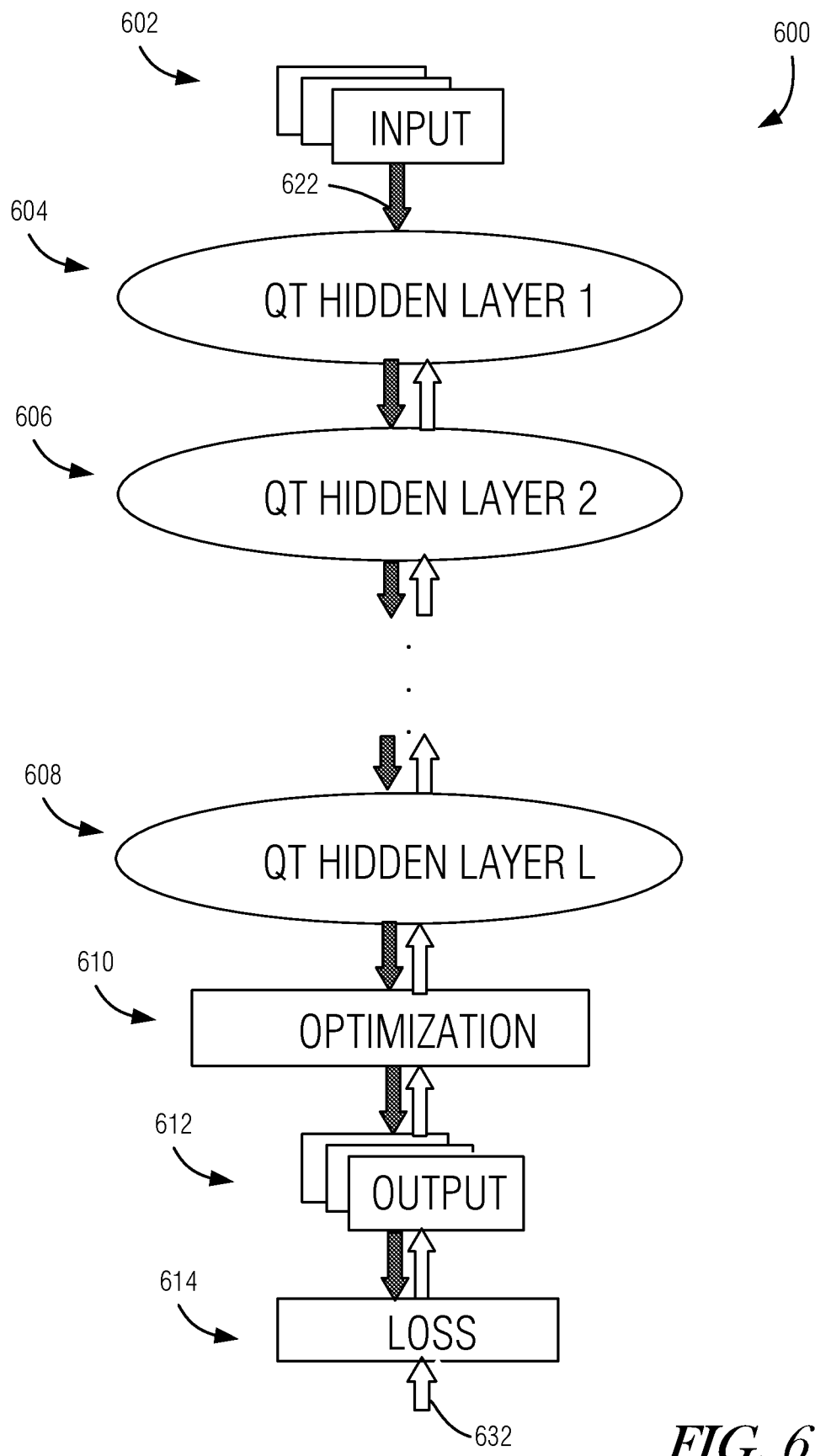
FIG. 6 is a high-level diagram illustrating an example structure of quaternion deep neural network architecture with which aspects of the embodiments may be utilized.

FIG. 6 is a high-level diagram illustrating an example structure of deep neural network architecture with which aspects of the embodiments may be utilized. Deep neural network 600 is a QTDNN containing input layer 602, output layer 612, and a plurality of hidden layers that include QT hidden layer 1 indicated at 604, QT hidden layer 2 indicated at 606 and, optionally, additional QT hidden layers (up to L) as indicated at 608. Input layer 602 accepts an input signal represented using quaternion values. An example of an input signal is image data (e.g., a bitmap with red/green/blue (RGB) channels for each pixel). Input layer 602 may process the input signal by applying weights to portions of the input signal, for instance. The operations performed by input layer 602 may be QT operations (e.g., QT addition and non-commutative QT multiplication).

Hidden layers 604-608 may vary in structure from one another. In general, each hidden layer may include a group of sublayers to perform partition and selection operations, as well as QT operations, such as QT convolution, QT inner product, QT non-linear activations, and QT sampling operations.

To perform classification, deep neural network 600 facilitates propagation of forward-propagating signal 622 through the layers, from input layer 602, to output layer 612, performing QT operations by the various layers and sublayers. Deep neural network 600 is trained by a backpropagation algorithm that proceeds in backward-propagating direction 632, performing QT gradient operations by the various layers and sublayers.

Figure 7:
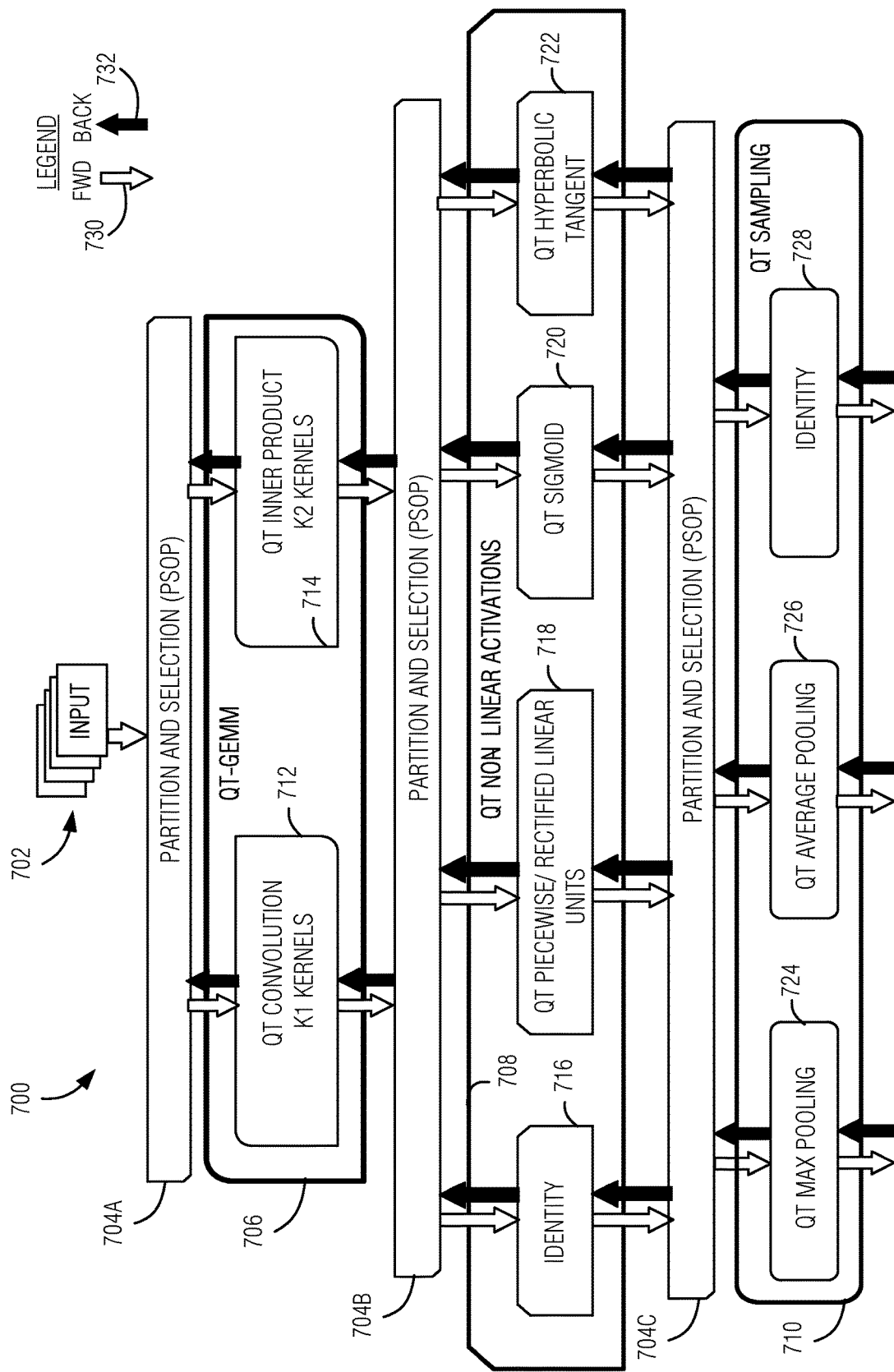
FIG. 7 is a block diagram illustrating an example of a structure for a hidden layer, and types of sublayers according to various embodiments.

FIG. 7 is a block diagram illustrating an example of a structure for a hidden layer such as hidden layer 604-608, and types of sublayers according to various embodiments. As depicted, modular hidden layer 700 receives input 702, which may be an image or output signal from a prior layer, is propagated in forward direction 730 as shown by the downward-facing arrows, though the sublayers. The forward-propagating signal may be a set of feature maps with varying size and dimensionality resulting from processing by the various sublayers.

In some examples, as illustrated, modular hidden layer 700 includes partition and selection operations (PSOP) sublayers 704A, 704B, 704C, each of which operates to steer the forward-propagating signal to a selected computation engine of the next sublayer. For instance, as an input to QT general matrix multiplication (QT-GEMM) sublayer 706, the forward-propagating signal may be steered to QT convolution engine 712, QT inner product engine 714, or to a combination of these engines, by PSOP sublayer 704A. Similarly, PSOP sublayer 704B may steer the forward-propagating signal to a non-linear activation engine from among those in QT non-linear activations sublayer 708, namely, identity (e.g., pass-through) block 716, QT piecewise/rectified linear units 718, QT sigmoid engine 720, or QT hyperbolic tangent engine 722. PSOP sublayer 704C may likewise steer the forward-propagating signal to QT sampling sublayer 710, and select one or more of QT max pooling engine 724, QT average pooling engine 726, or identity (e.g., pass-through) block 728.

In a related aspect, each PSOP sublayer 704 accepts a set of values, either direct input signals or from the output of a previous operation, and prepares it for the next operation. The preparation involves partitioning of the data and selection the next set of operations. This partition and selection does not need to be mutually exclusive and can be an empty selection as well. For example, if the images are to only go through QT convolution engine 712 in the first hidden layer and not through QT inner product engine 714, then PSOP 704A selects the whole data as a first partition to go through QT convolution engine 712, and empty data as a second partition to go through the QT inner product engine 714.

In a related example, PSOP 704A partitions or duplicates the data into portions to be directed to different kernels of a given QT computation operation. For instance, an input signal may be duplicated to different kernels of QT convolution engine, with the different kernels having differing variable parameter values, or differing filter content. In a related example, an input signal may be split into a first portion and a second portion, and the different portions directed to the different kernels for QT convolution processing.

In another related embodiment, each PSOP sublayer may be dynamically adjusted to vary the data-partitioning operations, the QT computation engine selection operations, or both. Adjustment may be made by a QTDNN training engine, such as AI training engine 138 (FIG. 1) carrying out a machine-learning process such as the process described below with reference to FIG. 14, for example.

The various hidden layers 604-608 may thus be composed of a convolution engine 712, an inner product engine 714, a non-linear activation operational block, or bypass, of sublayer 708, and a sampling operational block, or bypass, of sublayer 710. Each engine or operational block within a given hidden layer may have a same, or a different, size or structure from a similar type of engine of a different hidden layer. For example, QT convolution engine 712 may have a layer-specific number of kernels (e.g., convolution matrices), dimensionality, weighting, bias, or other variable parameters.

In an example, QT-GEMM sublayer 706 selectively applies a linear operation on the whole or a subset of the input. It may include a set of convolution operations and inner product operations in the quaternion domain. Notably, the QT convolution operations performed by QT convolution engine 712 may ensure spatial translational invariance. The output from QT-GEMM sublayer 706 proceeds through PSOP sublayer 704B to prepare for the next set of operations.

In a related example, the QT inner product is utilized to build a QT operation for generalized matrix multiplication by using the fact that each output entry in the result of a matrix multiplication is a result of an inner product between a row vector and a column vector. These operations are exemplified in the code portions provided in Appendix 1, namely, in routines qtmatmul, qtvec2matmult, qtdotprod, and the base QT operations of addition and multiplication.

QT non-linear activations sublayer 708 allows the network to approximate potentially any function or transformation on the input. As depicted, there are a variety of choices of non-linear activations according to various embodiments, and QT non-linear activations sublayer 708 may apply one or more of them and their composition.

In an embodiment, QT-ReLU 718 performs the operation of a rectified linear unit, particularized to quaternions. In general, for a given quaternion, the output of QT-ReLU 718 is the the quaternion value itself, so long as each of the real and imaginary units is a positive real number; everywhere else, the QT-ReLU 718 returns a zero quaternion value. In related embodiments, sigmoid and hyperbolic tangent functions directly applied to the input quaternion and not via the coordinate-wise operation. The output from QT non-linear activations sublayer 708 further passes through PSOP sublayer 704C to prepare for the next set of operations in QT sampling sublayer 710 depending on the type of sampling procedure.

QTDNNs according to aspects of the embodiments provide various levels of abstraction at various level of granularity and the QT sampling sublayer 710 is specifically adapted to enable that. In various examples, the sampling involves pooling operations to be performed by QT max pooling engine 724, QT average pooling engine 726, or a combination thereof, in a given window around each point in the input.

As these examples demonstrate, a QT hidden layer primarily executes a set of linear QT operations, followed by a set of non-linear QT operations, followed by QT sampling operations, all performed with consistent quaternion algebra, on specifically-selected partitions of quaternion-valued inputs to each sublayer.

According to embodiments, replicating the structure of the QT hidden layer depicted in the example of FIG. 7, with architectural variation in the number of layers, input and output format, and the choice of PSOP routing at each sublayer, facilitates construction and implementation of a variety of QTDNNs.

Referring again to the example deep neural network architecture depicted in FIG. 6, the output of hidden layer 608 may be optionally propagated to optimization layer 610. Examples of optimization engines include a normalization engine, an equalization engine, or the like. A normalization engine may expand the dynamic range of the contrast, for example. An example equalization engine may operate to adjust the image to contain an equal or comparable quantity of pixels at each intensity level. Optimization layer 610 propagates the signal to output layer 612, which may be a fully-connected layer, for example. The ultimate output, or QTDNN result, may be in various output formats (e.g., quaternion-valued or real-valued) depending on the application. Such formats may include, for example, a set of object or scene class labels and respective confidence score, bounding boxes of the objects detected, semantic labels for each pixel in the image, and a set of images synthesized by this network.

In training the deep neural network architecture, loss function 614, (which may also be referred to as a cost function), and represents the error between the output and the ground truth, is used to compute the descent gradient through the layers to minimize the loss function. Consistent quaternion computations to produce QT partial derivatives of loss function 614 with respect to the variable parameters of the various layers are carried out accordingly at the QT convolution and QT inner product sublayers 706, QT non-linear activation sublayers 708, and QT sampling sublayers 710.

Training may be performed periodically or occasionally. In general, training involves providing a QT training pattern as input 702, and propagating the training patter through the QT deep neural network in forward direction 730, and backward direction 732, along with operations to tune various parameters of the sublayers. According to aspects of the embodiments, the training operations implement QT computations that preserve and utilize the properties of quaternion values.

In each training epoch, for each training pattern, forward path 730 is traversed sublayer-by-sublayer, starting from input 702 and advancing to the output from QT sampling sublayer 710. There may be one or more additional modular hidden layers 700, through which forward path 730 would extend, for example, as part of forward path 622 to produce output 612 and loss function 614. Subsequently, loss function 614 is propagated backward through the network 600, layer by layer, propagating the error and adjusting weights. In modular hidden layer 700, the back propagation is shown as backward flow direction 732, which may be considered as part of backward flow direction 632.

In modular hidden layer 700, as part of the backpropagation operation, PSOP sublayers 704A, 704B, 704C operate to re-assign the respective QT partial derivatives. For example, if an input variable $x_i$ is mapped to $x_{i1}$ by PSOP layer 704C, then the QT partial derivative of any function with respect to $x_i$ is equal to the QT partial derivative of that function with respect to $x_{i1}$. If an input is discarded by PSOP 704C, the QT partial derivative of any function with respect to this input is assigned a value of zero. If an input $x_i$ is replicated to K values $x_{i1}, x_{i2}, \ldots, x_{iK}$ then the QT partial derivative of any function with respect to $x_i$ is the sum of the QT partial derivatives of that function with respect to $x_{i1}, x_{i2}, \ldots, x_{iK}$.

Notably, in the QT computations for computing QT gradients and partial derivatives according to aspects of the embodiments, for every variable there are four partial derivatives. These four partial derivatives correspond to the orthogonal basis for quaternions, such as the anti-involutions.

Referring again to FIG. 6, in carrying out backpropagation, the QT partial derivatives of loss function 614 with respect to the variable parameters are computed. These QT partial derivatives are then propagated through each hidden layer in backward direction 632. Note that at each layer, QT partial derivative computation also uses the input values to the operations where backpropagation is being performed. At the end of the QT backpropagation through the entire network, the process will have computed QT gradients of loss function 614 with respect to all the parameters of the model at each operation in the network. These gradients are used to adjust one or more of the variable parameters during the training phase.

To facilitate efficient implementation of the QTDNN architecture and operations, aspects of the embodiments are directed to efficient QT representation. For example, all inputs, outputs, and the model parameters (e.g., propagating signal values, or images, for instance) are encoded as quaternions. These quantities may be computationally represented and stored as tensors of various shapes in quaternion space. Multiple different approaches for providing efficient quaternion representations and operations are contemplated according to various embodiments.

According to one such embodiment, a native datatype for quaternion values is constructed, along with a library of QT operations such as addition, multiplication, exponentiation, etc. Such operations may be executed efficiently in software running on a hardware platform, such as a suitable hardware platform as described above with reference to FIGS. 2-5. In a related embodiment, optimized compilers are deployed to translate the QT software libraries into efficient hardware instructions.

According to another embodiment, QT data types and QT operations may be represented and processed in programmable hardware, such as in a field-programmable gate array (FPGA) circuit, or in an application-specific integrated circuit (ASIC), for example, having circuitry optimized for storage and processing of quaternion values and operations, respectively.

Referring to the example modular hidden layer 700 of FIG. 7, the arrangement of sublayers 704A-710 may be instantiated in software-controlled hardware, or as hardware circuitry, with the arrangement being repeated and interconnected in sequence, to produce a series of hidden layers of a QTDNN. PSOP sublayers 704 of the various instances of modular hidden layer 700 may selectively configure their respective sublayers with various different operational blocks or engines enabled, disabled, or combined. In related embodiments, as described in greater detail below, the configurations of sublayers may be varied in response to training of the QTDNN.

In various embodiments, quaternion values may be encoded using data types based on real-numbers. For example, a real-valued 4-tuple $(q_0, q_1, q_2, q_3)$, a real-valued 1×4 array $[q_0\ q_1\ q_2\ q_3]$, a real-valued 4×1 array $[q_0\ q_1\ q_2\ q_3]^T$, or, a 1-dimensional real-valued tensor of shape [,4] or [4,] may be used. In addition, a native encoding using a "qfloat" data type may be employed.

In embodiments where quaternion values are represented as a tensor of real components, QT operations may be effectively implemented as real-valued tensor operations.

As stated above, according to various aspects, the training of deep neural network 600 is performed using consistent QT operations. Once neural network 600 is trained, it can be applied to new test data sets (e.g. images) to generate a set of outputs (e.g. new images, semantic labels, class labels and confidence scores, bounding boxes, etc.).

As an illustrative example, for a quaternion q (defined as $q=q_0 1+q_1\ i+q_2\ j+q_3\ k$, with quaternion basis $\{1,i,j,k\}$), the coefficient cm associated with basis element 1 is the scalar component of the quaternion, whereas the remaining coefficients comprise the imaginary components of the quaternion. For quaternion q and with µ, with µ≠0, a 3-dimensional rotation of Im(q) by angle 2θ about Im(µ) is defined as $q^\mu$: $\mu q \mu^{-1}$, where $$\theta = \cos^{-1}\left(\frac{Sc(\mu)}{|\mu|}\right).$$

Here, Im(q) returns the imaginary component of quaternion q, which corresponds to a look-up into q's data register. Sc(q) returns the scalar component (sometimes called the real component) of quaternion q, which corresponds to a look-up into q's data register.

The norm of quaternion q is $\|q\|^2 = qq^* = q^*q = q_0^2 + q_1^2 + q_2^2 + q_3^2$. It should be noted that the operations Sc(q) and $\|q\|^2$ return scalar (real) values.

When µ is a pure unit quaternion, $q^\mu$ is an (anti) involution with $g^\mu$: $=-\mu q\mu$. And, in particular, $g^i, q^j, q^k$, are all (anti) involutions, so that $g^i=-iqi, qi=-jqj, q^k=-kqk$.

The QT conjugate of a quaternion $q=q_0\ 1+q_1\ i+q_2\ j+q_3\ k$ is $q^*=q_0\ 1-q_1\ i-q_2\ j-q_3\ k$. Notably, all imaginary values are negated, which corresponds to a simple sign bit change to the imaginary components in the quaternion data register or applying a negation on the Im(q) operation. In the present disclosure, unless otherwise mentioned explicitly, all operations (multiplication, addition, etc.) are QT operations. The notations ⊕ and ⊗ are used redundantly at times as enforcement reminders to make clear that consistent quaternion algebraic addition and non-commutative quaternion algebraic multiplication operations are respectively carried out.

Some embodiments utilize Generalized Hamilton Real (GHR) calculus. The left GHR derivatives, of f(q) with respect to $q^\mu$ and $q^{\mu*}$, are defined as follows with $q=g_0 1+q_1\ i+q_2\ j+q_3\ k$, as:

$$\frac{\partial f}{\partial q^\mu} = \frac{1}{4}\left(\frac{\partial f}{\partial q_0} - \frac{\partial f}{\partial q_1}i^\mu - \frac{\partial f}{\partial q_2}j^\mu - \frac{\partial f}{\partial q_3}k^\mu\right) \qquad \text{Eq. 1A}$$

and $$\frac{\partial f}{\partial q^{\mu*}} = \frac{1}{4}\left(\frac{\partial f}{\partial q_0} + \frac{\partial f}{\partial q_1}i^\mu + \frac{\partial f}{\partial q_2}j^\mu + \frac{\partial f}{\partial q_3}k^\mu\right), \qquad \text{Eq. 1B}$$

where µ is a non-zero quaternion and the four partial derivatives of f, on the right side of the equations, are:

taken with respect to the components of q, that is, of $q_0$, $q_1$, $q_2$, $q_3$ respectively; and
quaternion-valued;
wherein the set $\{1, i^\mu, j^\mu, k^\mu\}$ is a general orthogonal basis for the quaternion space.

Note that the left-hand-side GHR derivatives are not merely defined as coordinate-wise real-valued derivatives, but are a rich composition of the partial derivatives in the quaternion domain along an orthogonal basis. In general, for every function of a quaternion, there are four partial derivatives, each one associated with a component of the orthogonal basis.

With the above definition, the usual rules of calculus such as product rule and chain rule are extended to the quaternion domain. In particular, the QT chain rule may be written as:

$$\frac{\partial f(g(q))}{\partial q^\mu} = \sum_{v \in \{1,i,j,k\}} \frac{\partial f}{\partial g^v} \frac{\partial g^v}{\partial q^\mu} \qquad \text{Eq. 2A}$$

$$\frac{\partial f(g(q))}{\partial q^{\mu*}} = \sum_{v \in \{1,i,j,k\}} \frac{\partial f}{\partial g^v} \frac{\partial g^v}{\partial q^{\mu*}} \qquad \text{Eq. 2B}$$

In general, the QT chain rule can be applied with respect to any orthogonal basis of quaternion space. Here, the basis $\{1,i,j,k\}$ may be selected for notational simplicity. Notably, a QT application of the chain rule according to embodiments involves the use of a partial derivative with respect to a QT conjugate q*, and contemplates values of v other than 1.

Some aspects of the embodiments, recognize that, in quaternion optimization, the derivatives with respect to QT conjugates may be more important than the corresponding quaternion itself. One feature of GHR calculus is that the gradient of a real-valued scalar function f with respect to a quaternion vector (tensor) q is equal to:

$$\nabla_{q^*} f = \left(\frac{\partial f}{\partial q^*}\right)^T, \text{ not } \nabla_q f \qquad \text{Eq. 3}$$

Thus, the gradient of f is computed using partial derivatives with respect to QT conjugates of the variables, and not the quaternion variables themselves.

Specifically, in applying the backpropagation algorithm, the partial derivatives to be used are computed using QT conjugate partial derivatives along an orthogonal basis of the quaternion space.

Backpropagation through an operation in the present context means that, given the partial derivatives of the loss function with respect to the output of the operation, the partial derivatives are computed with respect to the inputs and the parameters of the operation.

Figure 8:
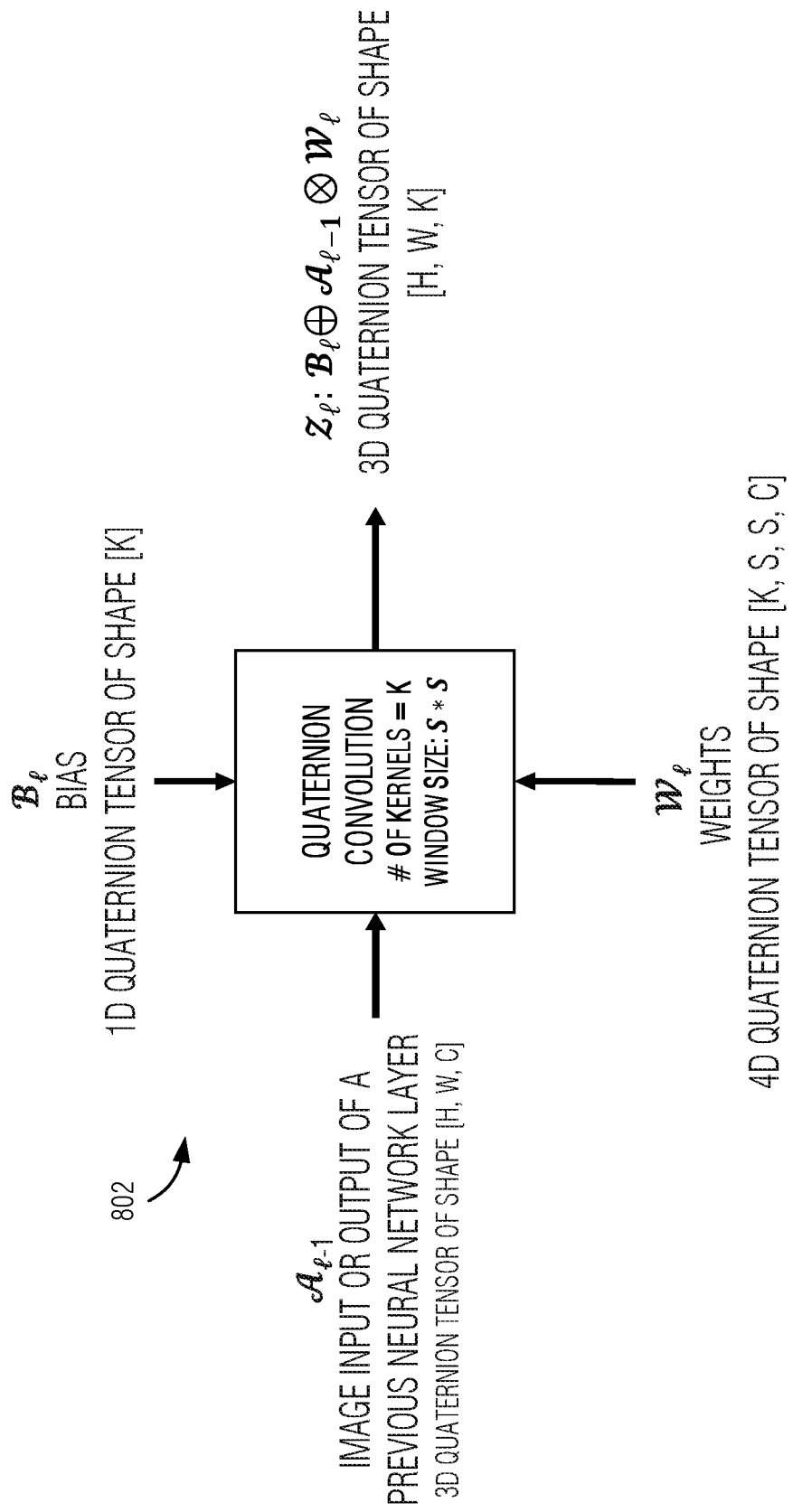
FIG. 8 is a diagram illustrating a quaternion (QT) convolution sublayer as an illustrative example of a convolution engine.

FIG. 8 is a diagram illustrating a QT convolution sublayer 802, as an illustrative example of convolution engine 712. Input signal $\mathcal{A}$ (which may be an image, feature map, time series, etc.) and filter $\mathcal{W}$ are represented as N-dimensional and S-dimensional quaternion vectors, respectively. If these inputs are based on non-quaternion values, they are first transformed into quaternion values. The 1D convolution of the filter $\mathcal{W}$ with $\mathcal{A}$ over a sliding window of size $S$ is computed as the QT sum of the QT multiplication of each coordinate x of the filter $\mathcal{W}$ by the corresponding shifted coordinate x+sx of the input $\mathcal{A}$.

For input signal $\mathcal{A}$ and filter $\mathcal{W}$ as quaternion-valued vectors of size N and S, respectively, an unbiased one-dimensional (1D) QT convolution with a right filter may be expressed as in Equation 4A as follows:

$$\mathcal{Z}_x^{conv} = \sum_{sx \in \{0,1,\ldots,S-1\}}^{\oplus} \mathcal{A}_{x+sx} \otimes \mathcal{W}_{sx} \qquad \text{Eq. 4A}$$

where $\oplus$ and $\otimes$ are QT addition and QT multiplication, respectively, and $\mathcal{Z}_x^{conv}$ denotes the $x^{th}$ term in the output after QT convolution Because QT multiplication is not commutative, switching the order of multiplier and multiplicand in Equation 4A provides a convolution with a left filter as in Equation 4B:

$$\mathcal{Z}_x^{conv} = \Sigma_{sx \in \{0,1,\ldots,S-1\}} \mathcal{W}_{sx} \otimes \mathcal{A}_{x+sx} \qquad \text{Eq. 4B}$$

Hereinafter, for the sake of brevity, operations based on right filters are described. However, it will be understood that various other embodiments contemplate QT operations based on left filters. The following pseudocode embodies an example algorithm to produce a general unbiased 1D QT convolution:

---
Given:
Quaternion-valued signal $\mathcal{A}$, quaternion-valued filter or kernel $\mathcal{W}$;
Integer N representing the dimension of the signal $\mathcal{A}$;
Integer S representing the dimension of filter $\mathcal{W}$;
And, use QT addition $\oplus$ and QT multiplication $\otimes$:
Initialize: $\mathcal{Z}^{conv}$
For: x = 0, ... , N − 1
  For: sx = 0, ... , S − 1
    $\mathcal{Z}_x^{conv} \leftarrow \mathcal{Z}_x^{conv} \oplus (\mathcal{A}\text{ x+sx} \otimes \mathcal{W}_{sx})$
Return: $\mathcal{Z}^{conv}$

---

A quaternion-valued bias term may be added to Equation 4A to obtain a biased 1D QT convolution that is amenable to usage in a neural network:

$$\mathcal{Z}_x^{conv} = B \oplus (\Sigma_{sx \in \{0,1,\ldots,S-1\}} \mathcal{A}_{x+sx} \otimes \mathcal{W}_{sx}) \qquad \text{Eq. 4C}$$

where $\oplus$ and $\otimes$ are QT addition and QT multiplication, respectively, and $\mathcal{Z}_x^{conv}$ denotes the $x^{th}$ coordinate (index) of the output after QT convolution.

The following pseudocode embodies an example algorithm to produce a General Biased 1D QT convolution ---
Given:
Quaternion-valued signal $\mathcal{A}$, Quaternion-valued filter $\mathcal{W}$, quaternion-valued bias $\mathcal{B}$;
Integer N, the dimension of the signal $\mathcal{A}$;
Integer S, the dimension of filter $\mathcal{W}$;
Using QT addition $\oplus$ and QT multiplication $\otimes$:
Initialize: $\mathcal{Z}^{conv}$
For: x = 0, ... , N − 1
  For: sx = 0, ..., S − 1
    $\mathcal{Z}_x^{conv} \leftarrow \mathcal{Z}_x^{conv} \oplus (\mathcal{A}_{x+sx} \otimes \mathcal{W}_{sx})$
$Z^{conv} \leftarrow \mathcal{B} \oplus Z^{conv}$
Return: $\mathcal{Z}^{conv}$

---

Similarly, a 2D convolution of a grayscale input image $\mathcal{A}$ (with height H, width W) with a filter/kernel (of window size S) and an additive bias is computed as:

$$\mathcal{Z}_{y,x}^{conv} = \mathcal{B} \oplus (\Sigma_{sy,sx \in \{0,1,\ldots,S-1\}} \mathcal{A}_{y+sy,x+sx} \otimes \mathcal{W}_{sy,sx}) \qquad \text{Eq. 4D}$$

Where indices (y,x) correspond to the pixel indices of the input H-pixels-by-W-pixels image. One reason that Equation 4D is appropriate for an input grayscale image is that the image only has one channel to represent the range from white to black.

In a related embodiment, the QT multiplication is replaced by a QT geometric product.

The following pseudocode embodies an example algorithm to produce a general biased 2D QT convolution for a grayscale image:

---

Given:
Quaternion-valued signals $\mathcal{A}$ of a grayscale image, Quaternion-valued filter $\mathcal{W}$, Quaternion-valued bias $\mathcal{B}$.
Integer $W = N_x$, the x-dimension of the signal $\mathcal{A}$;
Integer $H = N_y$, the y-dimension of the signal $\mathcal{A}$;
Integer S, the dimension of filter $\mathcal{W}$ (it will have a size S*S);
Using QT addition $\oplus$ and QT multiplication $\otimes$:
Initialize: Output $\mathcal{Z}^{conv}$
For: $x = 0, \ldots, N_x - 1$
　For: $y = 0, \ldots, N_y - 1$
　　For: $sx = 0, \ldots, S - 1$
　　　For: $sy = 0, \ldots, S - 1$
　　　　$\mathcal{Z}_{y,x}^{conv} \leftarrow \mathcal{Z}_{y,x}^{conv} \oplus (\mathcal{A}_{y+sy,x+sx} \otimes \mathcal{W}_{sy,sx})$
$\mathcal{Z}^{conv} \leftarrow \mathcal{B} \oplus \mathcal{Z}^{conv}$
Return: $\mathcal{Z}^{conv}$

---

In other types of images, there are usually additional channels. For instance, a red-green-blue (RGB) color image has 3 channels. One particular pixel may have a different value in each of its channels. Thus, Equation 4A may be generalized to process these types of images as follows.

Notably, use of a single channel with quaternion values is not necessarily limited to representing grayscale images. In some embodiments, an RGB image may be encoded using a single channel with quaternion values (e.g. R, G, B as three imaginary components of a quaternion, respectively. In the context of QT convolution, more than one channel may be used to facilitate operational structures in which the hidden layers of the QTDNN have more than one channel.

A 2D convolution of an input image (with height H, width W, and C channels) with a filter/kernel (of window size S) and an additive bias may computed as:

$$\mathcal{Z}_{y,x}^{conv} = \mathcal{B} \oplus \left( \bigoplus_{sy,sx \in \{0,1,\ldots,S-1\}, c \in \{0,1,\ldots,C-1\}} \mathcal{A}_{y+sy,x+sx,c} \otimes \mathcal{W}_{sy,sx,c} \right) \quad \text{Eq. 4E}$$

Where indices (y,x) correspond to the pixel indices of the input H-pixels-by-W-pixels image. Here, the pixel (y,x) may have a different value for each of its C channels. Thus, in equation 4E, the convolution summation will be taken across the C channels. In a related embodiment, the QT multiplication $\oplus$ is replaced by a QT geometric product.

The following pseudocode embodies an example algorithm to produce a general biased 2D QT convolution:

---

Given:
Quaternion-valued signals $\{\mathcal{A}_c\}_{\{c=0,\ldots,C-1\}}$,
Quaternion-valued filter $\mathcal{W}$,
Quaternion-valued bias $\mathcal{B}$.
Integer C, the number of channels of input signal;
Integer $W = N_x$, the x-dimension of the signal $\mathcal{A}$;
Integer $H = N_y$, the y-dimension of the signal $\mathcal{A}$;
Integer S, the dimension of filter $\mathcal{W}$ (it will have a size S*S);
Using QT addition $\oplus$ and QT multiplication $\otimes$:
Initialize: $\mathcal{Z}^{conv}$
For: $c = 0, \ldots, C - 1$
　For: $x = 0, \ldots, N_x - 1$
　　For: $y = 0, \ldots, N_y - 1$
　　　For: $sx = 0, \ldots, S - 1$
　　　　For: $sy = 0, \ldots, S - 1$
　　　　　$\mathcal{Z}_{y,x}^{conv} \leftarrow \mathcal{Z}_{y,x}^{conv} \oplus (\mathcal{A}_{y+sy,x+sx,c} \otimes \mathcal{W}_{sy,sx,c})$
$\mathcal{Z}^{conv} \leftarrow \mathcal{B} \oplus \mathcal{Z}^{conv}$
Return: $\mathcal{Z}^{conv}$

---

In a related example, the sequential order of the for-loops is changed to produce a type of embodiment in which the ordering may be optimized for read/load and compute efficiency in a computer architecture.

In related embodiments, the 2D image is represented as a 3D quaternion tensor of size H*W*C. For instance, an RGB image that is 32 pixels by 32 pixels has H=32, W=32, C=3; a grayscale image that is 32-pixels×32z-pixels has H=32, W=32, C=1. Each pixel in the 2D image has coordinates or indices (y,x). A regular (square) sliding-window of dimension S=3 can be represented as a quaternion 3D tensor of size S*S*C.

In the above examples, ID and 2D convolution operations are described; however, it will be understood that the convolution operation may be extended to higher-dimensional quaternion tensors of any practical size.

Further, this QT convolution operation may be used to form a neural network convolution layer by combining one or more kernels or filters (e.g., weights $\mathcal{W}$'s and biases $\mathcal{B}$'s) as depicted in FIG. 8. In this example, which may be applicable for machine-vision applications, a 2D convolution of an input image (our output from a prior layer of a deep neural network) having a height H, a width W, and C channels, is convolved with a filter/kernel having a widow size S.

To compute the output of the QT convolution block, let l refer to the layer number, so that, given the input $\mathcal{A}_{l-1}$, weights $\mathcal{W}_l$, and bias $\mathcal{B}_l$, the output $\mathcal{Z}_l$ is computed as follows:

$$\mathcal{Z}_{l,y,x,k} = \mathcal{B}_{l,k} \oplus \bigoplus_{sy,sx \in \{0,1,\ldots,S-1\}, c \in \{0,1,\ldots,C-1\}} \mathcal{A}_{l-1,y+sy,x+sx,c} \otimes \mathcal{W}_{l,k,y} \quad \text{Eq. 4F}$$

In Equation 4F, $\mathcal{Z}_{l,y,x,k}$ is the $k^{th}$ output in layer l, $\mathcal{B}_{l,k}$ is the $k^{th}$ bias in layer l. In practice, all the quantities may be computed for a mini batch of images, but for notational convenience the index for the mini-batches is dropped. Equation 4F represents QT convolution operation with K kernels, in layer l of a neural network, of window size S*S that are used to define a 2D convolution layer on images or intermediate feature maps. The input signal $\mathcal{A}$ thus corresponds to either input images or feature maps output by previous neural layers in the deep neural network. Further, note that the K kernels may have different window sizes as well as different heights and widths in general. For example, to facilitate bookkeeping, window sizes may be denoted by $S_k$ for regular (square) window sizes, or as a look-up table or matrix of the different (H's,W's) for each kernel or within a tensor implementation.

The corresponding convolution operation associated with FIG. 8, computing the convolution of the input signals (the output from the previous layer) with the K filters (the weights corresponding to the contributing signals) and the addition of a bias to each of the K resultant feature maps produce the convolution output, as described by $\mathcal{Z}_{l,y,x,k}$ in Equation 4F.

The following pseudocode embodies an example algorithm to produce a general 2D QT convolution in a neural network.

---

Given:
Quaternion-valued signals $\mathcal{A}_{\ell-1}$ from the previous layer $\ell - 1$
Quaternion-valued filters $\mathcal{W}_{\ell,k}$, that will be applied at the current layer $\ell$;
Quaternion-valued biases $\mathcal{B}_{\ell,k}$, that will be applied at the current layer $\ell$ to
the final outcome form the $k^{th}$ filter;
Integer $K_\ell$, the total number of kernals in layer $\ell$;
Integer $N_{\ell-1,x}$, the (width) x-dimension of the input signal $\mathcal{A}$ from the previous layer $\ell - 1$;
Integer $N_{\ell-1,y}$, the (height) y-dimension of the input signal $\mathcal{A}$ from the previous layer $\ell - 1$;
Integer $S_{\ell,k}$, the dimension of $k^{th}$ filter $\mathcal{W}$ in layer $\ell$;
Integer C, the number of channels;
Using QT addition $\oplus$ and QT multiplication $\otimes$:
Initialize: $\mathcal{Z}_\ell^{conv}$ for current layer $\ell$
For: k = 0, ... , $K_\ell$ − 1;
  For: c = 0, ... , C − 1
    For: x = 0, ... , $N_{\ell-1,x}$ − 1
      For: y = 0, ... , $N_{\ell-1,y}$ − 1
        For: sx = 0, ... , $S_{\ell,k}$ − 1
          For: sy = 0, ... , $S_{\ell,k}$ − 1
            $\mathcal{Z}_{y,x}^{conv} \leftarrow \mathcal{Z}_{y,x}^{conv} \oplus (\mathcal{A}_{\ell-1\ y+sy,x+sx,c} \otimes \mathcal{W}_{\ell,k,sy,sx,c})$
$\mathcal{Z}_k^{conv} \leftarrow \mathcal{B}_k \oplus \mathcal{Z}_k^{conv}$
Return: $\mathcal{Z}_\ell^{conv}$

---

As mentioned earlier, noting that QT multiplication is non-commutative, switching input to the right and filter to the left in the multiplication $\otimes$ gives another type of QT convolution than in as represented by Equation 4G below:

$$\mathcal{Z}_{\ell,y,x,k} = \mathcal{B}_{\ell,k} \oplus \bigoplus_{sy,sx \in \{0,1,\ldots,S-1\}, c \in \{0,1,\ldots,C-1\}} \mathcal{W}_{\ell,k,y,x,c} \otimes \mathcal{A}_{\ell-1,y+sy,x+sx,c} \quad \text{Eq. 4G}$$

where $\mathcal{Z}_{l,y,x,k}$ refers to the y,x-coordinates of the pixels in layer $\ell$ resulting from the $k^{th}$ filter.

For backpropagation through the convolution layer, given the gradient of loss function $\mathcal{C}$ with respect to $\mathcal{Z}_l$, the partial derivatives of $\mathcal{C}$ are computed with respect to $\mathcal{A}_{l-1}$, $\mathcal{W}_l$, and $\mathcal{B}_l$. Specifically, the QT partial derivatives are computed with respect to QT conjugates of these variables. Equations 5A-5C have been developed to compute these partial derivatives according to example embodiments:

$$\frac{\partial \mathcal{C}}{\partial \mathcal{B}_{\ell,k}^*} = \bigoplus_{y,x} \frac{\partial \mathcal{C}}{\partial \mathcal{Z}_{\ell,y,x,k}^*} \quad \text{Eq. 5A}$$

$$\frac{\partial \mathcal{C}}{\partial \mathcal{A}_{\ell-1,y,x,c}^*} = \bigoplus_k \left( \bigoplus_{s,t \in \{0,1,\ldots,S-1\}} \frac{\partial \mathcal{C}}{\partial \mathcal{Z}_{\ell,y-t,x-s,k}^*} \otimes \partial \mathcal{W}_{\ell,k,t,s,c}^{v*} \right) \quad \text{Eq. 5B}$$

$$\frac{\partial \mathcal{C}}{\partial \mathcal{W}_{\ell,k,t,s,c}^*} = \bigoplus_{v \in \{1,i,j,k\}} \left[ \left( \bigoplus_{y,x} Sc(v \otimes \mathcal{A}_{\ell-1,y+t,x+s,c}) \frac{\partial \mathcal{C}}{\partial \mathcal{Z}_{\ell,y,x,k}^{v*}} \right) \otimes v \right] \quad \text{Eq. 5C}$$

Equation 5A represents the QT partial derivative of the loss function with respect to the $k^{th}$ bias $\mathcal{B}*$ in layer $\ell$ given the QT partial derivative of loss function $\mathcal{C}$ with respect to the $k^{th}$ output $\mathcal{Z}*$ of layer 1 over all y,x elements (pixel indices).

Equation 5B represents the QT partial derivative of the loss function with respect to all the activations $\mathcal{A}$ in the previous layer $\ell - 1$ given all the QT partial derivatives of loss function $\mathcal{C}$ with respect to the output $\mathcal{Z}$ of layer $\ell$.

Equation 5C represents the QT partial derivative of the loss function with respect to the $k^{th}$ weight $\mathcal{W}$ in layer l, over all y,x elements (pixel indices), given the QT partial derivative of $\mathcal{C}$ with respect to the output $\mathcal{Z}$ of layer $\ell$.

In a related aspect, a non-linear activation function is provided in true quaternion domain (e.g., not merely coordinate-wise real domain). A QT rectified linear unit (QT ReLU) according to embodiments is a piece-wise linear function in quaternion space, which is computed as follows: for a quaternion $q = q_0 1 + q_1 i + q_2 j + q_3 k$ the value of QT-ReLU at q is q itself, so long as each of the real and imaginary components is a positive real number (i.e. $q_0 > 0$, $q_1 > 0$, $q_2 > 0$, $q_3 > 0$), and everywhere else the QT-ReLU is the zero quaternion i.e. when any of the scalar or imaginary parts are zero or negative, the QT-ReLU outputs zero:

$$QT\text{-}ReLU(q) := \begin{cases} q & \text{if } q_0, q_1, q_2, q_3 \geq 0, \text{ for } q = q_0 1 + q_1 i + q_2 j + q_3 k; \\ 0 & \text{otherwise} \end{cases} \quad \text{Eq. 6}$$

Additionally, sigmoid and hyperbolic tangent functions can be directly applied on the input quaternion (not coordinate-wise) and used as non-linear activation functions as well.

According to an example embodiment, the backpropagation through QT-ReLU, as in Equation 7 below, is computed accordingly: in general, for the non-zero outputs, all the derivatives propagate to the input, and are zero elsewhere. Particularly, for each non-zero linear part of the piecewise linear function, the derivatives with respect to the output directly propagate to the input. The derivatives are zero elsewhere.

$$\frac{\partial \mathcal{C}}{\partial \mathcal{Z}_{\ell,m}^*} := \begin{cases} \frac{\partial \mathcal{C}}{\partial \mathcal{A}_{\ell,m}^{v*}} & \text{if } q_0, q_1, q_2, q_3 \geq 0, \text{ where } \mathcal{Z}_{l,m} = q_0 1 + q_1 i + q_2 j + q_3 k; \\ 0 & \text{otherwise} \end{cases} \quad \text{Eq. 7}$$

In a related aspect of the embodiments, QT pooling operations are provided. Given a quaternion 1D, 2D or any dimensional tensor (e.g. corresponding to a time series, an image or a higher dimensional signal, or a combination thereof, the QT pooling operation downsamples, or upsamples the signal to a lower-dimensional, or higher-dimensional signal, respectively, and computes output values at a coordinate or pixel based on the values of the input signal in the neighborhood of that coordinate/pixel. This neighborhood-based pooling can be one of various types such as, for example, based on maximum values average values, etc. The downsampling or upsampling is characterized by a stride parameter T and the neighborhood is characterized by a window of size S.

Figure 9:
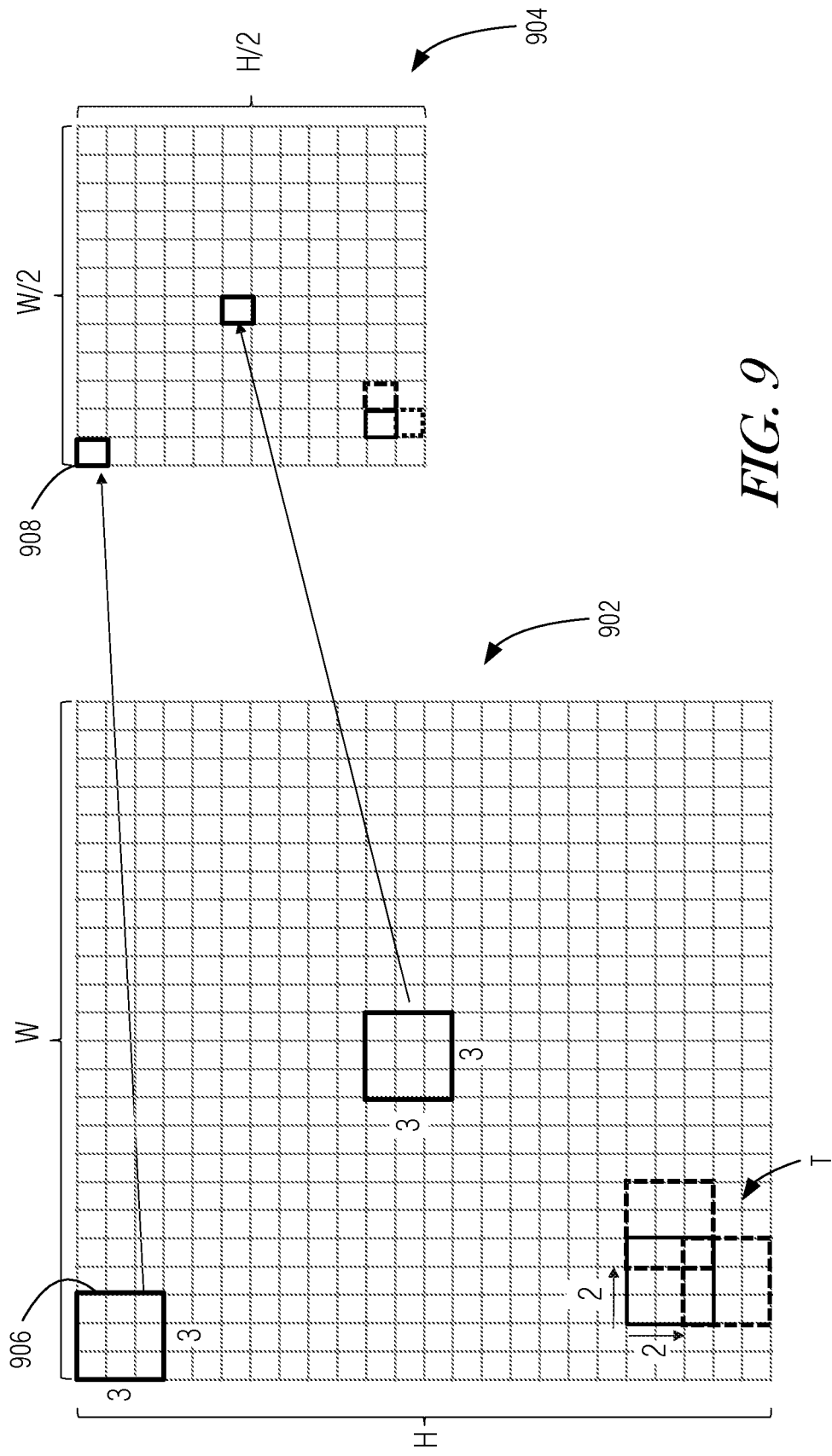
FIG. 9 is a diagram illustrating an example pooling operation in 2D space.

FIG. 9 is a diagram illustrating an example pooling operation in 2D space. The pooling operation maps input 902 to output 904. In a given neighborhood 906 of input 902, the pooling operation selects or determines a value for a mapped output pixel 908. One technique for selection or determination of the value of output pixel 908 is selection of the pixel from neighborhood 906 that has the highest value of QT norm, and the actual quaternion value of this max-norm pixel becomes the value of output pixel 908. In the example depicted, when the neighborhood 906 is a window of size S=3, one of the 3*3=9 pixel values, with maximum QT norm, becomes the output 908. As depicted, the stride T has a size of 2 pixels. Therefore, the H and W dimensions of input 902 map to H/2 and W/2 output 908.

Equation 8A below represent QT max pooling via QT norm:

$$\mathcal{A}^{pool}_{y,x,c} = \mathcal{A}_{y^m,x^m,c} \text{ where:} \quad \text{Eq. 8A}$$

$$y^m = T*y + j^m$$

$$x^m = T*x + i^m$$

$$j^m, i^m = \underset{sy,sx \in \{0,1,\ldots,S-1\}}{\operatorname{argmax}} \|\mathcal{A}_{T*y+sy,T*x+sx,c}\|^2$$

and where $\|\cdot\|^2$ is a QT norm whose computed value is a scalar and can be ordered.

This approach contrasts to real-valued (or integer) max pooling, where the largest value is easily extracted from the naturally-ordered set of values. In a quaternion-valued set of pixels, there is no such ordering of lowest to highest (e.g., maximum), so an ordering is imposed according to various embodiments. In the example depicted, the ordering is imposed through the application of the QT norm to quaternion-valued pixels, which evaluates to a real value.

In another embodiment, instead of using the QT norm for to impose an ordering for the quaternion-valued pixels, the scalar, or real, component of the quaternion pixels is used, as represented in Equation 8B.

$$\mathcal{A}^{pool}_{y,x,c} = \mathcal{A}_{y^m,x^m,c} \text{ where} \quad \text{Eq. 8B}$$

$$y^m = T*y + j^m$$

$$x^m = T*x + i^m$$

$$j^m, i^m = \underset{sy,sx \in \{0,1,\ldots,S-1\}}{\operatorname{argmax}} Sc(\mathcal{A}_{S*y+sy,S*x+sx,c})$$

In the quaternion-valued average pooling operation, the output value is actually the average of the quaternion values of all the pixels in the neighborhood of size S, and the average is computed using consistent QT addition and consistent QT multiplication/division.

In QT backpropagation through QT pooling operation (QT-pooling) according to embodiments, from the backward pass perspective, max pooling eliminates all input to this pooling layer except that input which contributes to an output. Therefore, only partial derivatives with respect to those contributory inputs survive. Thus, in this pooling layer, the sum of all partial derivatives is taken of all the output variables to which the inputs contribute. Hence, backpropagation involves maintaining argmaxes for each stride during pooling.

In the average pooling case, every input in the pooling window contributes to the corresponding output, so partial derivatives with respect to all inputs survive. The pooling outcome is calculated as the sum over all the partial derivatives of all the output variables, according to some embodiments.

Figure 10:
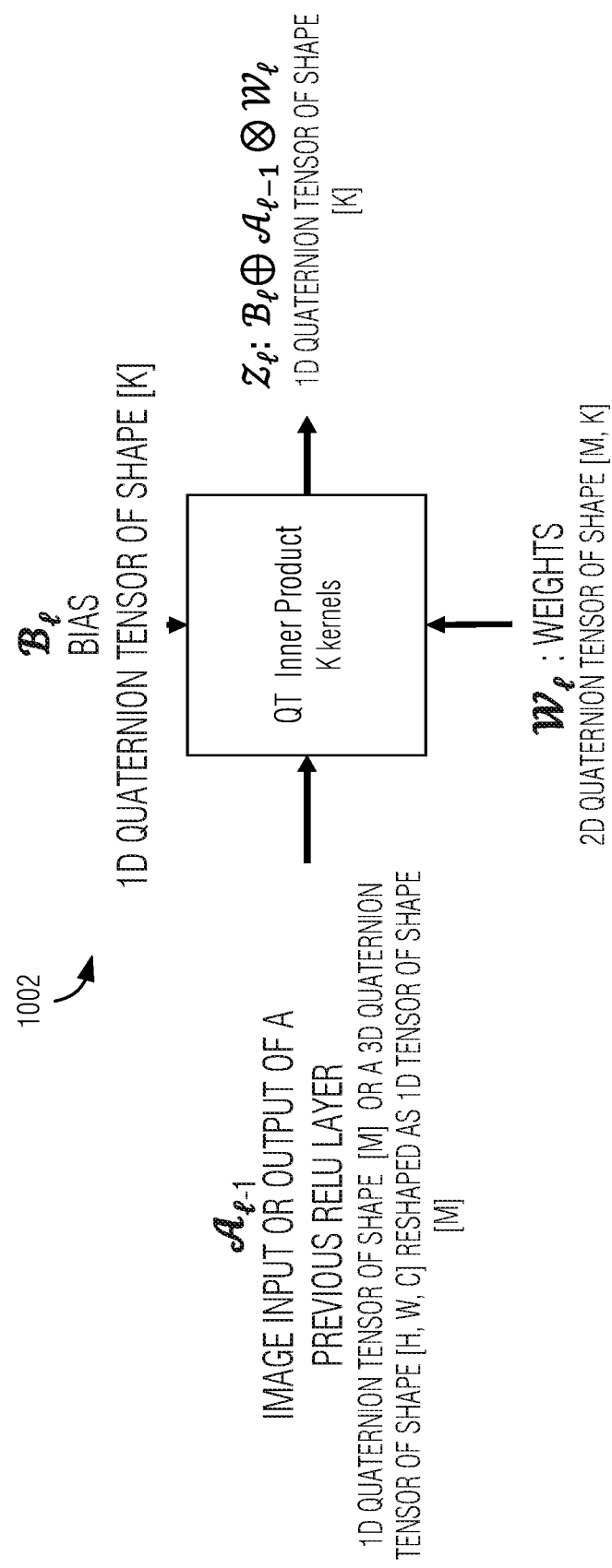
FIG. 10 is a diagram illustrating a QT inner product sublayer, as an illustrative example of a QT inner product engine.

FIG. 10 is a diagram illustrating a QT inner product sublayer 1002, as an illustrative example of QT inner product engine 714. In general, inner products of a quaternion filter $\mathcal{W}$ of size N with the input quaternion $\mathcal{A}$ of size N is the QT sum of the QT multiplication of the corresponding coordinates of the input and the filter:

$$\mathcal{Z}^{dot} = \sum_{x=0,1,\ldots,N}^{\oplus} \mathcal{A}_x \otimes \mathcal{W}_x \quad \text{Eq. 9A}$$

Notably, the operations $\oplus$ and $\otimes$ consistent QT addition and QT multiplications, and not merely coordinate-wise real-valued operations. Further, in another embodiment, the QT multiplication $\otimes$ is replaced by QT geometric product.

The following pseudocode embodies an example algorithm to produce a QT inner product Given
Quaternion-valued signal $\mathcal{A}$ of dimension N;
Quaternion-valued filter $\mathcal{W}$ of dimension N;
Initialized output $\mathcal{Z}^{dot}$ of dimension N;
For: x = 0, ..., N − 1
$\quad \mathcal{Z}^{dot}_x \leftarrow \mathcal{Z}^{dot}_x \oplus (\mathcal{A}_x \otimes \mathcal{W}_x)$
Return: $\mathcal{Z}^{dot}$ A fully connected quaternion neural network layer may be obtained by adding a bias term:

$$\mathcal{Z}^{dot} = \mathcal{B} \oplus \Sigma_{x=0,1,\ldots,M} \mathcal{A}_x \otimes \mathcal{W}_x \quad \text{Eq. 10}$$

For a layer in a QT deep neural network implementing k kernels, the QT inner product operation is defined as shown in Equation 11:

$$\mathcal{Z}_{\ell,k} = \mathcal{B}_{\ell,k} \oplus \sum_{m}^{\oplus} \mathcal{A}_{\ell-1,m} \otimes \mathcal{W}_{\ell,m,k} \quad \text{Eq. 11}$$

where the $\mathcal{W}$ terms are the weights, $\mathcal{B}$'s are the biases, and $\mathcal{A}$'s are the inputs used to compute the output $\mathcal{Z}$'s.

For the backpropagation through an inner product operation, given the gradient with respect to the output $\mathcal{Z}$, the gradient with respect to weights $\mathcal{W}$, bias $\mathcal{B}$, and input $\mathcal{A}$ are to be computed. In some examples, backpropagation through QT inner product (e.g., dot product) operation is very similar to that through the QT convolution operation, except that all inputs participate in the computation of all outputs and the partial derivative contributions from output are accounted for accordingly. The equations work out to be:

$$\frac{\partial C}{\partial \mathcal{B}^{v*}_{\ell,k}} = \frac{\partial C}{\partial \mathcal{Z}^{v*}_{\ell,k}} \quad \text{Eq. 12A}$$

$$\frac{\partial C}{\partial \mathcal{A}^{v*}_{\ell-1,m}} = \sum_{k}^{\oplus} \frac{\partial C}{\partial \mathcal{Z}^{v*}_{\ell,k}} \otimes \mathcal{W}^{v*}_{\ell,m,k} \quad \text{Eq. 12B}$$

$$\frac{\partial C}{\partial \mathcal{W}^{v*}_{\ell,m,k}} = \sum_{v \in \{1,i,j,k\}}^{\oplus} \left[ \left( Sc(v \otimes \mathcal{A}_{\ell-1,m}) \frac{\partial C}{\partial \mathcal{Z}^{v*}_{\ell,k}} \right) \otimes v \right] \quad \text{Eq. 12C}$$

Figure 11:
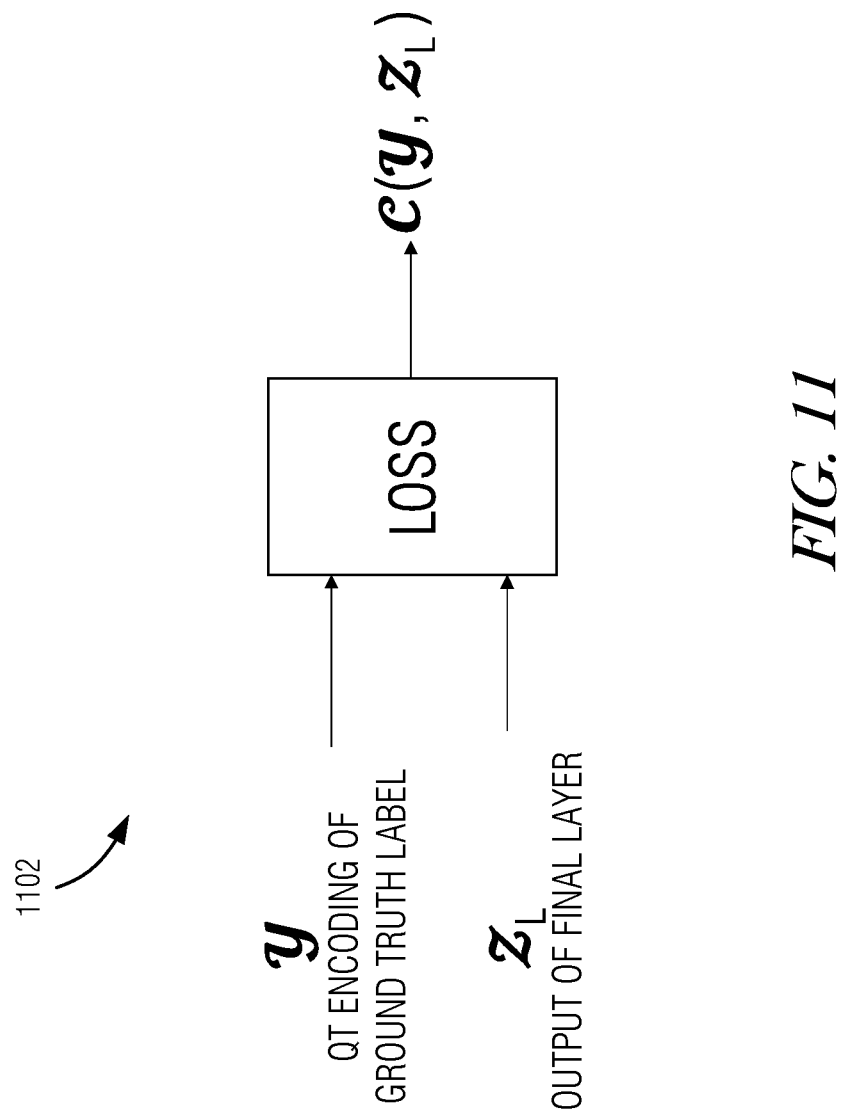
FIG. 11 is a diagram illustrating an example scalar-valued QT loss function engine.

FIG. 11 is a diagram illustrating an example scalar-valued QT loss function engine 1102. While training a deep neural network, the cost or loss function is optimized based on a training set via a gradient-based iterative algorithm. In QT deep learning according to some embodiments, the loss function is a real-valued function of quaternion inputs. In general, this function may be a quaternion-valued function as long as a total order or partial order on the quaternion space is maintained. According to embodiments, the gradient of the real-valued loss function is the vector of partial derivatives of the loss function with respect to the conjugates of the output of the final layer of the neural network.

For an error or loss function formulated as a mean square error, Equation 13 provides:

$$C(\mathcal{Y}, \mathcal{Z}_L) = \sum_k \|\mathcal{Z}_{L,k} - \mathcal{Y}_k\|^2 \qquad \text{Eq. 13}$$

where, $\mathcal{Z}_{L,k}$ is the $k^{th}$ component of the output in the final layer L, $\mathcal{Y}_k$ is the lei component of the ground truth target. Note that the summand in Equation 13 is a QT norm, the final value of which is real-valued; thus, the loss function is real-valued, but the partial derivatives of the loss function are not real-valued.

It should be noted that the partial derivatives of the loss function are based on the conjugate of the outputs $\mathcal{Z}_{L,k}$. These partial derivatives are computed as shown in Equation 14:

$$\frac{\partial C}{\partial \mathcal{Z}_{L,k}^{v*}} = \frac{1}{2} v(\mathcal{Z}_{L,k} - \mathcal{Y}_k)v^*, \text{ for } v = \{1, i, j, k\} \qquad \text{Eq. 14}$$

Appendix 1 contains additional example embodiments detailing computational implementations of various QT-specific operations, including QT conjugation, QT multiplication, QT involution, QT inner product, QT left vector-matrix multiplication, QT matrix-matrix multiplication, QT forward feed, QT gradient propagation through the inner product layer, QT gradient propagation through the convolution layer, and gradient loss function with respect to an input to a current layer in a forward pass. In various embodiments, each subroutine example may be implemented as a hardware block constructed to carry out the corresponding computation using sequential and combinational logic circuitry, or as a processor-based computing platform that is transformed into a special-purpose machine when configured with the machine-executable instructions for carrying out the QT computations and related operations.

Figure 12:
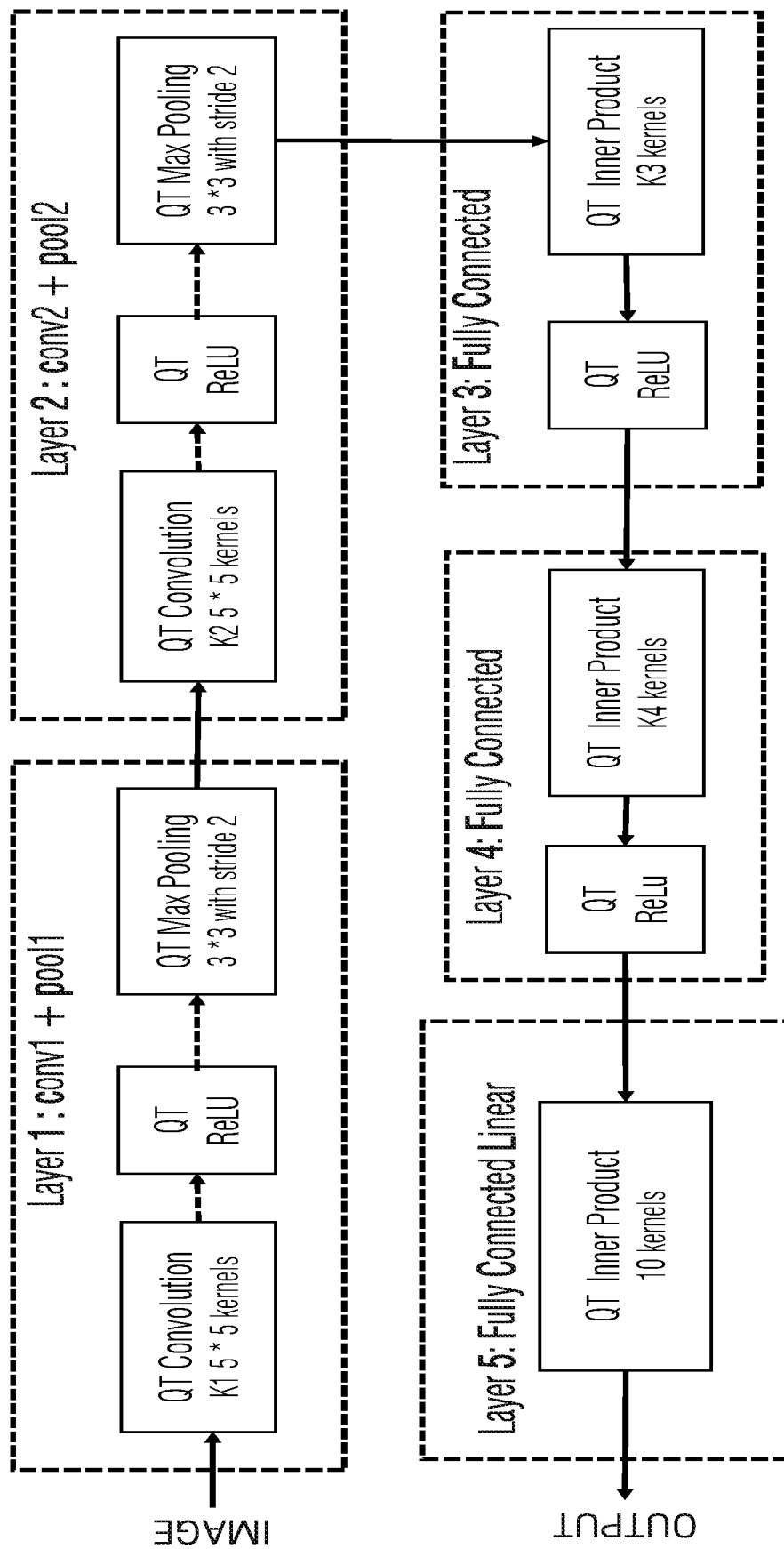
FIG. 12 is a diagram illustrating an example embodiment for implementing a quaternion deep neural network (QTDNN) for classifying an image into object classes.

FIG. 12 is a diagram illustrating an example embodiment for implementing a 5-layer QTDNN for classifying an image into 10 object classes. Layer 1 is a QT convolutional layer. An input image encoded as quaternion tensor is input to this layer. First, a QT convolution with a set of K1 filters of window size 5*5 is applied and a bias is added followed by a QT non-linear activation by QT-ReLU. Output from QT-ReLU is then down-sampled using QT max-pooling with neighborhood size 3*3 and stride 2. In one implementation, the input to layer 1 is image encoded as 3D quaternion tensor of shape [H, W, 1]; therefore the output is a 3D quaternion tensor of shape [H/2, W/2, K1], a factor 2 because of stride 2 in max-pooling and K1 because of the number of kernels. Each of the kernel themselves are quaternion 3D tensors of shape [5, 5, 1]; the kernels form a 4D quaternion tensor of shape [K1, 5, 5, 1].

Layer 2 is also a convolutional layer similar to layer 1; however, the input to this layer is not an image directly, but the output of layer 1. There are K2 number of kernels each being a quaternion 3D tensor of shape [5, 5, K1], K1 coming from the fact that there are K1 channels in the output of layer 1. After applying QT convolution, QT-ReLU and QT max-pooling in this layer an output of shape [H/4, W/4, K2] is produced.

Layer 3 is a fully-connected layer. The output from layer 2 is first reshaped into a 1D tensor, e.g. from a 3D quaternion tensor of shape [H/4, W/4, K2] to a 1D quaternion of size H/4*W/4*K2. There are K3 kernels in this layer, each of which is a 1D quaternion tensor of size H/4*W/4*K2. Each of the K3 kernels is used to apply QT inner product operation on the input (e.g., reshaped output of layer 2) along with a bias addition followed by a non-linear activation QT-ReLU to obtain a single quaternion output, leading to K3 size output in total.

Layer 4 is also a fully connected layer. There are K4 kernels in this layer, each of them being a 1D quaternion tensor of size K3. The output of layer 3 goes through an inner product with each of the K4 kernels followed by QT-ReLU to produce K4 size quaternion 1D tensor output.

Layer 5 is a fully connected layer or a linear layer (e.g., inner product without ReLU). Since this is the final layer in this example, the number of kernels depends on the number of classes into which the images are to be binned, which in this case is 10. Each one of these 10 kernels are of 1D quaternion tensors of size K4 and goes through a QT inner product operation with output of layer 4 with an optional QT-ReLU follow up and produces a ID tensor output of size 10. This 10-size quaternion output is used for deciding which class a given input belongs to, based on certain criteria such as closeness to a pre-defined set of values with respect to quaternion mean square error.

Appendix 2 contains code for implementing the example 5-layer QT neural network shown in FIG. 12, along with a backpropagation process through the network, in addition to updating of the model parameters via stochastic gradient decent.

Figure 13:
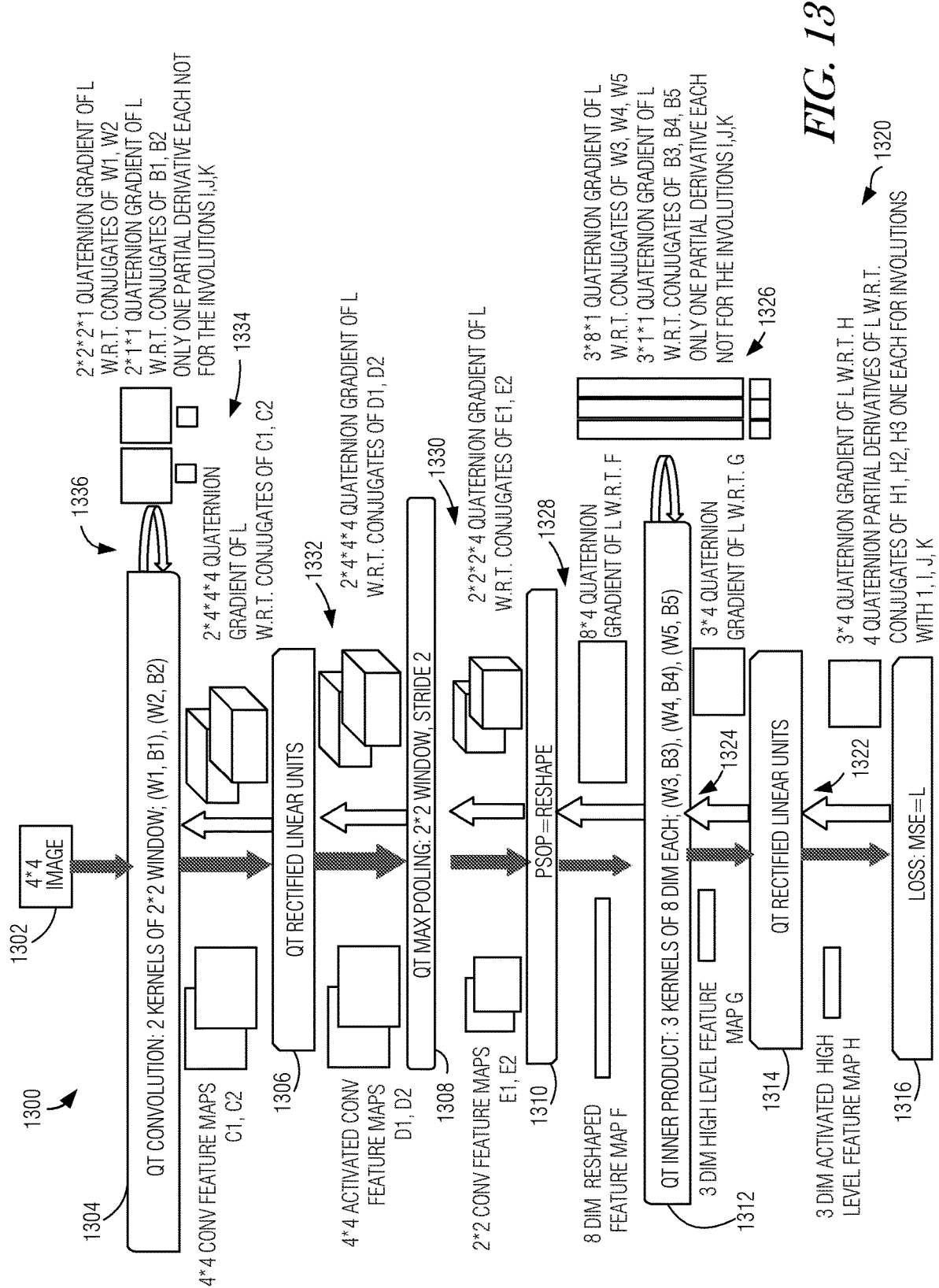
FIG. 13 is a diagram illustrating forward pass and backpropagation operations in an example 2-layer deep quaternion neural network.

FIG. 13 is a diagram illustrating forward pass and back-propagation operations in an example 2-layer deep quaternion neural network 1300. The network accepts input 1302, which may be an image or a feature map having a height of 4 pixels and width of 4 pixels. Input 1302 passes through a QT convolution layer 1304 with two kernels of window size 2*2. Each kernel has adjustable parameters. Here, a weight vector and a bias vector, namely, pairs (W1, B1) and (W2, B2), constitute the adjustable parameters. Parameters W1 and W2 are quaternion tensors of size 2*2 in this example. The QT convolution operation produces two convolutional feature maps, C1 and C2. These convolutional feature maps pass through QT ReLU operation 1306 to obtain feature maps D1 and D2, which in turn pass through QT max pooling operation 1308, having stride 2 subsampling, to produce feature maps E1 and E2 of size 2*2 each.

Convolutional feature maps E1 and E2 are provided as input to PSOP sublayer 1310 for reshaping. As a result of the reshaping, feature maps E1 and E2 are flattened to a single feature map, F, having a size of 2*2*2=8. Reshaped feature map F is passed as the input to QT inner product operational block 1312. QT inner product operation 1312 has 3 kernels applying weights and biases (W3, B3), (W4, B4), (W5, B5), with weights W3, W4, W5 each being 8-dimensional quaternion valued vectors. QT inner product operation 1312 performs a QT-Dot computation to produce 3-dimensional quaternion feature map G. Feature map G passes through QT ReLU activation operation 1314 to produce feature map H, which is a three-dimensional high-level feature map. Feature map H is used to compute the loss function L at operation 1316, given training data (e.g., ground truth data).

In training network 1300, QT gradients of loss function L with respect to feature map H may be computed using Equation 10. As indicated at 1320, QT partial derivatives of L are computed with respect to conjugates of each of the three coordinates of feature map H. For each, there are four partial derivatives: one for each of the involutions 1, i, j, and k.

At 1322, QT gradients of loss function L with respect to feature map H are backpropagated through QT-ReLU operation 1314. At 1324 QT gradients of loss function L with respect to feature map G are backpropagated through QT inner product operation 1312. In addition, during the backpropagation through the QT inner product operation 1312, QT gradients are computed as indicated at 1326 with respect to the variable parameters, weights W3, W4, W5, and biases B1, B2, B3. These QT gradients with respect to the variable parameters are not propagated; they are instead used for tuning the performance of QT inner product sublayer 1312 during the training iteration. In computing the QT gradients with respect to the variable parameters at 1326, only one QT partial derivative is computed rather than four (gradients corresponding to the involutions of i, j, k are not computed). Since there are 3 kernel weights, each with dimension 8, and only one partial derivative is computed, partial derivative computation 1326 produces a 3*8*1 value as indicated in FIG. 12.

At 1328, QT gradients of loss function L with respect to feature map F are computed to produce a 8*4 value to be propagated through PSOP sublayer 1310. At 1330, QT gradients of loss function L with respect to the conjugates of feature maps E1 and E2 are computed to produce 2*2*2*4 values that are backpropagated through QT max pooling operation 1308. At 1332, QT gradients of loss function L with respect to the conjugates of feature maps D1 and D2 are computed to produce 2*4*4*4 values that are backpropagated through QT ReLU operation 1306.

At 1334, QT gradients of loss function L with respect to the conjugates of feature maps C1 and C2 are computed to produce 2*4*4*4 values that are backpropagated through QT convolution operation 1304. In addition, as indicated at 1336, QT gradients of loss function L with respect to the conjugates of weights W1 and W2, and of biases B1 and B2 are computed. The QT gradients of loss function L with respect to the conjugates of weights W1 and W2 are 2*2*2*1 quaternion values, whereas the QT gradients of loss function L with respect to the conjugates of biases B1 and B2 are 2*1*1 quaternion values since only one partial derivative is taken for each of the bias values (e.g., with the involutions i, j, and k omitted from the computation.

Figure 14:
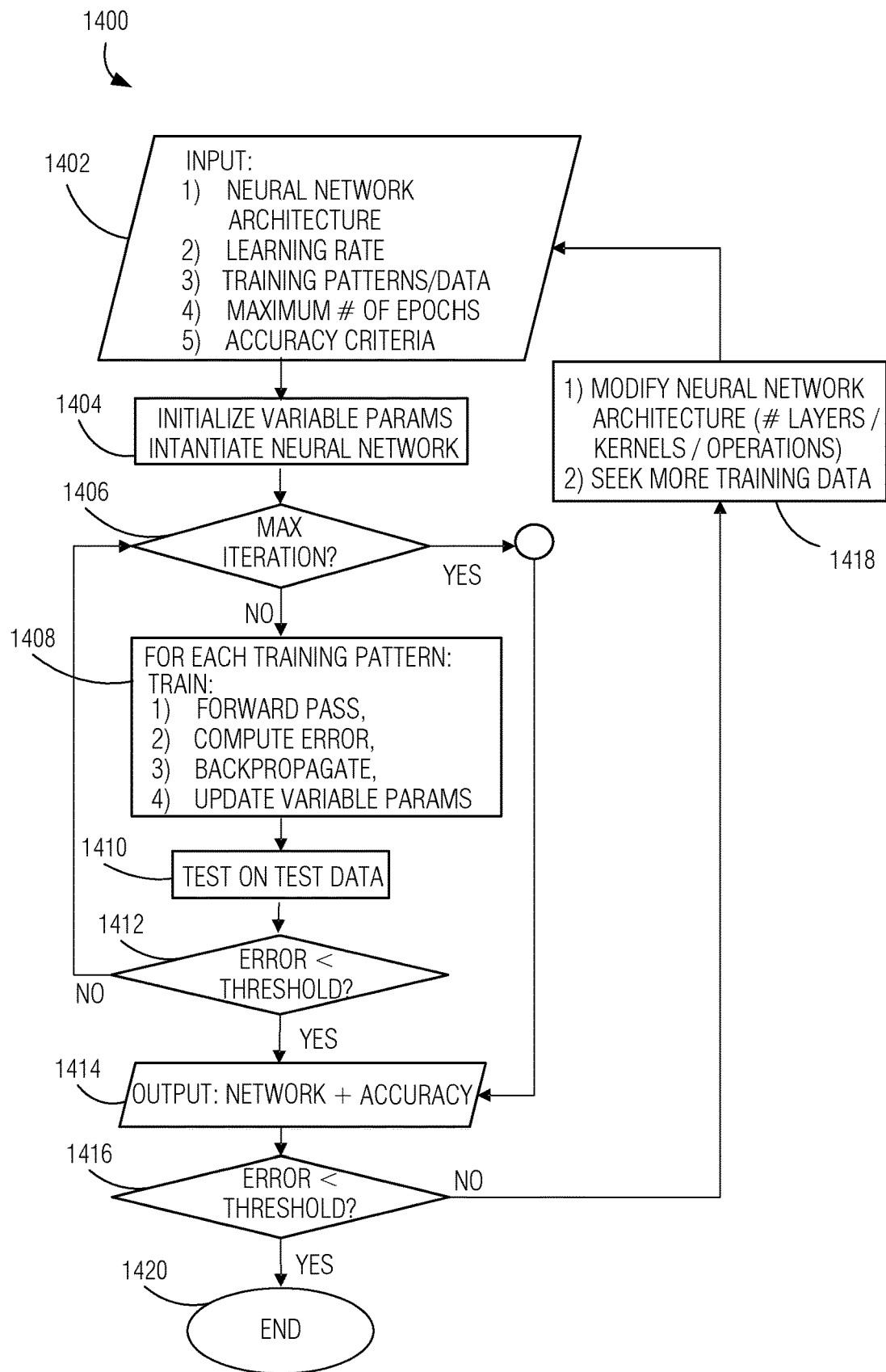
FIG. 14 is a high-level flow diagram illustrating process for producing and training a QT deep neural network according to an example.

FIG. 14 is a high-level flow diagram illustrating process 1400 for producing and training a QT deep neural network according to an example. At 1402, input is provided to process 1400. The input includes a representation of the neural network architecture (e.g., layers, sublayers, fixed and variable parameter values), etc. An example of a fixed variable is a quantity of cores in an operational block. Variable parameters include weights or biases. The input further includes a learning rate (e.g., frequency of initiating training operations), training patterns or training data, an epoch limit, and accuracy criteria (e.g., acceptable error) to be met by the training operations.

At 1404, the variable parameters are initialized and the QTDNN is instantiated. Instantiation may involve compiling the source code that defines the QTDNN. For each node in the QTDNN representation, its forward and backward operator chains are compiled. Accordingly, in an embodiment, the internal representation of the forward and backward operators may point to a chain of one or more elements that are either primary PSOP elements, compiled operational functions, or a mix of the two.

For example, consider the following chain of operators: {partition: (3×3 pixel sub-image), operation: average, operation: scalar}. When compiled, this would translate to a running average computation of just the real component, "A" across the nine elements in the partition (noting that each quaternion may be represented as A+i.B+j.C+k.D, the A component being the real component).

In a related embodiment, to further reap implementation efficiencies, operations that are commutative (for example addition is commutative with real numbers), are re-ordered when doing so may yield speed improvements. In the above example taking the average and then extracting the real component is the same as extracting the real component and then taking the average, saving 9*3 addition operations.

Decision 1406 controls the amount of training iterations for the QT deep neural network. An iterations counter may be incremented and compared against a limit of maximum iterations. In cases where the maximum limit is not reached, the process proceeds to block 1408, which represents a series of operations to be performed for each training pattern. These include propagating the training pattern in the forward direction (forward pass), computing the error, or loss function, by comparison of the output to the ground truth associated with the training pattern, performing back-propagation, and updating the variable parameters, for example. As a result, the layers of the QT deep neural network are better tuned to some degree.

At 1410, the tuning of the QT deep neural network is tested using a set of test data as the input to the network. Accordingly, the network's output after having processed the test data is compared to ground truth values associated with the test data and the error is quantified. At decision 1412, the quantified error is compared against the accuracy criteria. If the quantified error is greater than an error threshold (which constitutes the accuracy criteria as an example), the process loops back to 1406 to perform another training iteration at block 1408.

If decision 1412 determines that the quantified error meets the accuracy criteria, or if the maximum iterations limit at decision 1406 is reached, the process proceeds to operation 1414 to produce, as the output of process 1400, the QT deep neural network architecture, adjusted variable parameter values, and the achieved accuracy measure.

Decision 1416 determines whether operation 1414 was performed due to the accuracy criteria having been met, or due to the iterations limit having been reached. Accordingly, decision 1416 inquires whether the quantified error meets the accuracy criteria (e.g., is below the error threshold). In the affirmative case, process 1400 concludes at 1420. If the accuracy criteria is not met, the process continues to 1418, where more fundamental changes may be made to the QT deep neural network. For instance, the neural network architecture may be modified to have a different number or arrangement of layers, the sublayer kernels may be varied, the sublayer operations may be varied, or any combination of some or all of these changes may be instituted. In addition, or alternatively, further training may be performed with new or different training data. The new QT deep neural network or training data may be supplied as new input at 1402 and process 1400 may thus be performed as a new iteration.

In some of the examples detailed in this disclosure, quaternions are represented using tensor data structures. In the tensor representation the number of entries programmatically defines the dimension of the tensor. The values in each entry correspond to the size of the corresponding entry's object in that dimension. To illustrate, [A_size] is used to initialize a one-dimensional tensor A of size A_size; [B_size, A_size] is a two-dimensional tensor of size A_size for A, B_size for B; and [C_size, B_size, A_size] is a three-dimensional tensor of size A_size for A, B_size for B, C_size for C. The terminology may be compacted even further by referring to a one-dimensional tensor as having shape [A], a two-dimensional tensor as having shape [B, A], a three-dimensional tensor as having shape [C, B, A] etc.

Figures 15A, 15B, 15C:
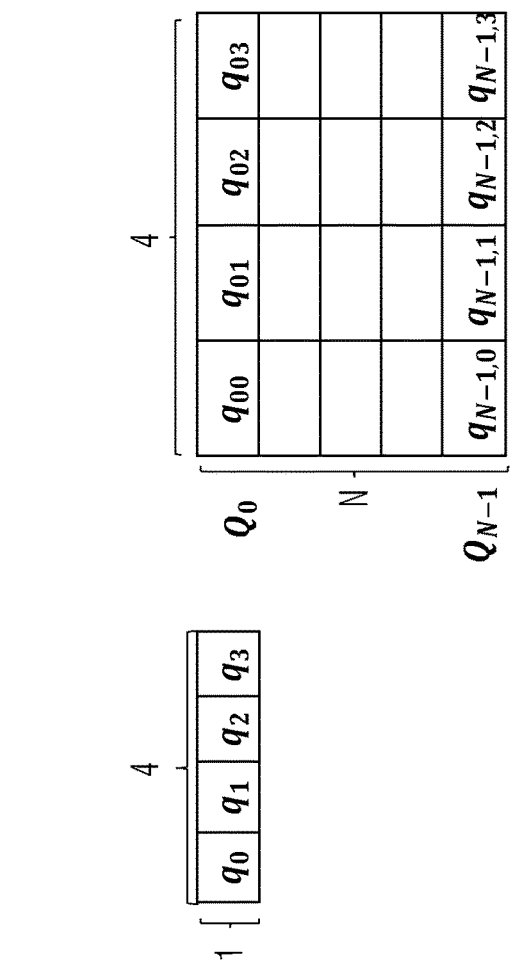
FIGS. 15A-15C illustrate tensor representations of quaternion values of various dimensionality as illustrative examples.

For instance, FIG. 15A illustrates a 1-dimensional Hamilton quaternion, $Q \in \mathbb{H}$, with its four real-valued components, as a 1-dimensional real-valued tensor of shape [,4]. Equivalently, this data structure represents a 1-dimensional quaternion tensor of shape [1]. FIG. 15B is a diagram illustrating a N-dimensional Hamilton quaternion vector, $Q \in \mathbb{H}^{N \times 1}$, represented as an N×1 quaternion array. Using real-space encodings, it may be represented as a 2-dimensional real-valued tensor of shape [N,4] as depicted. Equivalently, this data structure represents a 1-dimensional quaternion tensor of shape [N]. FIG. 15C is a diagram illustrating a quaternion-valued "matrix", $Q \in \mathbb{H}^{N \times M}$, represented as an N×M array. Using real-space encodings, it is represented as a 3-dimensional real-valued tensor of shape [M,N,4]. Equivalently, this data structure represents a 2-dimensional quaternion tensor of shape [M,N]. More generally, for each higher-dimensional quaternion tensor, an additional dimension of size 4 is added to the real tensor encoding. For example, any N-dimensional quaternion-valued tensor may be represented as a (N+1)-dimensional real-tensor where the last dimension has size 4.

A gradient with respect to an N-dimensional quaternion tensor is represented as a (N+2)-dimensional real-valued tensor in which the last two dimensions each has size 4, the first four for the partial derivatives with respect to each of the four involutions using {1,i,j,k}, and the second four as the encoding of a quaternion. With reference to FIG. 15C, $Q \in \mathbb{H}^N$, $\nabla Q \in \mathbb{H}^{N \times 4}$ may be visualized with dimension M=4, in which case the quaternion would have dimensions of N*4, a 2-dimensional quaternion tensor would have the shape [N,4] and, equivalently, a real-valued 3-dimensional tensor would have the shape [N,4,4].

For some QT operations, there is no need for computing all four partial derivatives but rather just one partial derivative. In these situations the gradient has a dimensionality of (N+1).

According to some aspects, computationally representing input image data and feature maps as quaternions involves taking each image pixel's RGB values and encoding them as a pure quaternion (i.e. with zero scalar value and R, G, and B as the three imaginary values, respectively), to create a four-dimensional-tensor of shape [H, W, 1, 4], where the right-most entry corresponds to the quaternion encoding.

In a related aspect, when N images are processed in a batch, the representation of this image batch becomes a five-dimensional tensor of shape [N, H, W, 1, 4]. A convolutional kernel of window size S*T on input with C channels is represented as a four-dimensional tensor of shape [S, T, C, 4]. If there are K such convolutional kernels in a particular convolution layer, the representation becomes a five-dimensional-tensor of shape [K, S, T, C, 4].

In some QT computations, only derivatives with respect to the conjugates of the weights are called for; hence the gradient with respect to the kernel is simply [K, S, T, C, 4] for each image. Processing the N images would require a 6-D tensor of shape [N, K, S, T, C, 4]. If gradients are averaged over the batch, the 6-D tensor of shape [N, K, S, T, C, 4] transforms back to a 5D real tensor of shape [K, S, T, C, 4]. However, if the input to this convolution layer is of shape [N, H, W, C, 4] the gradient with respect to the input would be a 6-D tensor of shape [N, H, W, C, 4, 4].

In various embodiments, each of the QT tensor operations is computed by composing real-valued tensor manipulations efficiently. For example, to compute an involution, with imaginary quaternion i, on the quaternion tensor X of shape [N, 4], a negative operation is applied on the tensor X[:,1], leaving everything else unchanged. To apply conjugate, all the last three components are negated. Accordingly, in some embodiments, a software/hardware library is provided for efficient 4-D, 5-D, and 6-D tensor manipulation. These libraries facilitate efficient implementation of QTDNNs and their training via backpropagation or other gradient methods.

Examples

Example 1 is a machine-learning system, comprising: processing hardware, including computation circuitry and data storage circuitry, the processing hardware configured to form a deep neural network (DNN) including: an input layer, an output layer, and a plurality of hidden layers arranged along a forward propagation path between the input layer and the output layer; wherein the input layer is to accept training data comprising quaternion values, and to output a quaternion-valued signal along the forward propagation path to at least one of the plurality of hidden layers; wherein at least some of the hidden layers include, quaternion layers to execute consistent quaternion (QT) forward operations based on one or more variable parameters, to produce a corresponding at least one feature map output along the forward propagation path; wherein the output layer produces a DNN result that is based on the QT forward operations; the DNN further including a loss function engine to produce a loss function representing an error between the DNN result and an expected result; wherein the quaternion layers are to execute QT backpropagation-based training operations that include: computation of layer-wise QT partial derivatives, consistent with an orthogonal basis of quaternion space, of the loss function with respect to a QT conjugate of the one or more variable parameters and of respective inputs to the quaternion layers, the QT partial derivatives being taken along a backwards propagation path that is opposite the forward propagation path, successively though the plurality of hidden layers; and updating of the variable parameters to reduce the error attributable to each corresponding hidden layer based on the QT partial derivatives.

In Example 2, the subject matter of Example 1 includes, wherein the training data represents an image.

In Example 3, the subject matter of Examples 1-2 includes, wherein the input layer is to perform at least one QT operation.

In Example 4, the subject matter of Example 3 includes, wherein the at least one QT operation includes non-commutative QT multiplication.

In Example 5, the subject matter of Examples 3-4 includes, wherein the at least one QT operation includes QT geometric product.

In Example 6, the subject matter of Examples 1-5 includes, wherein the QT forward operations include QT activation and QT pooling operations.

In Example 7, the subject matter of Examples 1-6 includes, wherein the QT forward operations include a QT activation operation selected from the group consisting of: a QT rectified linear unit operation, a QT sigmoid operation, or a QT hyperbolic tangent operation, wherein the QT activation operation is applied directly to an input signal that is passed to the QT activation operation.

In Example 8, the subject matter of Examples 1-7 includes, wherein the QT forward operations include a QT rectified linear unit operation that accepts an input comprising a quaternion value having a real part and an imaginary part, and produces as an output either: (a) the quaternion value itself, when the real part and the imaginary part are each a positive real number; or (b) a zero quaternion value, when any one of the real part or the imaginary part is not a positive real number.

In Example 9, the subject matter of Examples 1-8 includes, wherein the QT forward operations include a QT convolution operation.

In Example 10, the subject matter of Example 9 includes, wherein the QT convolution operation maintains spatial translational invariance.

In Example 11, the subject matter of Examples 1-10 includes, wherein the QT forward operations include a QT inner product operation.

In Example 12, the subject matter of Examples 1-11 includes, wherein computation of layer-wise QT partial derivatives of the loss function includes performing a QT chain rule operation.

In Example 13, the subject matter of Examples 1-12 includes, wherein the one or more variable parameters are quaternion-valued.

In Example 14, the subject matter of Examples 1-13 includes, wherein the one or more variable parameters include a weight parameter.

In Example 15, the subject matter of Examples 1-14 includes, wherein the weight parameter is a multi-dimensional quaternion value.

In Example 16, the subject matter of Examples 1-15 includes, wherein the one or more variable parameters include a bias parameter.

In Example 17, the subject matter of Examples 1-16 includes, wherein the weight parameter is a multi-dimensional quaternion value.

In Example 18, the subject matter of Examples 1-17 includes, wherein computation of the layer-wise QT partial derivatives produce QT gradients of the loss function with respect to all of the variable parameters of the hidden layers.

In Example 19, the subject matter of Examples 1-18 includes, wherein the QT forward operations include a QT convolution operation at a first layer and wherein the one or more variable parameters include a quaternion-valued bias parameter; and wherein computation of layer-wise QT partial derivatives includes computation of a partial derivative of the loss function with respect to a QT conjugate of the bias parameter.

In Example 20, the subject matter of Example 19 includes, wherein the computation of a partial derivative of the loss function with respect to the QT conjugate of the bias parameter is achieved based on computation of a partial derivative of the loss function with respect to a QT conjugate of an output of the QT convolution operation.

In Example 21, the subject matter of Examples 19-20 includes, wherein the training data includes an image having pixel indices x and y, and wherein the partial derivative of the loss function with respect to the QT conjugate of the bias parameter is computed based on a QT summation over the pixel indices x and y of the QT partial derivatives of the loss function with respect to an output of the QT convolution operation at the first layer.

In Example 22, the subject matter of Examples 1-21 includes, wherein the QT forward operations include a QT convolution operation at a first layer and wherein the one or more variable parameters include a quaternion-valued weight parameter; and wherein computation of layer-wise QT partial derivatives includes computation of a partial derivative of the loss function with respect to a QT conjugate of the weight parameter.

In Example 23, the subject matter of Example 22 includes, wherein the computation of a partial derivative of the loss function with respect to the QT conjugate of the weight parameter is achieved based on computation of a partial derivative of the loss function with respect to a QT conjugate of an output of the QT convolution operation.

In Example 24, the subject matter of Examples 22-23 includes, wherein the training data includes an image having pixel indices x and y, and wherein the partial derivative of the loss function with respect to the QT conjugate of the weight parameter is computed based on a QT summation over the pixel indices x and y of the QT partial derivatives of the loss function with respect to an output of the QT convolution operation at the first layer.

In Example 25, the subject matter of Examples 1-24 includes, wherein the QT forward operations include a QT convolution operation at a first layer, wherein the QT convolution operation accepts as an input a first quaternion-valued feature map from a prior layer; and wherein computation of layer-wise QT partial derivatives includes computation of a partial derivative of the loss function with respect to a QT conjugate of the first quaternion-valued feature map.

In Example 26, the subject matter of Example 25 includes, wherein the computation of a partial derivative of the loss function with respect to the QT conjugate of the first quaternion-valued feature map is achieved based on computation of a partial derivative of the loss function with respect to a QT conjugate of an output of the QT convolution operation.

In Example 27, the subject matter of Examples 1-26 includes, wherein the QT forward operations include a QT rectified linear unit operation at a first layer that produces a first quaternion-valued activation output; and wherein computation of layer-wise QT partial derivatives includes computation of a partial derivative of the loss function with respect to a QT conjugate of the first quaternion-valued activation output.

In Example 28, the subject matter of Examples 1-27 includes, wherein the QT forward operations include a QT pooling operation at a first layer that produces quaternion-valued pooling output based on quaternion-valued input to the first layer; and wherein computation of layer-wise QT partial derivatives includes computation of a sum of partial derivatives of the quaternion-valued pooling output to which the quaternion-valued input contributes.

In Example 29, the subject matter of Examples 1-28 includes, wherein the QT forward operations include a QT inner product operation at a first layer and wherein the one or more variable parameters include a quaternion-valued bias parameter; and wherein computation of layer-wise QT partial derivatives includes computation of a partial derivative of the loss function with respect to a QT conjugate of the bias parameter.

In Example 30, the subject matter of Example 29 includes, wherein the computation of a partial derivative of the loss function with respect to the QT conjugate of the bias parameter is achieved based on computation of a partial derivative of the loss function with respect to a QT conjugate of an output of the QT inner product operation.

In Example 31, the subject matter of Examples 1-30 includes, wherein the QT forward operations include a QT inner product operation at a first layer and wherein the one or more variable parameters include a quaternion-valued weight parameter; and wherein computation of layer-wise QT partial derivatives includes computation of a partial derivative of the loss function with respect to a QT conjugate of the weight parameter.

In Example 32, the subject matter of Example 31 includes, wherein the computation of a partial derivative of the loss function with respect to the QT conjugate of the weight parameter is achieved based on computation of a partial derivative of the loss function with respect to a QT conjugate of an output of the QT inner product operation.

In Example 33, the subject matter of Examples 1-32 includes, wherein the QT forward operations include a QT inner product operation at a first layer, wherein the QT inner product operation accepts as an input a first quaternion-valued feature map from a prior layer; and wherein computation of layer-wise QT partial derivatives includes computation of a partial derivative of the loss function with respect to a QT conjugate of the first quaternion-valued feature map.

In Example 34, the subject matter of Examples 25-33 includes, wherein the computation of a partial derivative of the loss function with respect to the QT conjugate of the first quaternion-valued feature map is achieved based on computation of a partial derivative of the loss function with respect to a QT conjugate of an output of the QT inner product operation.

Example 35 is at least one machine-readable storage medium containing instructions that, when executed on a computing platform, cause the computing platform to implement a deep neural network (DNN) including: an input layer, an output layer, and a plurality of hidden layers arranged along a forward propagation path between the input layer and the output layer; wherein the input layer is to accept training data comprising quaternion values, and to output a quaternion-valued signal along the forward propagation path to at least one of the plurality of hidden layers; wherein at least some of the hidden layers include, quaternion layers to execute consistent quaternion (QT) forward operations based on one or more variable parameters, to produce a corresponding at least one feature map output along the forward propagation path; wherein the output layer is to produce a DNN result that is based on the QT forward operations; the DNN further including a loss function engine to produce a loss function representing an error between the DNN result and an expected result; wherein the quaternion layers are to execute QT backpropagation-based training operations that include: computation of layer-wise QT partial derivatives, consistent with an orthogonal basis of quaternion space, of the loss function with respect to a QT conjugate of the one or more variable parameters and of respective inputs to the quaternion layers, the QT partial derivatives being taken along a backwards propagation path that is opposite the forward propagation path, successively though the plurality of hidden layers; and updating of the variable parameters to reduce the error attributable to each corresponding hidden layer based on the QT partial derivatives.

In Example 36, the subject matter of Example 35 includes, wherein the training data represents an image.

In Example 37, the subject matter of Examples 35-36 includes, wherein the input layer is to perform at least one QT operation.

In Example 38, the subject matter of Example 37 includes, wherein the at least one QT operation includes non-commutative QT multiplication.

In Example 39, the subject matter of Examples 37-38 includes, wherein the at least one QT operation includes QT geometric product.

In Example 40, the subject matter of Examples 35-39 includes, wherein the QT forward operations include QT activation and QT pooling operations.

In Example 41, the subject matter of Examples 35-40 includes, wherein the QT forward operations include a QT activation operation selected from the group consisting of: a QT rectified linear unit operation, a QT sigmoid operation, or a QT hyperbolic tangent operation, wherein the QT activation operation is applied directly to an input signal that is passed to the QT activation operation.

In Example 42, the subject matter of Examples 35-41 includes, wherein the QT forward operations include a QT rectified linear unit operation that accepts an input comprising a quaternion value having a real part and an imaginary part, and produces as an output either: (a) the quaternion value itself, when the real part and the imaginary part are each a positive real number; or (b) a zero quaternion value, when any one of the real part or the imaginary part is not a positive real number.

In Example 43, the subject matter of Examples 35-42 includes, wherein the QT forward operations include a QT convolution operation.

In Example 44, the subject matter of Example 43 includes, wherein the QT convolution operation maintains spatial translational invariance.

In Example 45, the subject matter of Examples 35-44 includes, wherein the QT forward operations include a QT inner product operation.

In Example 46, the subject matter of Examples 35-45 includes, wherein computation of layer-wise QT partial derivatives of the loss function includes performing a QT chain rule operation.

In Example 47, the subject matter of Examples 35-46 includes, wherein the one or more variable parameters are quaternion-valued.

In Example 48, the subject matter of Examples 35-47 includes, wherein the one or more variable parameters include a weight parameter.

In Example 49, the subject matter of Examples 35-48 includes, wherein the weight parameter is a multi-dimensional quaternion value.

In Example 50, the subject matter of Examples 35-49 includes, wherein the one or more variable parameters include a bias parameter.

In Example 51, the subject matter of Examples 35-50 includes, wherein the weight parameter is a multi-dimensional quaternion value.

In Example 52, the subject matter of Examples 35-51 includes, wherein computation of the layer-wise QT partial derivatives produce QT gradients of the loss function with respect to all of the variable parameters of the hidden layers.

In Example 53, the subject matter of Examples 35-52 includes, wherein the QT forward operations include a QT convolution operation at a first layer and wherein the one or more variable parameters include a quaternion-valued bias parameter; and wherein computation of layer-wise QT partial derivatives includes computation of a partial derivative of the loss function with respect to a QT conjugate of the bias parameter.

In Example 54, the subject matter of Example 53 includes, wherein the computation of a partial derivative of the loss function with respect to the QT conjugate of the bias parameter is achieved based on computation of a partial derivative of the loss function with respect to a QT conjugate of an output of the QT convolution operation.

In Example 55, the subject matter of Examples 53-54 includes, wherein the training data includes an image having pixel indices x and y, and wherein the partial derivative of the loss function with respect to the QT conjugate of the bias parameter is computed based on a QT summation over the pixel indices x and y of the QT partial derivatives of the loss function with respect to an output of the QT convolution operation at the first layer.

In Example 56, the subject matter of Examples 35-55 includes, wherein the QT forward operations include a QT convolution operation at a first layer and wherein the one or more variable parameters include a quaternion-valued weight parameter; and wherein computation of layer-wise QT partial derivatives includes computation of a partial derivative of the loss function with respect to a QT conjugate of the weight parameter.

In Example 57, the subject matter of Example 56 includes, wherein the computation of a partial derivative of the loss function with respect to the QT conjugate of the weight parameter is achieved based on computation of a partial derivative of the loss function with respect to a QT conjugate of an output of the QT convolution operation.

In Example 58, the subject matter of Examples 56-57 includes, wherein the training data includes an image having pixel indices x and y, and wherein the partial derivative of the loss function with respect to the QT conjugate of the weight parameter is computed based on a QT summation over the pixel indices x and y of the QT partial derivatives of the loss function with respect to an output of the QT convolution operation at the first layer.

In Example 59, the subject matter of Examples 35-58 includes, wherein the QT forward operations include a QT convolution operation at a first layer, wherein the QT convolution operation accepts as an input a first quaternion-valued feature map from a prior layer; and wherein computation of layer-wise QT partial derivatives includes computation of a partial derivative of the loss function with respect to a QT conjugate of the first quaternion-valued feature map.

In Example 60, the subject matter of Example 59 includes, wherein the computation of a partial derivative of the loss function with respect to the QT conjugate of the first quaternion-valued feature map is achieved based on computation of a partial derivative of the loss function with respect to a QT conjugate of an output of the QT convolution operation.

In Example 61, the subject matter of Examples 35-60 includes, wherein the QT forward operations include a QT rectified linear unit operation at a first layer that produces a first quaternion-valued activation output; and wherein computation of layer-wise QT partial derivatives includes computation of a partial derivative of the loss function with respect to a QT conjugate of the first quaternion-valued activation output.

In Example 62, the subject matter of Examples 35-61 includes, wherein the QT forward operations include a QT pooling operation at a first layer that produces quaternion-valued pooling output based on quaternion-valued input to the first layer; and wherein computation of layer-wise QT partial derivatives includes computation of a sum of partial derivatives of the quaternion-valued pooling output to which the quaternion-valued input contributes.

In Example 63, the subject matter of Examples 35-62 includes, wherein the QT forward operations include a QT inner product operation at a first layer and wherein the one or more variable parameters include a quaternion-valued bias parameter; and wherein computation of layer-wise QT partial derivatives includes computation of a partial derivative of the loss function with respect to a QT conjugate of the bias parameter.

In Example 64, the subject matter of Example 63 includes, wherein the computation of a partial derivative of the loss function with respect to the QT conjugate of the bias parameter is achieved based on computation of a partial derivative of the loss function with respect to a QT conjugate of an output of the QT inner product operation.

In Example 65, the subject matter of Examples 35-64 includes, wherein the QT forward operations include a QT inner product operation at a first layer and wherein the one or more variable parameters include a quaternion-valued weight parameter; and wherein computation of layer-wise QT partial derivatives includes computation of a partial derivative of the loss function with respect to a QT conjugate of the weight parameter.

In Example 66, the subject matter of Example 65 includes, wherein the computation of a partial derivative of the loss function with respect to the QT conjugate of the weight parameter is achieved based on computation of a partial derivative of the loss function with respect to a QT conjugate of an output of the QT inner product operation.

In Example 67, the subject matter of Examples 35-66 includes, wherein the QT forward operations include a QT inner product operation at a first layer, wherein the QT inner product operation accepts as an input a first quaternion-valued feature map from a prior layer; and wherein computation of layer-wise QT partial derivatives includes computation of a partial derivative of the loss function with respect to a QT conjugate of the first quaternion-valued feature map.

In Example 68, the subject matter of Examples 59-67 includes, wherein the computation of a partial derivative of the loss function with respect to the QT conjugate of the first quaternion-valued feature map is achieved based on computation of a partial derivative of the loss function with respect to a QT conjugate of an output of the QT inner product operation.

Example 69 is a method for operating a deep neural network (DNN), the method comprising: providing an input layer, an output layer, and a plurality of hidden layers arranged along a forward propagation path between the input layer and the output layer; wherein the input layer is to accept training data comprising quaternion values, and to output a quaternion-valued signal along the forward propagation path to at least one of the plurality of hidden layers; wherein at least some of the hidden layers include, quaternion layers to execute consistent quaternion (QT) forward operations based on one or more variable parameters, to produce a corresponding at least one feature map output along the forward propagation path; wherein the output layer is to produce a DNN result that is based on the QT forward operations; providing a loss function engine to produce a loss function representing an error between the DNN result and an expected result; executing a QT backpropagation-based training operations that include: computing layer-wise QT partial derivatives, consistent with an orthogonal basis of quaternion space, of the loss function with respect to a QT conjugate of the one or more variable parameters and of respective inputs to the quaternion layers, the QT partial derivatives being taken along a backwards propagation path that is opposite the forward propagation path, successively though the plurality of hidden layers; and updating the variable parameters to reduce the error attributable to each corresponding hidden layer based on the QT partial derivatives.

In Example 70, the subject matter of Example 69 includes, wherein the training data represents an image.

In Example 71, the subject matter of Examples 69-70 includes, wherein the input layer is to perform at least one QT operation.

In Example 72, the subject matter of Example 71 includes, wherein the at least one QT operation includes non-commutative QT multiplication.

In Example 73, the subject matter of Examples 71-72 includes, wherein the at least one QT operation includes QT geometric product.

In Example 74, the subject matter of Examples 69-73 includes, wherein the QT forward operations include QT activation and QT pooling operations.

In Example 75, the subject matter of Examples 69-74 includes, wherein the QT forward operations include a QT activation operation selected from the group consisting of: a QT rectified linear unit operation, a QT sigmoid operation, or a QT hyperbolic tangent operation, wherein the QT activation operation is applied directly to an input signal that is passed to the QT activation operation.

In Example 76, the subject matter of Examples 69-75 includes, wherein the QT forward operations include a QT rectified linear unit operation that accepts an input comprising a quaternion value having a real part and an imaginary part, and produces as an output either: (a) the quaternion value itself, when the real part and the imaginary part are each a positive real number; or (b) a zero quaternion value, when any one of the real part or the imaginary part is not a positive real number.

In Example 77, the subject matter of Examples 69-76 includes, wherein the QT forward operations include a QT convolution operation.

In Example 78, the subject matter of Example 77 includes, wherein the QT convolution operation maintains spatial translational invariance.

In Example 79, the subject matter of Examples 69-78 includes, wherein the QT forward operations include a QT inner product operation.

In Example 80, the subject matter of Examples 69-79 includes, wherein computation of layer-wise QT partial derivatives of the loss function includes performing a QT chain rule operation.

In Example 81, the subject matter of Examples 69-80 includes, wherein the one or more variable parameters are quaternion-valued.

In Example 82, the subject matter of Examples 69-81 includes, wherein the one or more variable parameters include a weight parameter.

In Example 83, the subject matter of Examples 69-82 includes, wherein the weight parameter is a multi-dimensional quaternion value.

In Example 84, the subject matter of Examples 69-83 includes, wherein the one or more variable parameters include a bias parameter.

In Example 85, the subject matter of Examples 69-84 includes, wherein the weight parameter is a multi-dimensional quaternion value.

In Example 86, the subject matter of Examples 69-85 includes, wherein computation of the layer-wise QT partial derivatives produce QT gradients of the loss function with respect to all of the variable parameters of the hidden layers.

In Example 87, the subject matter of Examples 69-86 includes, wherein the QT forward operations include a QT convolution operation at a first layer and wherein the one or more variable parameters include a quaternion-valued bias parameter; and wherein computing the layer-wise QT partial derivatives includes computing a partial derivative of the loss function with respect to a QT conjugate of the bias parameter.

In Example 88, the subject matter of Example 87 includes, wherein the computing of a partial derivative of the loss function with respect to the QT conjugate of the bias parameter is achieved based on computation of a partial derivative of the loss function with respect to a QT conjugate of an output of the QT convolution operation.

In Example 89, the subject matter of Examples 87-88 includes, wherein the training data includes an image having pixel indices x and y, and wherein the partial derivative of the loss function with respect to the QT conjugate of the bias parameter is computed based on a QT summation over the pixel indices x and y of the QT partial derivatives of the loss function with respect to an output of the QT convolution operation at the first layer.

In Example 90, the subject matter of Examples 69-89 includes, wherein the QT forward operations include a QT convolution operation at a first layer and wherein the one or more variable parameters include a quaternion-valued weight parameter; and wherein computing layer-wise QT partial derivatives includes computing a partial derivative of the loss function with respect to a QT conjugate of the weight parameter.

In Example 91, the subject matter of Example 90 includes, wherein the computing a partial derivative of the loss function with respect to the QT conjugate of the weight parameter is achieved based on computation of a partial derivative of the loss function with respect to a QT conjugate of an output of the QT convolution operation.

In Example 92, the subject matter of Examples 90-91 includes, wherein the training data includes an image having pixel indices x and y, and wherein the partial derivative of the loss function with respect to the QT conjugate of the weight parameter is computed based on a QT summation over the pixel indices x and y of the QT partial derivatives of the loss function with respect to an output of the QT convolution operation at the first layer.

In Example 93, the subject matter of Examples 69-92 includes, wherein the QT forward operations include a QT convolution operation at a first layer, wherein the QT convolution operation accepts as an input a first quaternion-valued feature map from a prior layer; and wherein computing layer-wise QT partial derivatives includes computing a partial derivative of the loss function with respect to a QT conjugate of the first quaternion-valued feature map.

In Example 94, the subject matter of Example 93 includes, wherein computing the partial derivative of the loss function with respect to the QT conjugate of the first quaternion-valued feature map is achieved based on computation of a partial derivative of the loss function with respect to a QT conjugate of an output of the QT convolution operation.

In Example 95, the subject matter of Examples 69-94 includes, wherein the QT forward operations include a QT rectified linear unit operation at a first layer that produces a first quaternion-valued activation output; and wherein computing layer-wise QT partial derivatives includes computing a partial derivative of the loss function with respect to a QT conjugate of the first quaternion-valued activation output.

In Example 96, the subject matter of Examples 69-95 includes, wherein the QT forward operations include a QT pooling operation at a first layer that produces quaternion-valued pooling output based on quaternion-valued input to the first layer; and wherein computing layer-wise QT partial derivatives includes computing a sum of partial derivatives of the quaternion-valued pooling output to which the quaternion-valued input contributes.

In Example 97, the subject matter of Examples 69-96 includes, wherein the QT forward operations include a QT inner product operation at a first layer and wherein the one or more variable parameters include a quaternion-valued bias parameter; and wherein computing layer-wise QT partial derivatives includes computing a partial derivative of the loss function with respect to a QT conjugate of the bias parameter.

In Example 98, the subject matter of Example 97 includes, wherein computing the partial derivative of the loss function with respect to the QT conjugate of the bias parameter is achieved based on computation of a partial derivative of the loss function with respect to a QT conjugate of an output of the QT inner product operation.

In Example 99, the subject matter of Examples 69-98 includes, wherein the QT forward operations include a QT inner product operation at a first layer and wherein the one or more variable parameters include a quaternion-valued weight parameter; and wherein computing layer-wise QT partial derivatives includes computing a partial derivative of the loss function with respect to a QT conjugate of the weight parameter.

In Example 100, the subject matter of Example 99 includes, wherein computing the partial derivative of the loss function with respect to the QT conjugate of the weight parameter is achieved based on computation of a partial derivative of the loss function with respect to a QT conjugate of an output of the QT inner product operation.

In Example 101, the subject matter of Examples 69-100 includes, wherein the QT forward operations include a QT inner product operation at a first layer, wherein the QT inner product operation accepts as an input a first quaternion-valued feature map from a prior layer; and wherein computing layer-wise QT partial derivatives includes computing a partial derivative of the loss function with respect to a QT conjugate of the first quaternion-valued feature map.

In Example 102, the subject matter of Examples 93-101 includes, wherein computing the partial derivative of the loss function with respect to the QT conjugate of the first quaternion-valued feature map is achieved based on computation of a partial derivative of the loss function with respect to a QT conjugate of an output of the QT inner product operation.

Example 103 is a system for operating a deep neural network (DNN), the system comprising: means for providing an input layer, an output layer, and a plurality of hidden layers arranged along a forward propagation path between the input layer and the output layer; wherein the input layer is to accept training data comprising quaternion values, and to output a quaternion-valued signal along the forward propagation path to at least one of the plurality of hidden layers; wherein at least some of the hidden layers include, quaternion layers to execute consistent quaternion (QT) forward operations based on one or more variable parameters, to produce a corresponding at least one feature map output along the forward propagation path; wherein the output layer is to produce a DNN result that is based on the QT forward operations; means for producing a loss function representing an error between the DNN result and an expected result; means for executing QT backpropagation-based training operations that include: computing layer-wise QT partial derivatives, consistent with an orthogonal basis of quaternion space, of the loss function with respect to a QT conjugate of the one or more variable parameters and of respective inputs to the quaternion layers, the QT partial derivatives being taken along a backwards propagation path that is opposite the forward propagation path, successively though the plurality of hidden layers; and updating the variable parameters to reduce the error attributable to each corresponding hidden layer based on the QT partial derivatives.

In Example 104, the subject matter of Example 103 includes, wherein the training data represents an image.

In Example 105, the subject matter of Examples 103-104 includes, wherein the input layer is to perform at least one QT operation.

In Example 106, the subject matter of Example 105 includes, wherein the at least one QT operation includes non-commutative QT multiplication.

In Example 107, the subject matter of Examples 105-106 includes, wherein the at least one QT operation includes QT geometric product.

In Example 108, the subject matter of Examples 103-107 includes, wherein the QT forward operations include QT activation and QT pooling operations.

In Example 109, the subject matter of Examples 103-108 includes, wherein the QT forward operations include a QT activation operation selected from the group consisting of: a QT rectified linear unit operation, a QT sigmoid operation, or a QT hyperbolic tangent operation, wherein the QT activation operation is applied directly to an input signal that is passed to the QT activation operation.

In Example 110, the subject matter of Examples 103-109 includes, wherein the QT forward operations include a QT rectified linear unit operation that accepts an input comprising a quaternion value having a real part and an imaginary part, and produces as an output either: (a) the quaternion value itself, when the real part and the imaginary part are each a positive real number; or (b) a zero quaternion value, when any one of the real part or the imaginary part is not a positive real number.

In Example 111, the subject matter of Examples 103-110 includes, wherein the QT forward operations include a QT convolution operation.

In Example 112, the subject matter of Example 111 includes, wherein the QT convolution operation maintains spatial translational invariance.

In Example 113, the subject matter of Examples 103-112 includes, wherein the QT forward operations include a QT inner product operation.

In Example 114, the subject matter of Examples 103-113 includes, wherein computation of layer-wise QT partial derivatives of the loss function includes performing a QT chain rule operation.

In Example 115, the subject matter of Examples 103-114 includes, wherein the one or more variable parameters are quaternion-valued.

In Example 116, the subject matter of Examples 103-115 includes, wherein the one or more variable parameters include a weight parameter.

In Example 117, the subject matter of Examples 103-116 includes, wherein the weight parameter is a multi-dimensional quaternion value.

In Example 118, the subject matter of Examples 103-117 includes, wherein the one or more variable parameters include a bias parameter.

In Example 119, the subject matter of Examples 103-118 includes, wherein the weight parameter is a multi-dimensional quaternion value.

In Example 120, the subject matter of Examples 103-119 includes, wherein computation of the layer-wise QT partial derivatives produce QT gradients of the loss function with respect to all of the variable parameters of the hidden layers.

In Example 121, the subject matter of Examples 103-120 includes, wherein the QT forward operations include a QT convolution operation at a first layer and wherein the one or more variable parameters include a quaternion-valued bias parameter; and wherein computing the layer-wise QT partial derivatives includes computing a partial derivative of the loss function with respect to a QT conjugate of the bias parameter.

In Example 122, the subject matter of Example 121 includes, wherein the computing of a partial derivative of the loss function with respect to the QT conjugate of the bias parameter is achieved based on computation of a partial derivative of the loss function with respect to a QT conjugate of an output of the QT convolution operation.

In Example 123, the subject matter of Examples 121-122 includes, wherein the training data includes an image having pixel indices x and y, and wherein the partial derivative of the loss function with respect to the QT conjugate of the bias parameter is computed based on a QT summation over the pixel indices x and y of the QT partial derivatives of the loss function with respect to an output of the QT convolution operation at the first layer.

In Example 124, the subject matter of Examples 103-123 includes, wherein the QT forward operations include a QT convolution operation at a first layer and wherein the one or more variable parameters include a quaternion-valued weight parameter; and wherein computing layer-wise QT partial derivatives includes computing a partial derivative of the loss function with respect to a QT conjugate of the weight parameter.

In Example 125, the subject matter of Example 124 includes, wherein the computing a partial derivative of the loss function with respect to the QT conjugate of the weight parameter is achieved based on computation of a partial derivative of the loss function with respect to a QT conjugate of an output of the QT convolution operation.

In Example 126, the subject matter of Examples 124-125 includes, wherein the training data includes an image having pixel indices x and y, and wherein the partial derivative of the loss function with respect to the QT conjugate of the weight parameter is computed based on a QT summation over the pixel indices x and y of the QT partial derivatives of the loss function with respect to an output of the QT convolution operation at the first layer.

In Example 127, the subject matter of Examples 103-126 includes, wherein the QT forward operations include a QT convolution operation at a first layer, wherein the QT convolution operation accepts as an input a first quaternion-valued feature map from a prior layer; and wherein computing layer-wise QT partial derivatives includes computing a partial derivative of the loss function with respect to a QT conjugate of the first quaternion-valued feature map.

In Example 128, the subject matter of Example 127 includes, wherein computing the partial derivative of the loss function with respect to the QT conjugate of the first quaternion-valued feature map is achieved based on computation of a partial derivative of the loss function with respect to a QT conjugate of an output of the QT convolution operation.

In Example 129, the subject matter of Examples 103-128 includes, wherein the QT forward operations include a QT rectified linear unit operation at a first layer that produces a first quaternion-valued activation output; and wherein computing layer-wise QT partial derivatives includes computing a partial derivative of the loss function with respect to a QT conjugate of the first quaternion-valued activation output.

In Example 130, the subject matter of Examples 103-129 includes, wherein the QT forward operations include a QT pooling operation at a first layer that produces quaternion-valued pooling output based on quaternion-valued input to the first layer; and wherein computing layer-wise QT partial derivatives includes computing a sum of partial derivatives of the quaternion-valued pooling output to which the quaternion-valued input contributes.

In Example 131, the subject matter of Examples 103-130 includes, wherein the QT forward operations include a QT inner product operation at a first layer and wherein the one or more variable parameters include a quaternion-valued bias parameter; and wherein computing layer-wise QT partial derivatives includes computing a partial derivative of the loss function with respect to a QT conjugate of the bias parameter.

In Example 132, the subject matter of Example 131 includes, wherein computing the partial derivative of the loss function with respect to the QT conjugate of the bias parameter is achieved based on computation of a partial derivative of the loss function with respect to a QT conjugate of an output of the QT inner product operation.

In Example 133, the subject matter of Examples 103-132 includes, wherein the QT forward operations include a QT inner product operation at a first layer and wherein the one or more variable parameters include a quaternion-valued weight parameter; and wherein computing layer-wise QT partial derivatives includes computing a partial derivative of the loss function with respect to a QT conjugate of the weight parameter.

In Example 134, the subject matter of Example 133 includes, wherein computing the partial derivative of the loss function with respect to the QT conjugate of the weight parameter is achieved based on computation of a partial derivative of the loss function with respect to a QT conjugate of an output of the QT inner product operation.

In Example 135, the subject matter of Examples 103-134 includes, wherein the QT forward operations include a QT inner product operation at a first layer, wherein the QT inner product operation accepts as an input a first quaternion-valued feature map from a prior layer; and wherein computing layer-wise QT partial derivatives includes computing a partial derivative of the loss function with respect to a QT conjugate of the first quaternion-valued feature map.

In Example 136, the subject matter of Examples 127-135 includes, wherein computing the partial derivative of the loss function with respect to the QT conjugate of the first quaternion-valued feature map is achieved based on computation of a partial derivative of the loss function with respect to a QT conjugate of an output of the QT inner product operation.

Example 137 is a machine-learning system, comprising: processing hardware, including computation circuitry and data storage circuitry, the processing hardware configured to form a quaternion deep neural network (QTDNN) including: a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path; wherein each QT computation sublayer of the set includes, a plurality of QT computation engines; and wherein each modular hidden layer further includes a steering sublayer preceding each of the QT computation sublayers along the forward signal propagation path, wherein the steering sublayer is to direct a forward-propagating quaternion-valued signal to a selected at least one QT computation engine of a next QT computation subsequent sublayer.

In Example 138, the subject matter of Example 137 includes, wherein the QT general matrix multiplication sublayer includes a QT convolution engine and a QT inner product engine.

In Example 139, the subject matter of Example 138 includes, wherein the QT convolution engine and the QT inner product engine each comprise a plurality of kernels.

In Example 140, the subject matter of Example 139 includes, wherein the QT convolution engine is to perform QT operations, using QT general matrix multiplication, that maintain spatial translational invariance.

In Example 141, the subject matter of Examples 138-140 includes, wherein the QT convolution engine is to perform a QT summation of a quaternion-valued input signal, at successive shifts, QT-multiplied with a QT-valued filter, to produce a QT convolution output.

In Example 142, the subject matter of Example 141 includes, wherein the QT convolution engine is to further perform a QT addition of a quaternion-valued bias parameter with the QT convolution output.

In Example 143, the subject matter of Examples 141-142 includes, wherein the QT convolution engine is to perform a multi-dimensional QT convolution operation.

In Example 144, the subject matter of Examples 138-143 includes, wherein the QT inner product engine is to perform a series of term-wise QT multiplication operations between a quaternion-valued QT inner product input and a set of quaternion-valued weights, to produce a QT inner product output.

In Example 145, the subject matter of Example 144 includes, wherein the QT inner product engine is to further perform a QT addition of a quaternion-valued bias parameter with the QT inner product.

In Example 146, the subject matter of Examples 137-145 includes, wherein the QT non-linear activations sublayer includes a QT rectified linear activation unit (ReLU) engine, and at least one of: a QT sigmoid activation engine, or a QT hyperbolic tangent activation engine.

In Example 147, the subject matter of Example 146 includes, wherein the QT ReLU engine is to accept a quaternion-valued input comprising a real component and an imaginary component, and produce, as a QT ReLU output, the quaternion-valued input when each of the real and imaginary components is a positive real number, and to otherwise produce, as the QT ReLU output, a zero quaternion value.

In Example 148, the subject matter of Examples 146-147 includes, wherein the QT non-linear activations sublayer includes a pass-through block that passes an input signal of the QT non-linear activations sublayer to an output of the QT non-linear activations sublayer.

In Example 149, the subject matter of Examples 146-148 includes, wherein the QT ReLU engine is to accept an input comprising a quaternion value having a real part and an imaginary part, and produce as an output either: (a) the quaternion value itself, when the real part and the imaginary part are each a positive real number; or (b) a zero quaternion value, when any one of the real part or the imaginary part is not a positive real number.

In Example 150, the subject matter of Examples 137-149 includes, wherein the QT sampling sublayer includes a QT max pooling engine, and a QT average pooling engine.

In Example 151, the subject matter of Example 150 includes, wherein the QT sampling sublayer includes a pass-through block that passes an input signal of the QT sampling sublayer to an output of the QT sampling sublayer.

In Example 152, the subject matter of Examples 150-151 includes, wherein at least one pooling engine from among the QT max pooling engine or the QT average pooling engine is to compute a QT norm of a quaternion-valued portion of an input to the QT sampling sublayer to produce a first scalar value, and to compare the first scalar value against other QT norm-produced scalar values to produce a QT pooling operation output.

In Example 153, the subject matter of Examples 137-152 includes, wherein the quaternion-valued signal represents an image.

In Example 154, the subject matter of Examples 137-153 includes, wherein each one of the set of QT computation sublayers is to perform QT operations including non-commutative QT multiplication.

In Example 155, the subject matter of Examples 137-154 includes, wherein each one of the set of QT computation sublayers is to perform QT operations including QT geometric product.

In Example 156, the subject matter of Examples 137-155 includes, wherein a first steering sublayer is to partition the input signal into a first portion directed to a first QT computation engine of a corresponding subsequent QT computation sublayer, and a second portion directed to a second QT computation engine of the subsequent QT computation sublayer.

In Example 157, the subject matter of Examples 137-156 includes, wherein the subsequent QT computation sublayer includes a pass-through first steering sublayer is to select at least one QT computation engine of a corresponding subsequent QT computation sublayer, from among a first and a second QT computation engine, to perform a QT computation operation.

In Example 158, the subject matter of Example 157 includes, wherein the subsequent QT computation sublayer includes a pass-through block that passes an input signal of the QT computation sublayer to an output of the QT computation sublayer; and wherein the first steering sublayer is to select the pass-through block from among the first QT computation engine, the second QT computation engine, and the pass-through block, to either perform, or bypass, a QT computation operation.

Example 159 is a method for operating a quaternion deep neural network (QTDNN), the method comprising: providing a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path; providing, in each QT computation sublayer of the set, a plurality of QT computation engines; providing, in each modular hidden layer, a steering sublayer preceding each of the QT computation sublayers along the forward signal propagation path; and directing, by the steering sublayer, a forward-propagating quaternion-valued signal to a selected at least one QT computation engine of a next QT computation subsequent sublayer.

In Example 160, the subject matter of Example 159 includes, wherein the QT general matrix multiplication sublayer includes a QT convolution engine and a QT inner product engine.

In Example 161, the subject matter of Example 160 includes, wherein the QT convolution engine and the QT inner product engine each comprise a plurality of kernels.

In Example 162, the subject matter of Example 161 includes, wherein the QT convolution engine is to perform QT operations, using QT general matrix multiplication, that maintain spatial translational invariance.

In Example 163, the subject matter of Examples 160-162 includes, wherein the QT convolution engine is to perform a QT summation of a quaternion-valued input signal, at successive shifts, QT-multiplied with a QT-valued filter, to produce a QT convolution output.

In Example 164, the subject matter of Example 163 includes, wherein the QT convolution engine is to further perform a QT addition of a quaternion-valued bias parameter with the QT convolution output.

In Example 165, the subject matter of Examples 163-164 includes, wherein the QT convolution engine is to perform a multi-dimensional QT convolution operation.

In Example 166, the subject matter of Examples 160-165 includes, wherein the QT inner product engine is to perform a series of term-wise QT multiplication operations between a quaternion-valued QT inner product input and a set of quaternion-valued weights, to produce a QT inner product output.

In Example 167, the subject matter of Example 166 includes, wherein the QT inner product engine is to further perform a QT addition of a quaternion-valued bias parameter with the QT inner product.

In Example 168, the subject matter of Examples 159-167 includes, wherein the QT non-linear activations sublayer includes a QT rectified linear activation unit (ReLU) engine, and at least one of: a QT sigmoid activation engine, or a QT hyperbolic tangent activation engine.

In Example 169, the subject matter of Example 168 includes, wherein the QT ReLU engine is to accept a quaternion-valued input comprising a real component and an imaginary component, and produce, as a QT ReLU output, the quaternion-valued input when each of the real and imaginary components is a positive real number, and to otherwise produce, as the QT ReLU output, a zero quaternion value.

In Example 170, the subject matter of Examples 168-169 includes, wherein the QT non-linear activations sublayer includes a pass-through block that passes an input signal of the QT non-linear activations sublayer to an output of the QT non-linear activations sublayer.

In Example 171, the subject matter of Examples 168-170 includes, wherein the QT ReLU engine is to accept an input comprising a quaternion value having a real part and an imaginary part, and produce as an output either: (a) the quaternion value itself, when the real part and the imaginary part are each a positive real number; or (b) a zero quaternion value, when any one of the real part or the imaginary part is not a positive real number.

In Example 172, the subject matter of Examples 159-171 includes, wherein the QT sampling sublayer includes a QT max pooling engine, and a QT average pooling engine.

In Example 173, the subject matter of Example 172 includes, wherein the QT sampling sublayer includes a pass-through block that passes an input signal of the QT sampling sublayer to an output of the QT sampling sublayer.

In Example 174, the subject matter of Examples 172-173 includes, wherein at least one pooling engine from among the QT max pooling engine or the QT average pooling engine is to compute a QT norm of a quaternion-valued portion of an input to the QT sampling sublayer to produce a first scalar value, and to compare the first scalar value against other QT norm-produced scalar values to produce a QT pooling operation output.

In Example 175, the subject matter of Examples 159-174 includes, wherein the quaternion-valued signal represents an image.

In Example 176, the subject matter of Examples 159-175 includes, wherein each one of the set of QT computation sublayers is to perform QT operations including non-commutative QT multiplication.

In Example 177, the subject matter of Examples 159-176 includes, wherein each one of the set of QT computation sublayers is to perform QT operations including QT geometric product.

In Example 178, the subject matter of Examples 159-177 includes, wherein a first steering sublayer is to partition the input signal into a first portion directed to a first QT computation engine of a corresponding subsequent QT computation sublayer, and a second, portion directed to a second QT computation engine of the subsequent QT computation sublayer.

In Example 179, the subject matter of Examples 159-178 includes, wherein the subsequent QT computation sublayer includes a pass-through first steering sublayer is to select at least one QT computation engine of a corresponding subsequent QT computation sublayer, from among a first and a second QT computation engine, to perform a QT computation operation.

In Example 180, the subject matter of Example 179 includes, wherein the subsequent QT computation sublayer includes a pass-through block that passes an input signal of the QT computation sublayer to an output of the QT computation sublayer; and wherein the first steering sublayer is to select the pass-through block from among the first QT computation engine, the second QT computation engine, and the pass-through block, to either perform, or bypass, a QT computation operation.

Example 181 is at least one machine-readable storage medium comprising instructions that, when executed on a computing platform, cause the computing platform to form a quaternion deep neural network (QTDNN) including: a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path; wherein each QT computation sublayer of the set includes, a plurality of QT computation engines; and wherein each modular hidden layer further includes a steering sublayer preceding each of the QT computation sublayers along the forward signal propagation path, wherein the steering sublayer is to direct a forward-propagating quaternion-valued signal to a selected at least one QT computation engine of a next QT computation subsequent sublayer.

In Example 182, the subject matter of Example 181 includes, wherein the QT general matrix multiplication sublayer includes a QT convolution engine and a QT inner product engine.

In Example 183, the subject matter of Example 182 includes, wherein the QT convolution engine and the QT inner product engine each comprise a plurality of kernels.

In Example 184, the subject matter of Example 183 includes, wherein the QT convolution engine is to perform QT operations, using QT general matrix multiplication, that maintain spatial translational invariance.

In Example 185, the subject matter of Examples 182-184 includes, wherein the QT convolution engine is to perform a QT summation of a quaternion-valued input signal, at successive shifts, QT-multiplied with a QT-valued filter, to produce a QT convolution output.

In Example 186, the subject matter of Example 185 includes, wherein the QT convolution engine is to further perform a QT addition of a quaternion-valued bias parameter with the QT convolution output.

In Example 187, the subject matter of Examples 185-186 includes, wherein the QT convolution engine is to perform a multi-dimensional QT convolution operation.

In Example 188, the subject matter of Examples 182-187 includes, wherein the QT inner product engine is to perform a series of term-wise QT multiplication operations between a quaternion-valued QT inner product input and a set of quaternion-valued weights, to produce a QT inner product output.

In Example 189, the subject matter of Example 188 includes, wherein the QT inner product engine is to further perform a QT addition of a quaternion-valued bias parameter with the QT inner product.

In Example 190, the subject matter of Examples 181-189 includes, wherein the QT non-linear activations sublayer includes a QT rectified linear activation unit (ReLU) engine, and at least one of: a QT sigmoid activation engine, or a QT hyperbolic tangent activation engine.

In Example 191, the subject matter of Example 190 includes, wherein the QT ReLU engine is to accept a quaternion-valued input comprising a real component and an imaginary component, and produce, as a QT ReLU output, the quaternion-valued input when each of the real and imaginary components is a positive real number, and to otherwise produce, as the QT ReLU output, a zero quaternion value.

In Example 192, the subject matter of Examples 190-191 includes, wherein the QT non-linear activations sublayer includes a pass-through block that passes an input signal of the QT non-linear activations sublayer to an output of the QT non-linear activations sublayer.

In Example 193, the subject matter of Examples 190-192 includes, wherein the QT ReLU engine is to accept an input comprising a quaternion value having a real part and an imaginary part, and produce as an output either: (a) the quaternion value itself, when the real part and the imaginary part are each a positive real number; or (b) a zero quaternion value, when any one of the real part or the imaginary part is not a positive real number.

In Example 194, the subject matter of Examples 181-193 includes, wherein the QT sampling sublayer includes a QT max pooling engine, and a QT average pooling engine.

In Example 195, the subject matter of Example 194 includes, wherein the QT sampling sublayer includes a pass-through block that passes an input signal of the QT sampling sublayer to an output of the QT sampling sublayer.

In Example 196, the subject matter of Examples 194-195 includes, wherein at least one pooling engine from among the QT max pooling engine or the QT average pooling engine is to compute a QT norm of a quaternion-valued portion of an input to the QT sampling sublayer to produce a first scalar value, and to compare the first scalar value against other QT norm-produced scalar values to produce a QT pooling operation output.

In Example 197, the subject matter of Examples 181-196 includes, wherein the quaternion-valued signal represents an image.

In Example 198, the subject matter of Examples 181-197 includes, wherein each one of the set of QT computation sublayers is to perform QT operations including non-commutative QT multiplication.

In Example 199, the subject matter of Examples 181-198 includes, wherein each one of the set of QT computation sublayers is to perform QT operations including QT geometric product.

In Example 200, the subject matter of Examples 181-199 includes, wherein a first steering sublayer is to partition the input signal into a first portion directed to a first QT computation engine of a corresponding subsequent QT computation sublayer, and a second portion directed to a second QT computation engine of the subsequent QT computation sublayer.

In Example 201, the subject matter of Examples 181-200 includes, wherein the subsequent QT computation sublayer includes a pass-through first steering sublayer is to select at least one QT computation engine of a corresponding subsequent QT computation sublayer, from among a first and a second QT computation engine, to perform a QT computation operation.

In Example 202, the subject matter of Example 201 includes, wherein the subsequent QT computation sublayer includes a pass-through block that passes an input signal of the QT computation sublayer to an output of the QT computation sublayer; and wherein the first steering sublayer is to select the pass-through block from among the first QT computation engine, the second QT computation engine, and the pass-through block, to either perform, or bypass, a QT computation operation.

Example 203 is a system for implementing a quaternion deep neural network (QTDNN), the system comprising: means for providing a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path; wherein each QT computation sublayer of the set includes, a plurality of QT computation means; and wherein each modular hidden layer further includes steering means preceding each of the QT computation sublayers along the forward signal propagation path, wherein the steering means is to direct a forward-propagating quaternion-valued signal to a selected at least one QT computation means of a next QT computation subsequent sublayer.

In Example 204, the subject matter of Example 203 includes, wherein the QT general matrix multiplication sublayer includes QT convolution means and QT inner product means.

In Example 205, the subject matter of Example 204 includes, wherein the QT convolution means and the QT inner product means each comprise a plurality of kernels.

In Example 206, the subject matter of Example 205 includes, wherein the QT convolution means are to perform QT operations, using QT general matrix multiplication, that maintain spatial translational invariance.

In Example 207, the subject matter of Examples 204-206 includes, wherein the QT convolution means are to perform a QT summation of a quaternion-valued input signal, at successive shifts, QT-multiplied with a QT-valued filter, to produce a QT convolution output In Example 208, the subject matter of Example 207 includes, wherein the QT convolution means are to further perform a QT addition of a quaternion-valued bias parameter with the QT convolution output.

In Example 209, the subject matter of Examples 207-208 includes, wherein the QT convolution means are to perform a multi-dimensional QT convolution operation.

In Example 210, the subject matter of Examples 204-209 includes, wherein the QT inner product means are to perform a series of term-wise QT multiplication operations between a quaternion-valued QT inner product input and a set of quaternion-valued weights, to produce a QT inner product output.

In Example 211, the subject matter of Example 210 includes, wherein the QT inner product means are to further perform a QT addition of a quaternion-valued bias parameter with the QT inner product.

In Example 212, the subject matter of Examples 203-211 includes, wherein the QT non-linear activations sublayer includes a QT rectified linear activation unit (ReLU) means, and at least one of: a QT sigmoid activation means, or a QT hyperbolic tangent activation means.

In Example 213, the subject matter of Example 212 includes, wherein the QT ReLU means are to accept a quaternion-valued input comprising a real component and an imaginary component, and produce, as a QT ReLU output, the quaternion-valued input when each of the real and imaginary components is a positive real number, and to otherwise produce, as the QT ReLU output, a zero quaternion value.

In Example 214, the subject matter of Examples 212-213 includes, wherein the QT non-linear activations sublayer includes a pass-through block that passes an input signal of the QT non-linear activations sublayer to an output of the QT non-linear activations sublayer.

In Example 215, the subject matter of Examples 212-214 includes, wherein the QT ReLU means are to accept an input comprising a quaternion value having a real part and an imaginary part, and produce as an output either: (a) the quaternion value itself, when the real part and the imaginary part are each a positive real number; or (b) a zero quaternion value, when any one of the real part or the imaginary part is not a positive real number.

In Example 216, the subject matter of Examples 203-215 includes, wherein the QT sampling sublayer includes QT max pooling means, and QT average pooling means.

In Example 217, the subject matter of Example 216 includes, wherein the QT sampling sublayer includes a pass-through block that passes an input signal of the QT sampling sublayer to an output of the QT sampling sublayer.

In Example 218, the subject matter of Examples 216-217 includes, wherein at least one pooling means from among the QT max pooling means or the QT average pooling means are to compute a QT norm of a quaternion-valued portion of an input to the QT sampling sublayer to produce a first scalar value, and to compare the first scalar value against other QT norm-produced scalar values to produce a QT pooling operation output.

In Example 219, the subject matter of Examples 203-218 includes, wherein the quaternion-valued signal represents an image.

In Example 220, the subject matter of Examples 203-219 includes, wherein each one of the set of QT computation sublayers is to perform QT operations including non-commutative QT multiplication.

In Example 221, the subject matter of Examples 203-220 includes, wherein each one of the set of QT computation sublayers is to perform QT operations including QT geometric product.

In Example 222, the subject matter of Examples 203-221 includes, wherein a first steering sublayer is to partition the input signal into a first portion directed to a first QT computation means of a corresponding subsequent QT computation sublayer, and a second portion directed to a second QT computation means of the subsequent QT computation sublayer.

In Example 223, the subject matter of Examples 203-222 includes, wherein the subsequent QT computation sublayer includes a pass-through first steering sublayer is to select at least one QT computation means of a corresponding subsequent QT computation sublayer, from among a first and a second QT computation means, to perform a QT computation operation.

In Example 224, the subject matter of Example 223 includes, wherein the subsequent QT computation sublayer includes a pass-through block that passes an input signal of the QT computation sublayer to an output of the QT computation sublayer; and wherein the first steering sublayer is to select the pass-through block from among the first QT computation means, the second QT computation means, and the pass-through block, to either perform, or bypass, a QT computation operation.

Example 225 is a machine-learning system, comprising: processing hardware, including computation circuitry and data storage circuitry, the processing hardware configured to form a quaternion (QT) computation engine; wherein input data to the QT computation engine includes, quaternion values, each comprising a real component and three imaginary components, represented as a set of real-valued tensors, wherein: a single quaternion value is represented as a 1-dimensional real-valued tensor having four real-valued components, wherein a first real-valued component represents the real component of the single quaternion value, and wherein a second, a third, and a fourth real-valued component each respectively represents one of the imaginary components; a quaternion-valued vector having a size N is represented as a 2-dimensional real-valued tensor comprising N 1-dimensional real-valued tensors; and a quaternion-valued matrix having N×M dimensions is represented as a 3-dimensional real-valued tensor comprising M 2-dimensional real-valued tensors comprising N 1-dimensional real-valued tensors.

In Example 226, the subject matter of Example 225 includes, wherein the QT computation engine is part of a quaternion deep neural network (QTDNN) that includes: a set of one or more hidden layers, each comprising a set of QT computation sublayers, wherein one of the QT computation sublayers of the set includes the QT computation engine.

In Example 227, the subject matter of Examples 225-226 includes, wherein the input data represents a first image having three channels representing red, green, and blue intensity values, and wherein the first image is encoded as a set of single quaternion values wherein the first-real-valued component of the 1-dimensional tensor corresponding to the real quaternion component is set to zero, and wherein the red, green, and blue channel values are represented by the second, third, and fourth real-valued components of the 1-dimensional tensor corresponding to the imaginary components.

In Example 228, the subject matter of Example 227 includes, wherein the set of quaternion values is further encoded as a four-dimensional tensor having a first dimension representing pixels along a height of the first image, a second dimension representing pixels along a width of the image, a third dimension of 1, and a fourth dimension of the single quaternion values.

In Example 229, the subject matter of Example 228 includes, wherein the input data comprises a batch of images including the first image, and wherein the QT computation engine is to process the batch of images together using QT computation operations.

In Example 230, the subject matter of Example 229 includes, wherein the batch of images is represented as a five-dimensional tensor having a first dimension representing the images of the batch, and the remaining dimensions representing the four-dimensional tensor.

In Example 231, the subject matter of Example 230 includes, wherein the QT computation engine includes a QT convolution kernel having a window size S*T on an input image having C channels is represented as a four-dimensional tensor having a first dimension S, a second dimension T, a third dimension C, and a fourth dimension of 4.

In Example 232, the subject matter of Examples 230-231 includes, wherein the QT computation engine includes a QT convolution engine having K kernels, each having a window size S*T on an input image having C channels is represented as a five-dimensional tensor having a first dimension K, a second dimension S, a third dimension T, a fourth dimension C, and a fifth dimension of 4.

In Example 233, the subject matter of Examples 225-232 includes, wherein the QT computation engine is configured to perform a plurality of QT computation operations, including non-commutative QT multiplication on quaternion values represented as real-valued tensors.

In Example 234, the subject matter of Examples 225-233 includes, wherein the QT computation engine is configured to perform a plurality of QT computation operations, including QT geometric product on quaternion values represented as real-valued tensors.

In Example 235, the subject matter of Examples 225-234 includes, wherein the QT computation engine is configured to perform a plurality of QT computation operations, including QT involution on quaternion values represented as real-valued tensors.

In Example 236, the subject matter of Examples 225-235 includes, wherein the QT computation engine is preconfigured with QT operational blocks of four dimensions, five dimensions, and 6 dimensions.

Example 237 is a method for operating a quaternion (QT) computation engine, the method comprising: receiving input data by the QT computation engine; and storing the input data by the QT computation engine, the input data including quaternion values, each comprising a real component and three imaginary components, represented as a set of real-valued tensors, wherein: a single quaternion value is represented as a 1-dimensional real-valued tensor having four real-valued components, wherein a first real-valued component represents the real component of the single quaternion value, and wherein a second, a third, and a fourth real-valued component each respectively represents one of the imaginary components; a quaternion-valued vector having a size N is represented as a 2-dimensional real-valued tensor comprising N 1-dimensional real-valued tensors; and a quaternion-valued matrix having N×M dimensions is represented as a 3-dimensional real-valued tensor comprising M 2-dimensional real-valued tensors comprising N 1-dimensional real-valued tensors.

In Example 238, the subject matter of Example 237 includes, wherein the QT computation engine is part of a quaternion deep neural network (QTDNN) that includes: a set of one or more hidden layers, each comprising a set of QT computation sublayers, wherein one of the QT computation sublayers of the set includes the QT computation engine.

In Example 239, the subject matter of Examples 237-238 includes, wherein the input data represents a first image having three channels representing red, green, and blue intensity values, and wherein the first image is encoded as a set of single quaternion values wherein the first-real-valued component of the 1-dimensional tensor corresponding to the real quaternion component is set to zero, and wherein the red, green, and blue channel values are represented by the second, third, and fourth real-valued components of the 1-dimensional tensor corresponding to the imaginary components.

In Example 240, the subject matter of Example 239 includes, wherein the set of quaternion values is further encoded as a four-dimensional tensor having a first dimension representing pixels along a height of the first image, a second dimension representing pixels along a width of the image, a third dimension of 1, and a fourth dimension of the single quaternion values.

In Example 241, the subject matter of Example 240 includes, wherein the input data comprises a batch of images including the first image, and wherein the QT computation engine is to process the batch of images together using QT computation operations.

In Example 242, the subject matter of Example 241 includes, wherein the batch of images is represented as a five-dimensional tensor having a first dimension representing the images of the batch, and the remaining dimensions representing the four-dimensional tensor.

In Example 243, the subject matter of Example 242 includes, wherein the QT computation engine includes a QT convolution kernel having a window size S*T on an input image having C channels is represented as a four-dimensional tensor having a first dimension S, a second dimension T, a third dimension C, and a fourth dimension of 4.

In Example 244, the subject matter of Examples 242-243 includes, wherein the QT computation engine includes a QT convolution engine having K kernels, each having a window size S*T on an input image having C channels is represented as a five-dimensional tensor having a first dimension K, a second dimension S, a third dimension T, a fourth dimension C, and a fifth dimension of 4.

In Example 245, the subject matter of Examples 237-244 includes, performing, by the QT computation engine, a plurality of QT computation operations, including non-commutative QT multiplication on quaternion values represented as real-valued tensors.

In Example 246, the subject matter of Examples 237-245 includes, performing, by the QT computation engine, a plurality of QT computation operations, including QT geometric product on quaternion values represented as real-valued tensors.

In Example 247, the subject matter of Examples 237-246 includes, performing, by the QT computation engine, a plurality of QT computation operations, including QT involution on quaternion values represented as real-valued tensors.

In Example 248, the subject matter of Examples 237-247 includes, configuring the QT computation engine with QT operational blocks of four dimensions, five dimensions, and 6 dimensions.

Example 249 is a system for operating a quaternion (QT) computation engine, the system comprising: means for receiving input data by the QT computation engine; and means for storing the input data by the QT computation engine, the input data including quaternion values, each comprising a real component and three imaginary components, represented as a set of real-valued tensors, wherein: a single quaternion value is represented as a 1-dimensional real-valued tensor having four real-valued components, wherein a first real-valued component represents the real component of the single quaternion value, and wherein a second, a third, and a fourth real-valued component each respectively represents one of the imaginary components; a quaternion-valued vector having a size N is represented as a 2-dimensional real-valued tensor comprising N 1-dimensional real-valued tensors; and a quaternion-valued matrix having N×M dimensions is represented as a 3-dimensional real-valued tensor comprising M 2-dimensional real-valued tensors comprising N 1-dimensional real-valued tensors.

In Example 250, the subject matter of Example 249 includes, wherein the QT computation engine is part of a quaternion deep neural network (QTDNN) that includes: a set of one or more hidden layers, each comprising a set of QT computation sublayers, wherein one of the QT computation sublayers of the set includes the QT computation engine.

In Example 251, the subject matter of Examples 249-250 includes, wherein the input data represents a first image having three channels representing red, green, and blue intensity values, and wherein the first image is encoded as a set of single quaternion values wherein the first-real-valued component of the 1-dimensional tensor corresponding to the real quaternion component is set to zero, and wherein the red, green, and blue channel values are represented by the second, third, and fourth real-valued components of the 1-dimensional tensor corresponding to the imaginary components.

In Example 252, the subject matter of Example 251 includes, wherein the set of quaternion values is further encoded as a four-dimensional tensor having a first dimension representing pixels along a height of the first image, a second dimension representing pixels along a width of the image, a third dimension of 1, and a fourth dimension of the single quaternion values.

In Example 253, the subject matter of Example 252 includes, wherein the input data comprises a batch of images including the first image, and wherein the QT computation engine is to process the batch of images together using QT computation operations.

In Example 254, the subject matter of Example 253 includes, wherein the batch of images is represented as a five-dimensional tensor having a first dimension representing the images of the batch, and the remaining dimensions representing the four-dimensional tensor.

In Example 255, the subject matter of Example 254 includes, wherein the QT computation engine includes a QT convolution kernel having a window size S*T on an input image having C channels is represented as a four-dimensional tensor having a first dimension S, a second dimension T, a third dimension C, and a fourth dimension of 4.

In Example 256, the subject matter of Examples 254-255 includes, wherein the QT computation engine includes a QT convolution engine having K kernels, each having a window size S*T on an input image having C channels is represented as a five-dimensional tensor having a first dimension K, a second dimension S, a third dimension T, a fourth dimension C, and a fifth dimension of 4.

In Example 257, the subject matter of Examples 249-256 includes, means for performing, by the QT computation engine, a plurality of QT computation operations, including non-commutative QT multiplication on quaternion values represented as real-valued tensors.

In Example 258, the subject matter of Examples 249-257 includes, means for performing, by the QT computation engine, a plurality of QT computation operations, including QT geometric product on quaternion values represented as real-valued tensors.

In Example 259, the subject matter of Examples 249-258 includes, means for performing, by the QT computation engine, a plurality of QT computation operations, including QT involution on quaternion values represented as real-valued tensors.

In Example 260, the subject matter of Examples 249-259 includes, means for configuring the QT computation engine with QT operational blocks of four dimensions, five dimensions, and 6 dimensions.

Example 261 is at least one machine-readable medium containing instructions that, when executed by a computing platform, cause the computing platform to implement a quaternion (QT) computation engine to: receive input data; and store and process the input data, the input data including quaternion values, each comprising a real component and three imaginary components, represented as a set of real-valued tensors, wherein: a single quaternion value is represented as a 1-dimensional real-valued tensor having four real-valued components, wherein a first real-valued component represents the real component of the single quaternion value, and wherein a second, a third, and a fourth real-valued component each respectively represents one of the imaginary components; a quaternion-valued vector having a size N is represented as a 2-dimensional real-valued tensor comprising N 1-dimensional real-valued tensors; and a quaternion-valued matrix having N×M dimensions is represented as a 3-dimensional real-valued tensor comprising M 2-dimensional real-valued tensors comprising N 1-dimensional real-valued tensors.

In Example 262, the subject matter of Example 261 includes, wherein the QT computation engine is part of a quaternion deep neural network (QTDNN) that includes: a set of one or more hidden layers, each comprising a set of QT computation sublayers, wherein one of the QT computation sublayers of the set includes the QT computation engine.

In Example 263, the subject matter of Examples 261-262 includes, wherein the input data represents a first image having three channels representing red, green, and blue intensity values, and wherein the first image is encoded as a set of single quaternion values wherein the first-real-valued component of the 1-dimensional tensor corresponding to the real quaternion component is set to zero, and wherein the red, green, and blue channel values are represented by the second, third, and fourth real-valued components of the 1-dimensional tensor corresponding to the imaginary components.

In Example 264, the subject matter of Example 263 includes, wherein the set of quaternion values is further encoded as a four-dimensional tensor having a first dimension representing pixels along a height of the first image, a second dimension representing pixels along a width of the image, a third dimension of 1, and a fourth dimension of the single quaternion values.

In Example 265, the subject matter of Example 264 includes, wherein the input data comprises a batch of images including the first image, and wherein the QT computation engine is to process the batch of images together using QT computation operations.

In Example 266, the subject matter of Example 265 includes, wherein the batch of images is represented as a five-dimensional tensor having a first dimension representing the images of the batch, and the remaining dimensions representing the four-dimensional tensor.

In Example 267, the subject matter of Example 266 includes, wherein the QT computation engine includes a QT convolution kernel having a window size S*T on an input image having C channels is represented as a four-dimensional tensor having a first dimension S, a second dimension T, a third dimension C, and a fourth dimension of 4.

In Example 268, the subject matter of Examples 266-267 includes, wherein the QT computation engine includes a QT convolution engine having K kernels, each having a window size S*T on an input image having C channels is represented as a five-dimensional tensor having a first dimension K, a second dimension S, a third dimension T, a fourth dimension C, and a fifth dimension of 4.

In Example 269, the subject matter of Examples 261-268 includes, wherein the instructions are to further cause the computing platform to perform a plurality of QT computation operations, including non-commutative QT multiplication on quaternion values represented as real-valued tensors.

In Example 270, the subject matter of Examples 261-269 includes, wherein the instructions are to further cause the computing platform to perform a plurality of QT computation operations, including QT geometric product on quaternion values represented as real-valued tensors.

In Example 271, the subject matter of Examples 261-270 includes, wherein the instructions are to further cause the computing platform to perform a plurality of QT computation operations, including QT involution on quaternion values represented as real-valued tensors.

In Example 272, the subject matter of Examples 261-271 includes, wherein the instructions are to further cause the computing platform to configure the QT computation engine with QT operational blocks of four dimensions, five dimensions, and 6 dimensions.

Example 273 is at least one machine-readable medium including instructions that, when executed by processing circuitry, cause the processing circuitry to perform operations to implement of any of Examples 1-272.

Example 274 is an apparatus comprising means to implement of any of Examples 1-272.

Example 275 is a system to implement of any of Examples 1-272.

Example 276 is a method to implement of any of Examples 1-272.

It should be noted that, while the examples and description of illustrative embodiments detailed above are in the context of quaternion values, other types of complex or hypercomplex values may be accommodated utilizing principles of the embodiments described herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

COMPUTER PROGRAM LISTING APPENDIX

ComputerProgramListingAppendix U.S. Ser. No. 16/613,365 1884301US1x.txt, created on Oct. 10, 2022, 28 KB, which is incorporated herein by reference in its entirety.

What is claimed is:

1. A method for operating a quaternion deep neural network (QTDNN), the method comprising:
providing a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path;

providing, in each QT computation sublayer of the set, a plurality of QT computation engines;

providing, in each modular hidden layer, a steering sublayer preceding each of the QT computation sublayers along the forward signal propagation path; and directing, by the steering sublayer, a forward-propagating quaternion-valued signal to a selected at least one QT computation engine of a next QT computation subsequent sublayer.

2. The method of claim 1, wherein the QT general matrix multiplication sublayer includes a QT convolution engine and a QT inner product engine.

3. The method of claim 2, wherein the QT convolution engine and the QT inner product engine each comprise a plurality of kernels.

4. The method of claim 3, wherein the QT convolution engine is to perform QT operations, using QT general matrix multiplication, that maintain spatial translational invariance.

5. The method of claim 2, wherein the QT convolution engine is to perform a QT summation of a quaternion-valued input signal, at successive shifts, QT-multiplied with a QT-valued filter, to produce a QT convolution output.

6. The method of claim 5, wherein the QT convolution engine is to further perform a QT addition of a quaternion-valued bias parameter with the QT convolution output.

7. The method of claim 5, wherein the QT convolution engine is to perform a multi-dimensional QT convolution operation.

8. The method of claim 2, wherein the QT inner product engine is to perform a series of term-wise QT multiplication operations between a quaternion-valued QT inner product input and a set of quaternion-valued weights, to produce a QT inner product output.

9. At least one non-transitory machine-readable medium including instructions for operating a quaternion deep neural network (QTDNN), the instructions, when executed by processing circuitry, cause the processing circuitry to perform operations comprising:

providing a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path;

providing, in each QT computation sublayer of the set, a plurality of QT computation engines;

providing, in each modular hidden layer, a steering sublayer preceding each of the QT computation sublayers along the forward signal propagation path; and directing, by the steering sublayer, a forward-propagating quaternion-valued signal to a selected at least one QT computation engine of a next QT computation subsequent sublayer.

10. The at least one non-transitory machine-readable medium of claim 9, wherein the QT general matrix multiplication sublayer includes a QT convolution engine and a QT inner product engine.

11. The at least one non-transitory machine-readable medium of claim 10, wherein the QT convolution engine and the QT inner product engine each comprise a plurality of kernels.

12. The at least one non-transitory machine-readable medium of claim 11, wherein the QT convolution engine is to perform QT operations, using QT general matrix multiplication, that maintain spatial translational invariance.

13. The at least one non-transitory machine-readable medium of claim 10, wherein the QT convolution engine is to perform a QT summation of a quaternion-valued input signal, at successive shifts, QT-multiplied with a QT-valued filter, to produce a QT convolution output.

14. The at least one non-transitory machine-readable medium of claim 13, wherein the QT convolution engine is to further perform a QT addition of a quaternion-valued bias parameter with the QT convolution output.

15. The at least one non-transitory machine-readable medium of claim 13, wherein the QT convolution engine is to perform a multi-dimensional QT convolution operation.

16. The at least one non-transitory machine-readable medium of claim 10, wherein the QT inner product engine is to perform a series of term-wise QT multiplication operations between a quaternion-valued QT inner product input and a set of quaternion-valued weights, to produce a QT inner product output.

17. A machine-learning system, comprising:

processing hardware, including computation circuitry and data storage circuitry, the processing hardware configured to form a quaternion deep neural network (QTDNN) including:

a plurality of modular hidden layers, each comprising a set of QT computation sublayers, including a quaternion (QT) general matrix multiplication sublayer, a QT non-linear activations sublayer, and a QT sampling sublayer arranged along a forward signal propagation path;

wherein each QT computation sublayer of the set includes, a plurality of QT computation engines; and wherein each modular hidden layer further includes a steering sublayer preceding each of the QT computation sublayers along the forward signal propagation path, wherein the steering sublayer is to direct a forward-propagating quaternion-valued signal to a selected at least one QT computation engine of a next QT computation subsequent sublayer.

18. The machine learning system of claim 17, wherein the QT general matrix multiplication sublayer includes a QT convolution engine and a QT inner product engine.

19. The machine learning system of claim 18, wherein the QT convolution engine and the QT inner product engine each comprise a plurality of kernels.

20. The machine learning system of claim 19, wherein the QT convolution engine is to perform QT operations, using QT general matrix multiplication, that maintain spatial translational invariance.

21. The machine learning system of claim 18, wherein the QT convolution engine is to perform a QT summation of a quaternion-valued input signal, at successive shifts, QT-multiplied with a QT-valued filter, to produce a QT convolution output.

22. The machine learning system of claim 21, wherein the QT convolution engine is to further perform a QT addition of a quaternion-valued bias parameter with the QT convolution output.

23. The machine learning system of claim 21, wherein the QT convolution engine is to perform a multi-dimensional QT convolution operation.

24. The machine learning system of claim 18, wherein the QT inner product engine is to perform a series of term-wise QT multiplication operations between a quaternion-valued QT inner product input and a set of quaternion-valued weights, to produce a QT inner product output.

* * * * *